(12) United States Patent
Carcanague et al.

(10) Patent No.: US 11,543,541 B2
(45) Date of Patent: Jan. 3, 2023

(54) SYSTEMS AND METHODS FOR HIGH-INTEGRITY SATELLITE POSITIONING

(71) Applicant: Swift Navigation, Inc., San Francisco, CA (US)

(72) Inventors: Sebastien Carcanague, San Francisco, CA (US); Fergus MacPherson Noble, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 17/752,712

(22) Filed: May 24, 2022

(65) Prior Publication Data

US 2022/0283320 A1    Sep. 8, 2022

Related U.S. Application Data

(63) Continuation of application No. 17/022,924, filed on Sep. 16, 2020, now Pat. No. 11,372,114, which is a
(Continued)

(51) Int. Cl.
*G01S 19/44*         (2010.01)
*G01S 19/07*         (2010.01)
(Continued)

(52) U.S. Cl.
CPC .......... *G01S 19/44* (2013.01); *G01S 19/07* (2013.01); *G01S 19/20* (2013.01); *G01S 19/252* (2013.01); *G01S 19/49* (2013.01); *G01S 19/52* (2013.01)

(58) Field of Classification Search
CPC .......... G01S 19/44; G01S 19/07; G01S 19/20; G01S 19/252; G01S 19/49; G01S 19/52
(Continued)

(56) References Cited

U.S. PATENT DOCUMENTS

| 5,610,614 A | 3/1997 | Talbot et al. |
| 6,427,122 B1 | 7/2002 | Lin |
| (Continued) | | |

FOREIGN PATENT DOCUMENTS

| CA | 2718988 C | 1/2014 |
| CN | 103197327 A | 7/2013 |
| (Continued) | | |

OTHER PUBLICATIONS

RAIM, GMV, 2011, RAIM.*
(Continued)

*Primary Examiner* — Harry K Liu
(74) *Attorney, Agent, or Firm* — Jeffrey Schox; Randy Mehlenbacher

(57) ABSTRACT

A system for estimating a receiver position with high integrity can include a reference station observation monitor configured to: receive a set of reference station observations associated with a set of reference stations, detect a predetermined event, and mitigate an effect of the predetermined event; a modeling engine configured to generate corrections; a reliability engine configured to validate the corrections; an observation monitor configured to: receive a set of satellite observations from a set of global navigation satellites corresponding to at least one satellite constellation; detect a predetermined event; and mitigate an effect of the predetermined event; a carrier phase determination module configured to determine a carrier phase ambiguity of the set of satellite observations; and a position filter configured to estimate a position of the receiver.

23 Claims, 15 Drawing Sheets

Related U.S. Application Data continuation of application No. 16/865,077, filed on May 1, 2020, now Pat. No. 10,809,388.

(60) Provisional application No. 62/841,380, filed on May 1, 2019.

(51) Int. Cl.
  *G01S 19/52* (2010.01)
  *G01S 19/25* (2010.01)
  *G01S 19/49* (2010.01)
  *G01S 19/20* (2010.01)

(58) Field of Classification Search
  USPC ............................................................ 342/352
  See application file for complete search history.

(56) References Cited

U.S. PATENT DOCUMENTS

| | | |
|---|---|---|
| 6,453,237 B1 | 9/2002 | Fuchs et al. |
| 6,552,680 B1 | 4/2003 | Barber et al. |
| 6,647,340 B1 | 11/2003 | Pemble et al. |
| 6,691,066 B1 | 2/2004 | Brodie |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,409,289 B2 | 8/2008 | Coatantiec et al. |
| 7,538,721 B2 | 5/2009 | Vollath et al. |
| 7,692,578 B2 | 4/2010 | Vollath et al. |
| 7,696,922 B2 | 4/2010 | Nicholson et al. |
| 8,089,402 B2 | 1/2012 | Maenpa et al. |
| 8,094,065 B2 | 1/2012 | Henkel |
| 8,193,976 B2 | 6/2012 | Shen et al. |
| 8,255,155 B1 | 8/2012 | Crane et al. |
| 8,416,133 B2 | 4/2013 | Hatch et al. |
| 8,447,517 B2 | 5/2013 | Roh |
| 8,542,146 B2 | 9/2013 | Vollath |
| 8,610,624 B2 | 12/2013 | Savoy |
| 8,756,001 B2 | 6/2014 | Georgy et al. |
| 8,760,343 B2 | 6/2014 | Milyutin et al. |
| 8,825,456 B2 | 9/2014 | Vasudevan et al. |
| 8,860,609 B2 | 10/2014 | Roh |
| 8,996,311 B1 | 3/2015 | Morin et al. |
| 9,031,782 B1 | 5/2015 | Lemay et al. |
| 9,069,073 B2 | 6/2015 | Ramakrishnan et al. |
| 9,128,176 B2 | 9/2015 | Seeger |
| 9,182,497 B2 | 11/2015 | Geier et al. |
| 9,405,012 B2 | 8/2016 | Doucet et al. |
| 9,405,016 B2 | 8/2016 | Yim |
| 9,417,330 B2 | 8/2016 | Revol et al. |
| 9,557,422 B1 | 1/2017 | Miller et al. |
| 9,568,321 B2 | 2/2017 | Bharadwaj et al. |
| 9,602,974 B2 | 3/2017 | Rudow et al. |
| 9,612,341 B2 | 4/2017 | Large et al. |
| 9,709,683 B2 | 7/2017 | Leandro et al. |
| 9,784,844 B2 | 10/2017 | Kana et al. |
| 10,018,729 B2 | 7/2018 | Dunik et al. |
| 10,101,464 B2 | 10/2018 | Appleford et al. |
| 10,260,888 B2 * | 4/2019 | Takahashi ............... G01S 19/43 |
| 10,274,606 B1 * | 4/2019 | Phan ....................... G01S 19/44 |
| 10,422,885 B2 | 9/2019 | Dai et al. |
| 10,459,593 B2 | 10/2019 | Tiwari et al. |
| 10,578,747 B2 | 3/2020 | Grgich et al. |
| 10,677,933 B1 | 6/2020 | Gavrilets et al. |
| 10,802,160 B2 | 10/2020 | Dai et al. |
| 10,809,388 B1 | 10/2020 | Carcanague et al. |
| 10,901,096 B2 | 1/2021 | Thrasher et al. |
| 11,156,718 B2 | 10/2021 | Takeda |
| 11,187,813 B2 | 11/2021 | Brandl et al. |
| 11,327,182 B2 | 5/2022 | Zalewski et al. |
| 11,422,269 B2 | 8/2022 | Ookubo et al. |
| 11,422,271 B2 | 8/2022 | Talbot et al. |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0283675 A1 | 11/2010 | Mcaree et al. |
| 2011/0050497 A1 | 3/2011 | Maenpa et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0187589 A1 | 8/2011 | Gaal et al. |
| 2011/0187590 A1 | 8/2011 | Leandro |
| 2011/0316740 A1 | 12/2011 | Waters et al. |
| 2012/0154210 A1 | 6/2012 | Landau et al. |
| 2012/0176271 A1 | 7/2012 | Dai et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0265191 A1 | 10/2013 | Ghinamo |
| 2013/0271318 A1 | 10/2013 | Landau et al. |
| 2013/0335264 A1 | 12/2013 | Revol et al. |
| 2014/0015712 A1 | 1/2014 | Leandro et al. |
| 2014/0062765 A1 | 3/2014 | Brenner |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2015/0019464 A1 | 1/2015 | Nguyen-Tuong et al. |
| 2015/0173037 A1 | 6/2015 | Pijl |
| 2015/0260848 A1 * | 9/2015 | Mundt .................. G01S 19/074 342/357.44 |
| 2015/0270615 A1 | 9/2015 | Neenan |
| 2015/0293230 A1 | 10/2015 | Weed et al. |
| 2015/0293233 A1 | 10/2015 | De Jong |
| 2015/0369924 A1 | 12/2015 | Hedgecock et al. |
| 2016/0011318 A1 | 1/2016 | Cohen |
| 2016/0097859 A1 | 4/2016 | Hansen et al. |
| 2016/0195617 A1 | 7/2016 | Phatak et al. |
| 2017/0269216 A1 | 9/2017 | Dai et al. |
| 2017/0269222 A1 | 9/2017 | Dai et al. |
| 2017/0269231 A1 | 9/2017 | Dai et al. |
| 2017/0299730 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0164442 A1 | 6/2018 | Thrasher et al. |
| 2018/0172838 A1 | 6/2018 | Junker et al. |
| 2018/0246217 A1 | 8/2018 | Wuebbena |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 | 10/2018 | Laine et al. |
| 2019/0004180 A1 | 1/2019 | Jokinen |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0243001 A1 | 8/2019 | Ookubo et al. |
| 2019/0302274 A1 | 10/2019 | Berntorp et al. |
| 2019/0339396 A1 | 11/2019 | Turunen |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0096649 A1 | 3/2020 | Brandl et al. |
| 2020/0209406 A1 | 7/2020 | Lin et al. |
| 2020/0233056 A1 | 7/2020 | Dolgov et al. |
| 2020/0257002 A1 | 8/2020 | Henkel |
| 2021/0033735 A1 | 2/2021 | Kleeman |
| 2021/0116579 A1 | 4/2021 | Rezaei |
| 2021/0165104 A1 | 6/2021 | Zalewski et al. |
| 2021/0165111 A1 | 6/2021 | Zalewski |

(56) References Cited

U.S. PATENT DOCUMENTS

| | | |
|---|---|---|
| 2021/0215831 A1 | 7/2021 | Takeda |
| 2022/0058322 A1 | 2/2022 | Brandl et al. |
| 2022/0163677 A1 | 5/2022 | Muthuraman et al. |

FOREIGN PATENT DOCUMENTS

| | | | | |
|---|---|---|---|---|
| CN | 103760573 A | 4/2014 | | |
| CN | 104236522 A | 12/2014 | | |
| CN | 104732085 A | 6/2015 | | |
| CN | 107422354 A | * 12/2017 | ............ | G01S 19/44 |
| CN | 105629263 B | * 4/2019 | ............ | G01S 19/07 |
| CN | 109714421 B | 8/2021 | | |
| CN | 114174850 A | * 3/2022 | ............ | G01S 19/07 |
| EP | 0244091 A2 | 11/1987 | | |
| EP | 1729145 A1 | 12/2006 | | |
| EP | 2128841 A1 | 12/2009 | | |
| EP | 2602752 A1 | 6/2013 | | |
| EP | 1839070 B2 | 4/2014 | | |
| EP | 2966477 A1 | 1/2016 | | |
| EP | 3627188 A1 | 3/2020 | | |
| EP | 3566021 B1 | 3/2021 | | |
| WO | 2017046914 A1 | 3/2017 | | |
| WO | 2017070732 A1 | 5/2017 | | |
| WO | 2020240307 A1 | 12/2020 | | |

OTHER PUBLICATIONS

International Search Report and Written Opinion for PCT Application No. PCT/US20/44750 dated Jan. 8, 2021.

International Search Report and Written Opinion for PCT Application No. PCT/US20/31137 dated Sep. 4, 2020.

"An Introduction to GNSS, Chapter 4, GNSS Error Sources", https://novatel.com/an-introduction-to-gnss/chapter-4-gnsserror-sources, published 2015.

"Geo++ SSR For Network-RTK, PPP and PPP-RTK", https://geopp.de/wp-content/uploads/2020/09/SSR_Flyer_v3.pdf, Sep. 2015.

"IGS State Space Representation (SSR) Format Version 1.00", International GNSS Service (IGS), Oct. 5, 2020.

"Integrity-Navipedia", https://gssc.esa.int/navipedia/index.php/Integrity, published 2011.

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

"Safe Position Augmentation for Real-Time Navigation (SPARTN) Interface Control Document Version 1.8.0", Jan. 2020, Sapcorda Services GmbH.

Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.

Blanch, Juan, et al., "RAIM with Optimal Integrity and Continuity Allocations Under Multiple Failures", IEEE Transactions on Aerospace and Electronic Systems, vol. 46, No. 3, Jul. 2010.

Brack, A., "Optimal Estimation of a Subset of Integers With Application to GNSS", Artificial Satellites, vol. 51, No. 4—2016 DOI: 10.1515/arsa-2016-0011.

Brocard, Philippe, "Integrity monitoring for mobile users in urban environment", https://tel.archives-ouvertes.fr/tel-01379632/document, submitted Oct. 11, 2016.

Bruno, Jon, et al., "A realistic simulation framework to evaluate ionospheric tomography", Advances in Space Research 65 (2020) 891-901.

Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.

Chiu, David S., et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00.0.

Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.

Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.

Favey, Etienne, et al., "Dead reckoning fills-in GPS navigation gap", EE Times, Automotive Designline, Aug. 18, 2011.

Feng, Shaun, et al., "Carrier phase-based integrity monitoring for high-accuracy positioning", GPS Solution, Apr. 2009.

Gratton, Livio, et al., "Carrier Phase Relative RAIM Algorithms and Protection Level Derivation", Journal of Navigation (2010), 63, 215-231, doi: 10.1017/S0373463309990403.

Gunning, Kazuma, et al., "Design and evaluation of integrity algorithms for PPP in kinematic applications", Proceedings of the 31st International Technical Meeting of the Satellite Division of The Institute of Navigation (Ion GNSS+2018) Sep. 24-28, 2018, Hyatt Regency Miami, Miami, Florida.

Henkel, Patrick, et al., "Joint L-/C-Band Code and Carrier Phase Linear Combinations for Galileo", International Journal of Navigation and Observation, vol. 2008, Article ID 651437, 8 pages.

Hirokawa, Dr. Rui, "Recent Activity of International Standardization for High-Accuracy GNSS Correction Service", Mitsubishi Electric, Jun. 27, 2019.

Huang, Panpan, "Airborne GNSS PPP Based Pseudolite System", School of Civil and Environmental Engineering Faculty of Engineering UNSW. Jun. 2019.

Karaim, Malek, et al., "GNSS Error Sources", https://www.intechopen.com/books/multifunctional-operation-and-application-of-gps/gnss-error-sources, published Apr. 6, 2018.

Khanafseh, Samer, et al., "GNSS Multipath Error Modeling for Automotive Applications", Abstract only, Proceedings of the 31st International Technical Meeting of the Satellite Division of The Institute of Navigation (ION GNSS+2018), Miami, Florida, Sep. 2018, pp. 1573-1589, https://www.ion.org/publications/abstract.cfm?articleID=16107.

Kilic, Cagri, et al., "ZUPT Aided GNSS Factor Graph with Inertial Navigation Integration for Wheeled Robots", Proceedings of the 34th International Technical Meeting of the Satellite Division of The Institute of Navigation (Ion GNSS+2021) Sep. 20-24, 2021.

Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.

Ko, Jonathan, et al., "GP-UKF: Unscented kalman filters with Gaussian process prediction and observation models", Conference Paper, Dec. 2007,10.1109/IROS.2007.4399284.

Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.

Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.

Lei, Yu, et al., "Prediction of Navigation Satellite Clock Bias by Gaussian Process Regression", Lecture Notes in Electrical Engineering 342:411-423, Jan. 2015.

Li, T., et al., "Some remarks on GNSS integer ambiguity validation methods", Survey Review, Dec. 5, 2012, vol. 44, No. 326.

Lin, Ming, et al., "Robust Gaussian Process Regression for Real-Time High Precision GPS Signal Enhancement", www.gps.gov/systems/gps/performance/accuracy, Jun. 5, 2019.

Liu, Haiying, et al., "A closed-loop EKF and multi-failure diagnosis approach for cooperative GNSS positioning", Engineering, GPS Solutions, Published 2015.

Madrid, Navarro, et al., "New Approach for Integrity Bounds Computation Applied to Advanced Precise Positioning Applica-

(56) References Cited

OTHER PUBLICATIONS tions", Proceedings of the 28th International Technical Meeting of the Satellite Division of The Institute of Navigation (ION GNSS+ 2015) Sep. 14-18, 2015, Tampa Convention Center, Tampa, Florida.
Meng, Xiaoli, et al., "A Robust Vehicle Localization Approach Based on GNSS/IMU/DMI/LiDAR Sensor Fusion for Autonomous Vehicles", Sensors, 2017, 17, 2140.
Odijk, Dennis, et al., "On the estimability of parameters in undifferenced, uncombined GNSS network and PPP-RTK user models by means of S-system theory", Journal of Geodesy, Nov. 2015.
Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.
Pervan, Boris, et al., "Shaping Aviation Integrity Two RAIMs for Safety", GPS World The Business and Technology of Global Navigation and Positioning, Apr. 1, 2008.
Phelts, R. Eric, et al., "Innovation: Improving ARAIM, An approach using precise point positioning", GPS World, Jun. 13, 2020, https://www.gpsworld.com/innovation-improving-araim/.
Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20,2011 1:30-5:00 PM Oregon Convention Center, Portland, Oregon.
Rasmussen, C.E., et al., "Gaussian Processes for Machine Learning", MIT Press, 2006, ISBN 026218253X. c 2006 Massachusetts Institute of Technology, (Year: 2006).
Rodriguez-Solano, Carlos, et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.
Satirapod, Chalermehon, "Improving the GPS Data Processing Algorithm for Precise Static Relative Positioning", School of Surveying and Spatial Information Systems The University of New South Wales Jan. 2002.
Schmitz, Martin, "RTCM State Space Representation Messages, Status and Plans", PPP-RTK & Open Standards Symposium, Mar. 12-13, 2012, Frankfurt, Germany.
Shapiro, Larry S., et al., "Rejecting Outliers and Estimating Errors in an Orthogonal-Regression Framework", Phil. Trans. R. Soc. Load. A (1995)350, 407-439. (Year:1995).
Skog, Isaac, et al., "A Low-Cost GPS Aided Inertial Navigation System for Vehicle Applications", 2005 13th European Signal Processing Conference, Sep. 4-8, 2005.
Snelson, Edward, et al., "Sparse Gaussian Process using Pseudo-inputs", NIPS'05: Proceedings of the 18th International Conference on Neural Information Processing Systems, Dec. 2005, pp. 1257-1264.
Subirana, J. Sanz, et al., "Carrier Phase Cycle-Slip Detection—Navipedia", https://gssc.esa.int/navipedia/index.php/Carrier_Phase_Cycle-Slip_Detection, published 2011.
Takasu, Tomoji, et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.
Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.
Teunissen, P.J.G., "On the GPS widelane and its decorrelating property", Delft Geodetic Computing Centre, Journal of Geodesy (1997) 71: 577-587.
Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.
Titsias, Michael K., "Variational Learning of Inducing Variables in Sparse Gaussian Processes", http://proceedings.mlr.press/v5/titsias09a/titsias09a.pdf, 2009.
Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.
Urquhart, Landon, et al., "Innovation: Integrity for safe navigation", https://www.gpsworld.com/innovation-integrity-for-safe-navigation-provided-by-gnss-service/, GPS World, Feb. 12, 2020.
Van Diggelen, Frank, et al., "Google to improve urban GPS accuracy for apps", Dec. 9, 2020, Android Developers Blog.
Van Graas, Frank, et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.
Verhagen, S., "The GNSS integer ambiguities: Estimation and validation", Aerospace Engineering, Jan. 31, 2005.
Waserman, Eyal, et al., "A Mixed Integer Least-Squares Formulation of the GNSS Snapshot Positioning Problem", https://github.com/eyalw711/snapshot-positioning, Jun. 2, 2021.
Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.
Zhu, NI, et al., "GNSS Position Integrity in Urban Environments: A Review of Literature", IEEE Transactions on Intelligent Transportation Systems, 2018, 17p., 10.1109/TITS.2017.2766768.hal-01709519.
"Swift Navigation Binary Protocol", Version 3.4.5, Mar. 10, 2021, pp. 1-156.
Rothacher, M., et al., "ANTEX: The Antenna Exchange Format, Version 1.4", Sep. 15, 2010, IGC International GNSS Service, https://kb.igs.org/hc/en-us/articles/216104678-ANTEX-format-description.
Schmid, R., et al., "Estimation of elevation-dependent satellite antenna phase center variations of GPS satellites", Journal of Geodesy (2003) 77: 440-446, May 19, 2003, DOI 10.1007/S00190-003-0339-0.
Schmid, Ralf, et al., "From Relative Absolute Antenna Phase Center Corrections", Conference: IGS Workshop and Symposium 2004.
Schmid, Ralf, "How to Use IGS Antenna Phase Center Corrections", GPS World Tech Talk, Feb. 3, 2010.

\* cited by examiner

SYSTEMS AND METHODS FOR HIGH-INTEGRITY SATELLITE POSITIONING

CROSS-REFERENCE TO RELATED APPLICATIONS

This application is a continuation of U.S. patent application Ser. No. 17/022,924 filed 16 Sep. 2020 which is a continuation of U.S. patent application Ser. No. 16/865,077 filed 1 May 2020, which claims the benefit of U.S. Provisional Application Ser. No. 62/841,380, filed on 1 May 2019, each of which is incorporated in its entirety by this reference.

This application is related to U.S. patent application Ser. No. 16/817,196 filed 12 Mar. 2020, U.S. patent application Ser. No. 16/589,932 filed 1 Oct. 2019, and U.S. patent application Ser. No. 16/748,517 filed 21 Jan. 2020, each of which is incorporated in its entirety by this reference.

TECHNICAL FIELD

This invention relates generally to the satellite positioning field, and more specifically to new and useful systems and methods for high-integrity satellite positioning.

BACKGROUND

Global Satellite Navigation System (GNSS) based satellite positioning systems are critical to myriad applications requiring a precise knowledge of an object's position on Earth. Like its terrestrial-based radio navigation forebears, satellite positioning was originally used as a navigation aid to human navigators. As automation progressed, the link between satellite positioning input and machine control output became shorter and more direct. Unfortunately, the accuracy of GNSS positioning systems have not always kept pace with the demands of modern machine automation applications. Further, applications in which error is high-cost (e.g., loss of human life) require not only high accuracy but also high integrity, a related but distinct concept (discussed in further detail in later sections) and another limitation of current GNSS positioning. Therefore, there is the need in the satellite positioning field to create systems and methods for high-integrity satellite positioning. This invention provides such new and useful systems and methods.

DESCRIPTION OF THE INVENTION EMBODIMENTS

The following description of the invention embodiments of the invention is not intended to limit the invention to these invention embodiments, but rather to enable any person skilled in the art to make and use this invention.

1. Overview

Figure 1A:
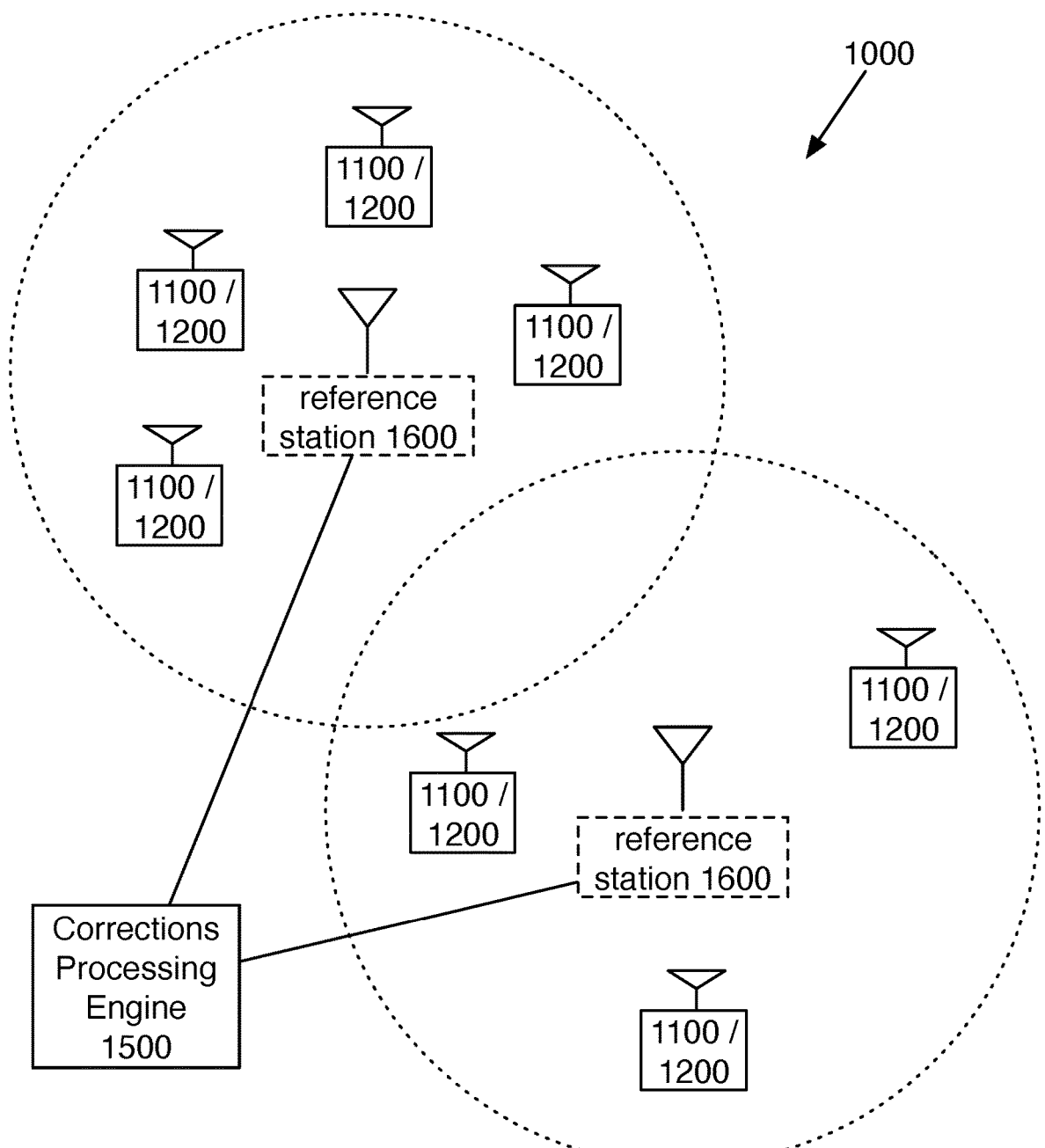
FIG. 1A is a diagram representation of a system of an invention embodiment.
Figure 1B:
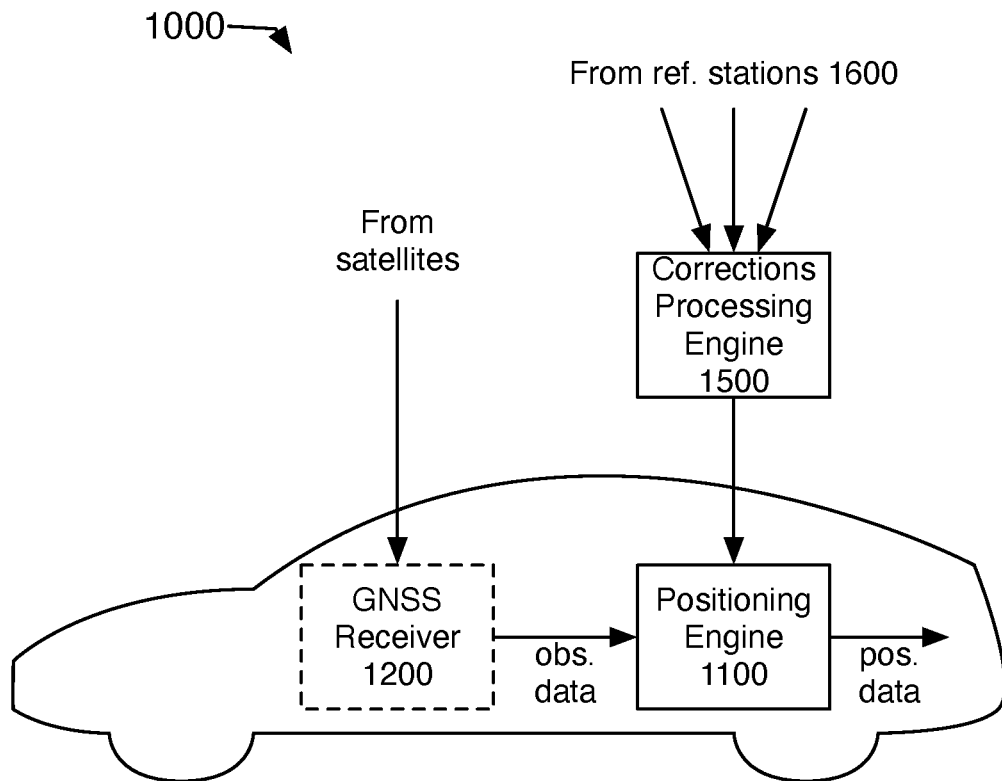
FIG. 1B is a diagram representation of a system of an invention embodiment.
Figure 1C:
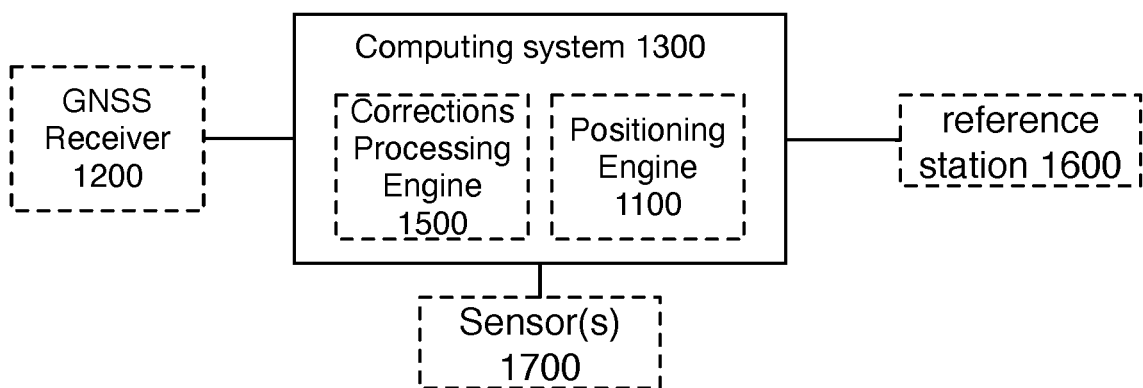
FIG. 1C is a diagram representation of a system of an invention embodiment.

As shown in FIGS. 1A, 1B, and 1C, the system preferably includes a positioning engine and a corrections processing engine. The system can optionally include one or more GNSS receivers, reference stations, and/or any suitable components. The positioning engine can include one or more: observation module, outlier detector, carrier phase determination module, validation module, position module, velocity module, dead reckoning module, fast reconvergence module, and/or any suitable module(s). The corrections processing engine can include one or more: reference observation monitor, correction data monitor, metadata monitor, modeling engine, and/or any suitable module(s).

Figure 7:
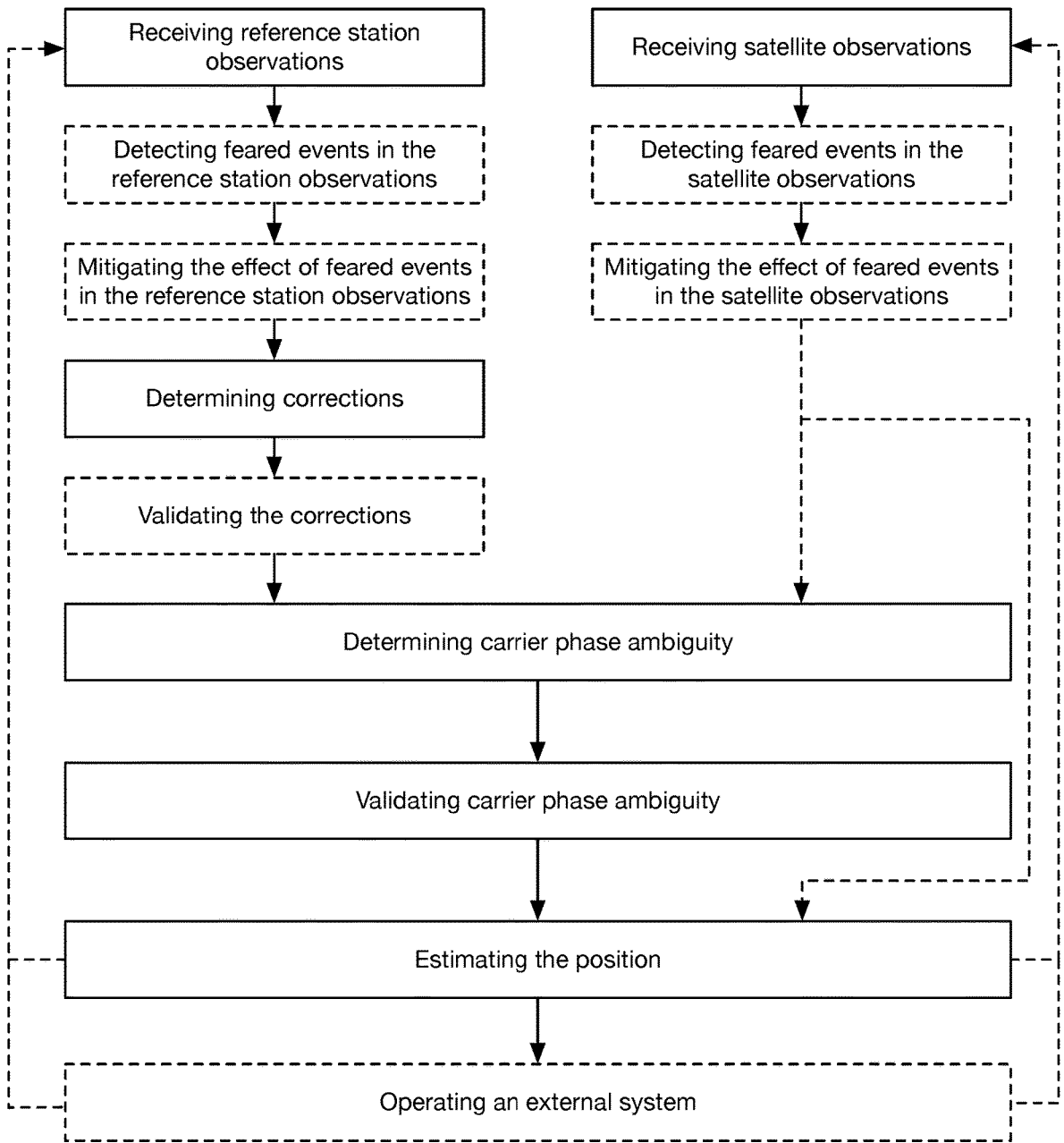
FIG. 7 is a schematic representation of an example method of using the system.

As shown in FIG. 7, the method can include: receiving reference station observations, determining corrections based on the reference station observations, receiving satellite observations, resolving carrier phase ambiguity based on the satellite observations and the corrections, and estimating a position of the GNSS receiver based on the carrier phase measurements. The method can optionally include: validating the corrections, detecting predetermined events, mitigating predetermined events, validating the integer ambiguities, removing the integer ambiguities from carrier phase measurements, operating an external system based on the estimated position, and/or any suitable steps.

Embodiments of the system and/or method can be used, for example, in autonomous vehicle guidance (e.g., for unmanned aerial vehicles (UAVs), unmanned aerial systems (UAS), self-driving cars, agricultural equipment, robotics, rail transport/transit systems, etc.), GPS/GNSS research, surveying systems, and/or may be used for any suitable operation. In specific examples, the system (and/or components) can be coupled to any suitable external system such as a vehicle (e.g., UAV, UAS, car, truck, etc.), robot, railcar, user device (e.g., cell phone, mobile applications), agriculture, robotics, and/or any suitable system. Additionally, the GNSS receivers may be designed to utilize open-source software firmware, allowing them to be easily customized to particular demands of end user applications, easing system integration and reducing host system overhead; however, the GNSS receivers can be designed in any suitable manner.

1.1 GNSS Accuracy and Integrity

Accuracy in a GNSS positioning system is a characteristic of the system that provides statistical information about possible error in the system's position data output. For example, a standard GNSS receiver might specify an accuracy at the ~68% confidence level (i.e., 1 standard deviation for a normal distribution) as 1 meter; in other words, 68% of the time, the position output by the system is within 1 meter of true position. As another example, a high-accuracy real-time kinematic (RTK) GNSS receiver might provide an accuracy (at the 95% confidence interval or 2 standard deviations for a normal distribution) of 3 cm. Thus, a high-accuracy system is simply a system that achieves a low position error most of the time (as measured a posteriori).

Like accuracy, integrity is also based on position error; however, integrity includes the concept of real- or near-real time error estimation (as opposed to a posteriori error calculation). Based on this real-time error estimation, positioning systems with integrity can provide alerts when positioning error likely exceeds error thresholds. At a broad level, a positioning system's integrity may be described using the following parameters: position error (PE), integrity risk, protection level (PL), alert limit (AL), and time to alert (TTA). Real- or near-real time error estimation can occur within a predetermined estimation time (e.g., 100 ms, 1 s, 2 s, 3 s, 4 s, 5 s, 10 s, 20 s, 30 s, 45 s, 60 s, 90 s, 120 s, 180 s, 240 s, 300 s, 600 s, etc.), "fast enough to be used during navigation," and/or with any suitable timing.

Position error is the error in the estimated position (e.g., if an estimated position is 1 m away from the true position, the position error is 1 m). As previously noted, it is not possible for a GNSS receiver to know position error in real time independently (e.g., while a receiver may know that 95% of the time error is under 1 m thanks to accuracy characterization, the receiver cannot independently determine that a given position estimate is exactly 0.5 m away from true position—and if it could, it would simply subtract the error, resulting in perfect accuracy). Note that while error is discussed in terms of "position error", integrity may be generally be performed with regard to any parameter estimated by the positioning system (e.g., error in horizontal position of a receiver, error in vertical position of a receiver, error in pseudorange(s) from a receiver to one or more satellites, error in velocity, etc.)

Integrity risk is a characterization of integrity (as accuracy is a characterization of the system more generally). Integrity can be a measure of trust that can be placed in the correctness of the information supplied by a navigation system. Integrity risk is generally specified as the probability that position error will exceed some threshold (the alert limit) over some time period (e.g., at the current time, a second, a minute, an hour, a day, an operation duration, etc.). Target Integrity Risk (TIR) is an integrity risk goal used to generate protection levels (e.g., alert or mitigation thresholds). In some variants, the integrity risk can be separated into (e.g., determined from) constituent components: the probability that one or more predetermined events from a set of predetermined events occurs (e.g., during the time period); an intermediate data integrity risk (e.g., the probability that intermediate data, such as pseudorange; carrier phase; real-valued carrier phase; integer-valued carrier phase; etc., used to estimate the position will exceed a threshold over a time period, the probability that there will be an error in the intermediate data during a time period, the probability that the intermediate data will transform such as fix to an incorrect value, etc.); and/or any suitable probabilities. The estimated position integrity risk (and/or intermediate data integrity risk) can be the sum of one or more of the separate probabilities, the product of one or more of the separate probabilities, the maximum probability of the separate probabilities, the minimum probabilities, an average of one or more of the separate probabilities, based on an equation and/or model (e.g., determined empirically, based on fit parameters, based on Monte Carlo simulations, etc.) relating one or more of the separate probabilities to the integrity risk, and/or be otherwise determined from one or more of the separate probabilities. The integrity risk (e.g., estimated position integrity risk, intermediate data integrity risk) can be determined using weighted or unweighted separate probabilities. However, the integrity risk can be otherwise defined.

Protection levels are a statistical upper bound to position error calculated based on the target integrity risk, and serve as the mechanism for real-time position error estimation. Alternatively stated, the protection level is an estimated position error assured (at any point in time) to meet a given TIR, or $P\{PE>PL\} \leq TIR$. For a given position estimate, the protection level is calculated such that the probability of actual position error being larger than the protection level is less than the target integrity risk. Note that as a GNSS receiver receives more data and/or spends more time calculating, protection levels often decrease (i.e., when the receiver becomes more certain about position, the position error range that still meets TIR decreases). However, the protection levels can be otherwise defined.

Alert limits are thresholds for protection levels. In an illustrative example, a position estimate may be considered unreliable when the protection level for the position estimate is above 10 m (in this case, 10 m is the alert limit). Relatedly, time to alert (TTA) is the maximum amount of time that may elapse between a protection level surpassing an alert limit and the generation of an alert (e.g., specifying that the position estimate is unreliable). However, the alert limit can be otherwise defined.

While these parameters are the standard for describing integrity, it is worth noting that many of them may be specified in different ways. For example, position error estimates may be an upper bound of integrity risk at one or more set position errors. In general, the concept of integrity within satellite positioning involves estimating position error and responding accordingly. However, the integrity can be otherwise described.

As previously mentioned, high-integrity positioning is important for applications in which GNSS error can result in high costs. One such application in which high-integrity positioning is important is in autonomous vehicle (AV) guidance. Unfortunately, traditional high-integrity GNSS systems (e.g., GNSS receivers that produce protection levels around 10 m) are greatly limited in utility for AV guidance—not only are these systems too costly for use in most AVs, but the alert limits required for AV guidance (e.g., 3 m) are substantially lower than those achievable by traditional system protection levels. Furthermore, traditional system protection levels for aircraft are calculated under open-sky conditions, unlike the busy and crowded urban environments AVs need to tackle, and therefore do not have to contend with pseudorange multipath errors that are compounded by commercial-grade receivers. Additionally, traditional systems' operation environments leverage simplifying assumptions (e.g., single fault assumptions, ignoring sub-meter threats) to speed up validation, which cannot be made in some of the technology's contemplated use cases.

The systems and methods of the present disclosure are directed to novel high-integrity positioning that enables effective use of GNSS positioning for commercial applications.

1.2 Brief Overview of Traditional GNSS, PPP, and RTK

As a quick refresher, traditional satellite positioning systems (e.g., standard GNSS) work by attempting to align a local copy (at a receiver) of a pseudorandom binary sequence with a satellite-transmitted copy of the same sequence; because the satellite is far from the receiver, the signal transmitted by the satellite is delayed. By delaying the local copy of the sequence to match up with the satellite-transmitted copy, the time it takes the signal to travel from the satellite to the receiver can be found, which can in turn be used to calculate the distance between the satellite and receiver. By performing this process for multiple satellites (typically four or more), a position of the receiver relative to the satellites can be found, which can in turn be used to find the position in a particular geographic coordinate system (e.g., latitude, longitude, and elevation). Typical GNSS systems can achieve at best 2 m accuracy in positioning.

For many applications (e.g., guidance for human-carrying autonomous vehicles/drones/agricultural equipment, GPS/GNSS research, surveying), this level of accuracy is woefully inadequate. In response, two position correction algorithms have been developed: precise point positioning (PPP) and real time kinematic (RTK).

Instead of solely using the positioning code broadcast by satellites, PPP and RTK also make use of satellite signal carrier phase to determine position. While much higher accuracy is possible using carrier phase data, accurately determining position of a GNSS receiver (i.e., the receiver for which position is to be calculated) requires accounting for a number of potential sources of error. Further, carrier phase measurements are ambiguous; because the carrier signal is uniform, it may not be possible to differentiate between a phase shift of $\varphi$ and $2\pi N+\varphi$ using phase measurements alone, where N is an integer. For example, it may be difficult to determine the difference between a phase shift of $\pi$ radians and a phase shift of $3\pi$ radians (or $-\pi$, $5\pi$, etc.).

PPP attempts to solve this issue by explicitly modeling the error present in GNSS receiver phase and code measurements. Some errors are global or nearly global (e.g., satellite orbit and clock errors); for these errors, PPP typically uses correction data with highly accurate measurements. However, for local errors (i.e., error that is substantially dependent on GNSS receiver location), PPP is only capable of very rough modeling. Fortunately, many local errors change slowly in time; resultantly, PPP can achieve high accuracy with only a single receiver, but may require a long convergence time to precisely determine local errors. As the terms are used in the present application, "global error" refers to any error that does not vary substantially across multiple reference stations within a region, while "local error" refers to error that does vary substantially across multiple reference stations (because the error is specific to a reference station and/or because the error varies substantially over position within the region). As this error pertains to positioning, such errors may also be referred to as "global positioning error" and "local positioning error".

RTK avoids a large majority of the modeling present in PPP by use of GNSS reference stations (with precisely known locations); since a reference station is local to the GNSS receiver, differencing the reference station and GNSS receiver signals can result in greatly reduced error. The result is that RTK solutions can converge much more quickly than PPP solutions (and without the high accuracy global corrections data needed by PPP). However, RTK solutions require the presence of base stations near a GNSS receiver.

1.3 Benefits

Variations of the technology can confer several benefits and/or advantages.

First, variants of the technology can achieve high precision positioning for a GNSS receiver and/or external system. In specific examples, using carrier phase measurements and/or determining an integer ambiguity can increase the precision with which a GNSS receiver position can be determined (such as achieving centimeter or better positioning of a mobile receiver). In specific examples, this level of precision positioning can be achieved with commercial-grade GNSS receivers and antennas, which have adaptive tracking profiles that are a function of the receiver dynamics, and suffer from different levels of pseudorange error as compared to aviation-grade GNSS receivers and antennas.

Second, variants of the technology can enable high accuracy GNSS receiver and/or external system position estimation. In related variants, the integrity of the estimated position can be (approximately) independent of pseudorange multipath errors. In a specific example, estimating the position using carrier phase ambiguities (e.g., integer-valued carrier phase ambiguities) with or without pseudorange measurements can enable the high accuracy, and/or reduce the dependence of the estimated position on the multipath errors.

Third, variants of the technology can enable high integrity (e.g., low integrity risk, small protection levels, etc.) of the estimated GNSS receiver and/or external system position. In specific examples, the high integrity estimated position(s) can be enabled by distributing the predetermined event detection between the positioning engine (e.g., detecting threats with quick or immediate integrity impact) and the corrections processing engine (e.g., detecting threats with slow integrity impact, on the order of seconds or minutes), detecting sub-meter threats, having a plurality of validation levels for the integer-valued carrier phase ambiguities, using signals from multiple constellations within the threat model, using a first set of reference station observations to determine corrections and a second set of reference station observations to validate the corrections, and/or be otherwise enabled.

Fourth, variants of the technology can estimate the GNSS receiver and/or external system position quickly. In specific example, the system and/or method can achieve a first TIR within 30 s (e.g., 5 s, 10 s, 15 s, 20 s, etc.), a second TIR within 90 s (e.g., of start-up, after achieving the first TIR, etc. such as within 10 s, 20 s, 30 s, 45 s, 60 s, 75 s, 90 s, etc.), and a third TIR within 300 s (e.g., of start-up, after achieving the first TIR, after achieving the second TIR, etc. such as 10 s, 20 s, 30 s, 45 s, 60 s, 75 s, 90 s, 120 s, 150 s, 180 s, 200 s, 215 s, 250 s, 270 s, 300 s, etc.). However, the technology can estimate and validate the GNSS receiver and/or external system position within any other suitable timeframe.

Fifth, variants of the technology can enable receiver positioning to be determined to a threshold integrity in the absence of satellite signals (e.g., satellite signal detection interrupted due to hardware issue, obstructions, etc.). In a specific example, one or more sensors (e.g., inertial navigation systems (INS)) can be used to estimate the GNSS receiver and/or external system position when one or more satellite signals are not received. In this specific example, the dead reckoning position determined using different INSs can be validated against each other to ensure that the dead reckoning position meets the threshold integrity.

However, variants of the technology can confer any other suitable benefits and/or advantages.

2. System

As shown in FIGS. 1A, 1B, and 1C, the system 1000 includes a computing system 1300. The computing system can include a positioning engine 1100 and a corrections processing engine 1500. The system 1000 can optionally include one or more GNSS receivers 1200, reference stations 1600, sensors 1700, and/or any suitable component(s).

The system functions to estimate the position of a mobile receiver and/or external system. The estimated position preferably has a high accuracy, but can have any suitable accuracy. For example, the estimated position can have an accuracy (e.g., with 50% confidence, 68% confidence, 95% confidence, 99.7% confidence, etc.) of at most 10 meters (e.g., 1 mm, 5 mm, 1 cm, 3 cm, 5 cm, 10 cm, 20 cm, 30 cm, 50 cm, 60 cm, 75 cm, 1 m, 1.5 m, 2 m, 3 m, 5 m, 7.5 m, etc.). The estimated position preferably has a high integrity (e.g., a low target integrity risk, a small protection level, etc.), but can have any suitable integrity. For example, the estimated position (and/or velocity) can have a target integrity risk less than about $10^{-2}$/hour such as at most $10^{-3}$/hour, $10^{-4}$/hour, $10^{-5}$/hour, $10^{-6}$/hour, $10^{-7}$/hour, $10^{-8}$/hour, and/or $10^{-9}$/hour. In a second example, the estimated position can have a protection level less than about 10 meters, such as at most 5 m, 3 m, 2 m, 1 m, 75 cm, 50 cm, 40 cm, 30 cm, 25 cm, 20 cm, 10 cm, 5 cm, 3 cm, 1 cm, 5 mm, and/or 1 mm.

The system can additionally or alternatively function to determine the probability and/or probability distribution that one or more predetermined events (e.g., feared events, threats, faults, etc.) will occur within a given time period. The predetermined events can correspond to events that will decrease the accuracy, integrity, availability of, and/or otherwise impact the estimated position. The predetermined events can directly impact the estimated position and/or indirectly impact the estimated position (e.g., by impacting the determination of real- or integer-valued carrier phase, the dead-reckoning position determination, corrections, outlier detection, reception of the satellite observations, reception of reference station observations, reception of corrections, etc.).

In specific examples, the predetermined events can include: high dynamic events, low dynamic events, datalink threats, and/or other events.

Examples of high dynamic events include: local predetermined events such as pseudorange multipath, carrier phase multipath, carrier phase cycle slip, RF interference, non-line of sight (NLOS) tracking, false acquisition, Galileo binary offset carrier modulation (BOC) second peak tracking, spoofing, etc.; satellite and/or satellite constellation predetermined events (e.g., satellite feared events) such as code carrier incoherency, satellite clock step error, satellite clock drift error greater than 1 cm/s, GPS evil waveform, loss of satellite observations, erroneous navigation messages, etc.; and/or other high dynamic events.

Examples of low dynamic events include: environmental predetermined events, such as an ionospheric gradient of at most 1 cm/s, tropospheric gradient, ionospheric scintillations, atmospheric events, etc.; network predetermined events such as reference station pseudopath multipath, reference station RF interference, reference station cycle slip, reference station observation loss, reference station observation corruption, etc.; low dynamic satellite and/or satellite constellation predetermined events such as loss of satellite observations, erroneous navigation message(s), satellite clock drift error at most about 1 cm/s, issue of data anomaly, erroneous broadcast ephemeris, erroneous broadcast clock, constellation failure, etc.; metadata predetermined events such as incorrect reference station coordinates, incorrect earth rotation parameters, incorrect sun/moon ephemeris, incorrect ocean loading parameters, incorrect satellite attitude model, incorrect satellite phase center offset, incorrect satellite phase center variation, incorrect leap second, etc.; and/or other low-dynamic event.

Examples of datalink threats can include: correction message corruption, corruption message loss, correction message spoofing, and/or other data transmission threats.

In variants, high dynamic events can be events (e.g., threats, faults, etc.) that can impact the integrity of the estimated position as soon as the high dynamic events are processed and/or used in to estimate the position (e.g., on the order of seconds, milliseconds, nanoseconds, concurrently with satellite signal processing). In related variants, low dynamic events can be events (e.g., threats, faults, etc.) that can impact the integrity of the estimated position within a threat time period. The threat time period can be predetermined (e.g., 1 s, 5 s, 10 s, 12 s, 20 s, 30 s, 40 s, 50 s, 60 s, 90 s, 120 s, 180 s, 240 s, 300 s, 600 s, etc.), based on the event, based on the integrity (e.g., previous estimated position integrity, target integrity, application required integrity, etc.), based on the data transmission lag, and/or can any suitable time period. In related variants, datalink threats can be events based on transmitting and/or receiving data between computing systems.

The probability of the predetermined events occurring (and/or the impact of the predetermined events) can be determined heuristically, empirically, based on computer simulations and/or models (e.g., Monte Carlo simulations, direct simulations, etc.), and/or otherwise be determined. The probability for each predetermined event is preferably independent of the probability of other predetermined events. However, the probability of two or more predetermined events can be dependent on each other. In variants, the probability of predetermined events can be used to estimate (and/or determine) the TIR (e.g., for the position estimate, for intermediate data, partially transformed data, etc.). In specific examples, the TIR can be determined from the product of each predetermined event, scaled by the probability of misdetecting the predetermined event and the impact of the predetermined event on the estimated position and/or intermediate data. However, the TIR can be determined in any suitable manner.

The computing system 1300 preferably functions to process data from reference stations, GNSS receivers, and/or sensors. The computing system may process this data for multiple purposes, including aggregating data (e.g., tracking multiple mobile receivers, integrating satellite observations and sensor data, etc.), system control (e.g., providing directions to an external system based on position data determined from a GNSS receiver attached to the external system), position calculation (e.g., performing calculations for GNSS receivers that are offloaded due to limited memory or processing power, receiver position determination, etc.), correction calculation (e.g., local and/or global correction data such as to correct for clock errors, atmospheric corrections, etc.), detect predetermined events (e.g., in the satellite observations, in the reference station observations, in a datalink, etc.), mitigate the effect of the predetermined events (e.g., by removing the observations that include the predetermined events, by scaling the observations that include the predetermined events, etc.), and/or the computing system can process the data in any suitable manner. The computing system may additionally or alternatively manage reference stations or generate virtual reference stations for GNSS receiver(s) based on reference station observations. The computing system may additionally or alternatively serve as an internet gateway to GNSS receivers if GNSS receivers are not internet connected directly. The computing system can be local (e.g., internet-connected general-purpose computer, processor, to a GNSS receiver, to an external system, to a sensor, to a reference station, etc.), remote (e.g., central processing server, cloud, server, etc.), distributed (e.g., split between one or more local and remote systems), and/or configured in any suitable manner.

In a preferred embodiment, the computing system is distributed between a local computing system and a remote computing system (e.g., server system). In a specific example, the local computing system can include a positioning engine and the remote computing system can include a corrections processing engine. However, the local computing system can include both the positioning engine and the corrections processing engine, the server can include both the position engine and the corrections processing engine, the server can include the positioning engine and the local computing system can include the corrections processing engine, and/or the positioning engine and/or corrections processing engine can be distributed between the server and the local computing system. However, the computing system can include any suitable components and/or modules.

The positioning engine 1100 functions to estimate the position of the GNSS receiver 1200 and/or an external system coupled to the GNSS receiver. The positioning engine 1110 preferably takes as input satellite observations (e.g., observation data) from the GNSS receiver 1200 (or other GNSS data source) and corrections (e.g., corrections data) from the corrections processing engine 1500 to generate the estimated position (e.g., position data). However, the positioning engine can additionally or alternatively take sensor data, predetermined event information (e.g., detection of predetermined events, mitigation of predetermined events, probabilities of predetermined events, etc.), reference station observations, satellite observations from other GNSS receivers, and/or any data or information input(s). The positioning engine preferably outputs an estimated position and an integrity of the estimated position (e.g., a protection limit, an integrity risk, etc.). However, the positioning engine can additionally or alternatively output a dead reckoning position, sensor bias, predetermined event (e.g., detection, identity, mitigation, etc.), and/or any suitable data. The positioning engine is preferably communicably coupled to the GNSS receiver, the corrections processing engine, and the sensor(s), but can additionally or alternatively be communicably coupled to reference stations, and/or any suitable component(s).

The position engine preferably performs an error detection on data (e.g., corrections, correction reliability, predetermined event detection, etc.) received from the corrections processing engine. The error detection is preferably based cyclic redundancy checks (CRC) (such as CRC-16, CRC-32, CRC-64, Adler-32, etc.). However, the error detection can be based on a secure hash algorithm (SHA), cryptographic hash functions, Hash-based message authentication code (HMAC), Fletcher's checksum, longitudinal parity check, sum complement, fuzzy checksums, a fingerprint function, a randomization function, and/or any suitable error detection scheme.

In some variants, the corrections received from the corrections processing engine can be invalidated (and/or otherwise unavailable) after a time-out period has elapsed (and no new corrections have been received within the time-out period). The time-out period can be a predetermined duration (e.g., 1, 2, 5, 10, 20, 30, 40, 50, 60, 90, 120, 180, 300, 600, etc. seconds), a random or pseudorandom duration of time, based on the reliability of the corrections, based on a predicted change in the corrections, based on the GNSS receiver (e.g., position, velocity, acceleration, receiver bias, etc.), based on the external system (e.g., level of position integrity required, level of position accuracy required, position, velocity, acceleration, etc.), based on the application, based on the positioning engine (e.g., the ability of the positioning engine to accommodate inaccuracies in the corrections), and/or based on any suitable components. However, any suitable time-out period can be used.

In a specific example, the positioning engine (and/or components of the positioning engine) can perform any suitable method and/or steps of the method as described in U.S. patent application Ser. No. 16/817,196 titled "SYSTEMS AND METHODS FOR REAL TIME KINEMATIC SATELLITE POSITIONING," filed 12 Mar. 2020, which is incorporated herein in its entirety by this reference.

Figure 2:
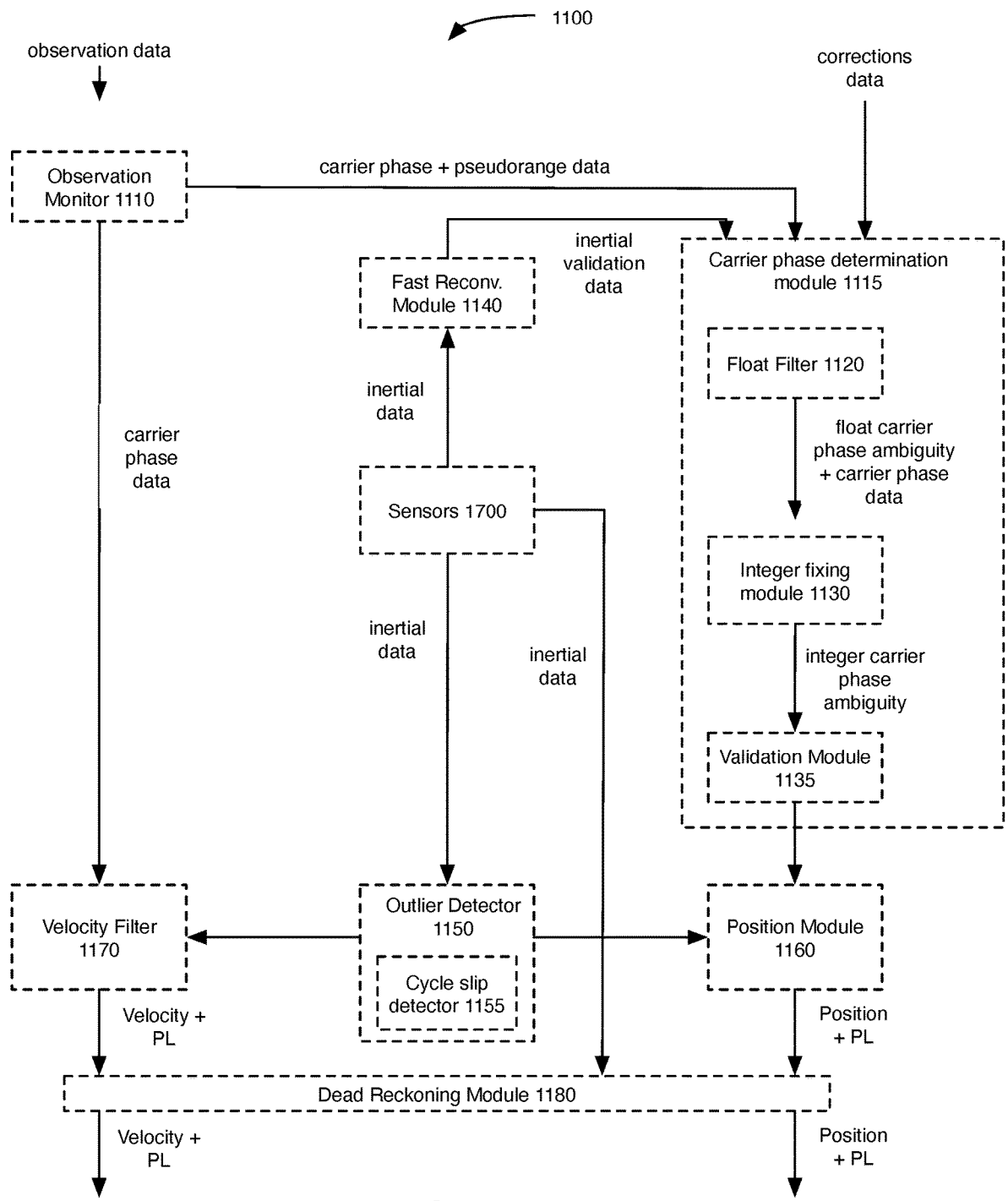
FIG. 2 is a diagram representation of a positioning engine of a system of an invention embodiment.

As shown in FIG. 2, the positioning engine 1100 includes one or more of: an observation module 1110 (e.g., observation monitor), carrier phase determination module 1115, a fast reconvergence module 1140, an outlier detector 1150 (e.g., a cycle slip detector), a position module 1160 (e.g., a fixed-integer position filter), a velocity module 1170 (e.g., a velocity filter), and a dead reckoning module 1180. However, one or more modules can be integrated with each other and/or the positioning engine can include any suitable modules.

Note that the interconnections as shown in FIG. 2 are intended as non-limiting examples, and the components of the positioning engine 1100 may be coupled in any manner.

The observation module 1110 functions to take as input satellite observations (e.g., observations data) from the GNSS receiver(s) 1200 and check them for potential predetermined events and/or outliers (e.g., large errors in pseudorange and/or carrier phase). However, the observation module can additionally or alternatively check the reference station observations, the corrections, the sensor data, and/or any suitable data for predetermined events. The observation module is preferably configured to detect high dynamic predetermined events, but may be configured to detect datalink predetermined events, low dynamic predetermined events, and/or any predetermined events. Potential predetermined events may include any detected issues with observations—observations changing too rapidly, or exceeding thresholds, for example.

The observation module can additionally or alternatively mitigate the effect of the predetermined events and/or transmit a mitigation (e.g., to be applied by an outlier detector, a carrier phase determination module, etc.) for the predetermined events, which functions to reduce the impact of the predetermined event occurrence on the estimated position (and/or any intermediate data in the estimation of the position). In a first specific example, when a predetermined event is detected among the satellite observations, the satellite observation with the predetermined event can be removed from the satellite observations. In a second specific example, when a predetermined event is detected among the satellite observations, the satellite observations can be scaled to decrease and/or remove the effect of the predetermined event. In a third specific example, when a predetermined event is detected among the satellite observations, additional satellite observations can be collected and/or transmitted to mitigate the effect of the predetermined events. In a fourth specific example, when a predetermined event is detected, the associated satellite observation(s) can be corrected (e.g., based on corrections determined from interpolation, secondary sensors, other constellations, etc.). However, any suitable mitigation strategy can be used to mitigate the effects of the predetermined events.

The observation module is preferably communicably coupled to the velocity module and the carrier phase determination module, but can be communicably coupled to the outlier detector, the fast reconvergence module, the dead reckoning module, corrections processing engine, sensor(s), and/or any suitable module. In a specific example, the observation module 1110 provides pseudorange and carrier phase data to the carrier phase determination module (e.g., float position filter 1120) and carrier phase data to the velocity module 1170.

The carrier phase determination module preferably functions to resolve the ambiguity in the carrier phase resulting from an uncertain number of wavelengths having passed before the satellite observations were received by the GNSS receiver. The carrier phase determination module is preferably communicably coupled to the observation module, the corrections processing engine, and the position module. However, the carrier phase determination module can be communicably coupled to the sensor(s), GNSS receiver, outlier detector, the dead reckoning module, the fast reconvergence module, and/or any suitable components. While the carrier phase determination module is preferably not communicably coupled to the velocity module, the carrier phase determination module can be communicably coupled to the velocity module. In a specific example, resolving the carrier phase ambiguity can include determining a real-value carrier phase ambiguity, determining an integer-valued carrier phase ambiguity, testing the integer-valued carrier phase ambiguity, and generating a fixed estimator. However, the carrier phase ambiguity can be resolved in any suitable manner.

In variants, the carrier phase determination module can include a float filter 1120 (e.g., a float position filter) and an integer fixing module 1130 (e.g., an integer ambiguity resolver). However, the carrier phase determination module can include any suitable components.

The float filter 1120 functions to generate a float solution to carrier phase ambiguity for each satellite (e.g., real-valued carrier phase ambiguities) to be used in position estimation. The inputs to the float filter can include corrections (e.g., corrections with a reliability greater than a threshold), satellite observations (e.g., pseudorange, carrier phase, predetermined event mitigated satellite observations, raw satellite observations, etc.), linear combinations of satellite observations, sensor data, and/or any suitable data. The output from the float filter is preferably a real-valued carrier phase ambiguity, but float filter can output the pseudorange or any suitable information. The float filter can determine the real-valued carrier phase ambiguities using a least squares parameter estimation, a recursive least squares parameter estimation, Kalman filter(s), extended Kalman filter(s), unscented Kalman filter(s), particle filter(s), and/or any suitable method for generating the real-valued carrier phase ambiguities.

In a specific example, for a single satellite/receiver pair, the carrier phase measurement at the receiver can be modeled as follows:

$$\phi(t) = \frac{1}{\lambda}(r - I + T) + f(\delta t_r - \delta t_s) + N + \epsilon_\phi$$

where $\lambda$ is the wavelength of the satellite signal, r is the range from the receiver to the satellite, I is the ionospheric advance, T is the tropospheric delay, f is the frequency of the satellite signal, $\delta t_r$ is the receiver clock bias, $\delta t_s$ is the satellite clock bias, N is the integer carrier phase ambiguity, and $\epsilon_\phi$ is a noise term.

The float filter 1120 preferably uses carrier phase data and pseudorange data from the GNSS receiver 1200, along with corrections data from the corrections processing engine 1500, to generate a float ambiguity value (i.e., a solution to the integer carrier phase ambiguity that is not constrained to an integer value). Corrections data is preferably used to reduce the presence of ionospheric, tropospheric, satellite clock bias terms, and/or other signals in carrier phase measurements (e.g., via differencing or any other technique). Additionally or alternatively, the float filter 1120 may generate float ambiguity values in any manner. The float filter 1120 may also generate position and velocity estimates from pseudorange and carrier phase data.

In some cases, the float filter 1120 may refine real-valued carrier phase ambiguities (e.g., float ambiguity values) using inertial data (e.g., as supplied by a sensor).

The integer fixing module 1130 (e.g., integer ambiguity resolver) functions to generate integer-valued carrier phase ambiguities from the real-valued carrier phase ambiguities. The integer fixing module 1130 may generate integer-valued carrier phase ambiguities in any manner (e.g., integer rounding, integer bootstrapping, integer least-squares, etc.). The input to the integer fixing module is preferably the real-valued carrier phase (e.g., from the float filter), but can include the pseudorange, the carrier phase(s), the corrections, the sensor data, previous estimated positions and/or integer-valued carrier phase ambiguities, and/or any suitable information. The output from the integer fixing module is preferably an integer-valued carrier phase ambiguity value, but can include any suitable information. In some variants, generating the integer-valued carrier phase ambiguities can include decorrelating the (real-valued) carrier phase ambiguities. The carrier phase ambiguities can be decorrelated using the LAMBDA method, the MLAMBDA method, LLL reduction algorithm, a whitening transformation, a coloring transformation, a decorrelation transformation, and/or any suitable decorrelation or reduction algorithm.

The system can optionally include a validation module 1135 that functions to validate the integer-valued carrier phase ambiguities generated by the integer fixing module 1130, which functions to determine whether the integer-valued carrier phase ambiguities should be accepted and/or have achieved a threshold quality. Alternatively, the integer-valued carrier phase ambiguities can be validated by the integer fixing module 1130 or any other suitable module. Integer-valued carrier phase ambiguity validation may be performed in any manner (e.g., the ratio test, the f-ratio test, the distance test, the projector test, etc.).

In one variation, the validation module validates integer-valued carrier phase ambiguities in a multi-step process. Each step of the multi-step process preferably corresponds to increased confidence in the integer-valued carrier phase ambiguities (e.g., the integrity of the estimated position calculated using the validated integer-valued carrier phase ambiguities), but can additionally or alternatively be associated with different integrity levels, validation performance levels, and/or another integrity metric. Each step of the multi-step validation process can correspond to an amount of time required to validate (and/or determine) the integer-valued carrier phase ambiguity, an integrity (e.g., TIR, protection level, etc.) of the estimated position, a probability of the integer-valued carrier phase ambiguity being correct, and/or any suitable quality. Each step (and/or the number of steps) can depend on the satellite observations (e.g., number of satellite observations, number of satellite constellations, number of satellites corresponding to each satellite constellation, quality of the satellite observations, predetermined events in the satellite observations, etc.), the real-valued carrier phase ambiguity, the pseudo range, the external system, the application of the estimated position, the integrity (and/or target integrity) of the estimated position, the amount of time required to achieve a validation, the sensor (e.g., sensor type, sensor number, sensor data, etc.), and/or any suitable parameter. The number of steps (and/or steps to use) can be selected based on: the operation context (e.g., the integrity level for a given operation context), the available input data, the amount of available validation time, and/or otherwise determined. Alternatively, all steps can always be performed. Preceding steps are preferably always performed before succeeding steps, but one or more steps can be skipped or performed in a different order.

The multi-step process can include at least three steps (e.g., 3 steps, 4 steps, 5 steps, 10 steps, etc.), but can additionally or alternatively include two steps and/or any suitable number of steps.

In a first illustrative example, integer-valued carrier phase ambiguities that have not been validated to the first validation step can correspond to a low integrity (e.g., a non-safety of life integrity) estimated position such as $TIR \geq 10^{-4}$/hour. In this illustrative example, integer-valued carrier phase ambiguities that have been validated to the first validation step, but not to the second validation level can correspond to an integrity risk of the estimated position $\leq 10^{-4}$/hour and a protection level of $\leq 2$ m. In this illustrative example, integer-valued carrier phase ambiguities that have been validated to the second validation step, but not to the third validation step can correspond to an integrity risk of the estimated position $\leq 10^{-6}$/hour and a protection level of $\leq 2$ m. In this illustrative example, integer-valued carrier phase ambiguities that have been validated to the third validation step can correspond to an integrity risk of the estimated position $\leq 10^{-7}$/hour and a protection level of $\leq 3$ m. However, the integrity risk and/or protection level of the estimated position can be any suitable value (such as $\leq 10^{-2}$/hour, $\leq 10^{-3}$/hour, $\leq 10^{-4}$/hour, $\leq 10^{-5}$/hour, $\leq 10^{-6}$/hour, $\leq 10^{-7}$/hour, $\leq 10^{-8}$/hour, $\leq 10^{-9}$/hour, $\leq 10^{-2}$/hour, $\geq 10^{-3}$/hour, $\geq 10^{-4}$/hour, $\geq 10^{-5}$/hour, $\geq 10^{-6}$/hour, $\geq 10^{-7}$/hour, etc. and/or 0.1 m, 0.2 m, 0.5 m, 1 m, 2 m, 3 m, 5 m, 10 m, 20 m, 40 m, etc. respectively) for integer-valued carrier phase ambiguities at each validation step. The integrity risk and/or protection level associated with each step can be determined using simulations (e.g., Monte Carlo simulations), based on historical data (e.g., pattern matching), heuristics, neural networks, and/or otherwise determined.

In a second illustrative example, integer-valued carrier phase ambiguities that have not been validated to the first validation step can be output immediately (e.g., within <1 s, <2 s, <5 s, <10 s, etc.) of start-up. In this illustrative example, integer-valued carrier phase ambiguities that have been validated to the first validation step, but not to the second validation level can be generated within 30 s of start-up of the positioning engine. In this illustrative example, integer-valued carrier phase ambiguities that have been validated to the second validation step, but not to the third validation step can be generated within 90 s of start-up of the positioning engine. In this illustrative example, integer-valued carrier phase ambiguities that have been validated to the third validation step can be generated within 300 s of start-up of the positioning engine. However, the integer-valued carrier phase ambiguities at each validation step can correspond to any suitable amount of time (e.g., relative to the start of positioning engine, relative to continuous operation of the positioning engine, relative to previous validation steps, etc.).

In a third illustrative example, the validation module may validate, in the first step, integer ambiguities for at least two satellite constellations (e.g., GPS and Galileo, GPS and GLONASS, GPS and BDS, Galileo and GLONASS, Galileo and BDS, GLONASS and BDS, etc.) simultaneously. In the first step, the validation module preferably applies the same corrections to each of the satellite observations, but can apply regional-offset modified corrections, different corrections for each satellite (e.g., based on the satellite constellations), and/or any suitable corrections. In a second step, the validation module may validate (in parallel or sequentially) the satellite observations corresponding to a first satellite constellation independently of those corresponding to a second satellite constellation. If the calculated ambiguity corresponds to (e.g., matches) that of the first step, confidence is increased. Note that these validations for different satellite constellations may be performed using the same or different corrections (e.g., corrections to satellite observations a particular satellite constellation may be modified by a residual regional offset). Likewise, a third step of repeating one or more, such as two, additional consecutive validations for each constellation (e.g., satellite observations corresponding to consecutive time periods, consecutive epochs, the same time period, the same epoch, etc.) may further increase confidence in calculated integer ambiguity values. However, in the first, second, and/or third step, integer-valued carrier phase ambiguities corresponding to three or more satellite constellations, subsets of satellites within one or more satellite constellations (e.g., validating integer-valued carrier phase values for satellite observations for each satellite from a single satellite constellation, validating integer-valued carrier phase values for satellite observations for a first subset of satellites and a second subset of satellites corresponding to a single satellite constellation, validating integer-valued carrier phase values for satellite observations for each satellite from a plurality of satellite constellations, etc.), and/or any suitable satellite observations can be validated and/or validated any suitable number of times.

In each step, when the validations fail (e.g., the ambiguities do not match the respective reference ambiguity), the underlying observations can be removed from the set of observations used to determine the position, the position determination can be restarted, certain external system functions (e.g., associated with the invalid step or associated integrity level) can be selectively deactivated, and/or other mitigation actions can be taken.

In cases where multiple satellite constellations are used, the ability to generate independent corrections data may enable the integer fixing module to resolve two independent solutions for integer ambiguity, which in turn can increase the ability to provide high-integrity positioning.

In specific examples, the validation module can validate satellite observations and/or subsets (e.g., one or more steps of a multistep validation) thereof by performing hypothesis testing (and related steps) as described in U.S. patent application Ser. No. 16/817,196 titled "SYSTEMS AND METHODS FOR REAL TIME KINEMATIC SATELLITE POSITIONING," filed 12 Mar. 2020, which is incorporated herein in its entirety by this reference.

However, a single-step validation process can be used.

The integer-valued carrier phase ambiguities are preferably transmitted to the position module 1160 for position estimation after the integer-valued carrier phase ambiguities have been validated to in at least one validation step, but the integer-valued carrier phase ambiguities can transmitted to the position module 1160 for position estimation before or during the integer-valued carrier phase ambiguities validation, at any other suitable time, and/or to any other suitable endpoint.

The fast reconvergence module 1140 functions to provide robustness in the event of short GNSS service interruptions based on inertial data (e.g., as provided by an inertial measurement unit (IMU)) and/or other non-GNSS sourced data (e.g., wheel odometer data, visual odometry data, image data, RADAR/LIDAR ranging data). For example, the fast reconvergence module 1140 may provide the carrier phase determination module 1115 with estimated carrier phase ambiguity (e.g., real-valued carrier phase ambiguity, integer-valued carrier phase ambiguity, etc.) based on previously estimated values and inertial/other data captured during a GNSS service interruption. In one implementation, the fast reconvergence module 1140 may, after resumption of valid GNSS messages, difference GNSS data and compare the difference to an estimate of change in position calculated using inertial and/or other data, and from this comparison, calculate a fast estimate of integer ambiguity change (which can be added to an older integer ambiguity estimate to produce an estimate of the current integer ambiguity). This estimate can then speed the process of re-establishing validated positioning data. However, the system can otherwise quickly reconverge on the carrier phase integer ambiguity after GNSS service resumption.

The outlier detector 1150 functions to detect outliers, predetermined events (such as multipath error, cycle slips, etc.), and/or erroneous measurements within the data (e.g., satellite observations, sensor data, reference station observations, corrections, etc.). The outlier detector is preferably communicably coupled to the velocity module, the position module, the sensor(s), and the observation module, but can be communicably coupled to the corrections processing engine, the carrier phase determination filter, the fast reconvergence module, the dead reckoning module, and/or any suitable module. The inputs to the outlier detector can include: sensor data, satellite observations, corrections, previous estimated positions and/or velocities, reference station observations, and/or any suitable data or information. The outputs from the outlier detector can include: identification of predetermined events (e.g., identifying the presence of predetermined events, identifying the type of predetermined event, etc.), mitigation(s) for predetermined events, mitigated satellite observations (e.g., satellite observations that have been corrected to account for and/or remove the predetermined events, outliers, and/or erroneous measurements), and/or any suitable data or information. Mitigating the effect of the outlier(s) and/or predetermined event(s) can include removing one or more satellite observations from the set of satellite observations, weighting satellite observations with predetermined events differently from satellite observations without predetermined events, applying a correction to remove the predetermined event from the satellite observation, and/or any suitable steps.

In variants, the outlier detector can perform the method and/or any steps of the method as disclosed in U.S. patent application Ser. No. 16/748,517 titled "SYSTEMS AND METHODS FOR REDUCED-OUTLIER SATELLITE POSITIONING" filed 21 Jan. 2020, which is herein incorporated in its entirety by this reference. However, the outlier detector can function in any suitable manner.

In a specific example, the outlier detector can include a cycle slip detector 1155, which functions to detect potential cycle slips in carrier phase observations (i.e., a discontinuity in a receiver's continuous phase lock on a satellite's signal). The cycle slip detector 1155 preferably detects cycle slips by examining linear combinations of carrier phase observations (e.g., by calculating phase measurement residuals and comparing those residuals to integer multiples of full phase cycles), but may additionally or alternatively utilize sensor data (e.g., inertial data) to detect cycle slips (e.g., when carrier phase ambiguity changes rapidly but inertial data does not show rapid movement, that may be indicative of a cycle slip). When a cycle slip is detected in a given observation, the cycle slip detector 1155 preferably discards that observation (making it unavailable for position calculation). Alternatively, the cycle slip detector 1155 may respond to cycle slip detections in any manner (e.g., weighting the observation less in position calculations, attempting to correct the cycle slip in the observation, etc.).

The position module 1160 functions to calculate a position estimate for the GNSS receiver 1200. The position estimate is preferably determined based on the carrier phase ambiguities with the ambiguities removed (e.g., integer-valued or real-valued), but can additionally or alternatively be determined based on sensor data (e.g., IMU data, INS data, etc.), real-valued carrier phase ambiguities, pseudorange, integer-valued carrier phase ambiguities (e.g., calculated by the integer fixing module 1130), and/or any suitable data. In variants, this position estimate can have an accuracy dependent on the correction accuracy (e.g., of the corrections processing engine), such as less than 50 cm, 3 sigma, but can alternatively have any other suitable accuracy. This is possible because carrier phase measurements are far more accurate than pseudorange measurements (e.g., 100 times more accurate), and have a noise below centimeter level. The position module is can be communicably coupled to the sensor(s), dead reckoning module, outlier detector, carrier phase determination module, observation module, fast reconvergence module, corrections processing engine, and/or any suitable component. The position module is preferably not communicably coupled to the velocity module, but can be communicably coupled to the velocity module.

The position module can additionally or alternatively calculate integrity (e.g., integrity risk, protection levels or a mathematically similar error estimate, etc.) for the estimated position. The position module 1160 preferably utilizes a modified form of the Advanced Receiver Advanced Integrity Monitoring (ARAIM) algorithm to perform protection level generation (and fault detection). ARAIM techniques are based on a weighted least-squares estimate performed in a single epoch. Traditionally, ARAIM techniques are performed using pseudorange calculations; however, the position module 116o preferably utilizes a modified form of the ARAIM algorithm that takes only carrier phase measurements as input. The position module may, using this algorithm, mitigate predetermined events such as code carrier incoherency, satellite clock step error, and satellite clock drift. However, the position module can utilize Receiver Advanced Integrity Monitoring (RAIM) algorithm, Aircraft Advanced Integrity Monitoring (AAIM), Multiple solution Separation (MSS) algorithms, Relative Receiver Advanced Integrity Monitoring (RRAIM), Extended Receiver Advanced Integrity Monitoring (ERAIM), and/or any suitable algorithms to calculate the integrity of the estimated position and/or to mitigate the effect of predetermined events.

In a specific example, the position module 1160 calculates the estimated position (and associated protection levels) based only on carrier phase observation data (not on pseudorange observation data), which limits the effect of certain predetermined events such as pseudorange multipath on the estimated position and/or the integrity of the estimated position.

In variants, the position module can additionally or alternatively perform any suitable transformation (e.g., rotation, scaling, translation, reflection, projection, etc.) on the estimated position of the GNSS receiver to determine an estimated position of the external system.

The optional velocity module 1170 functions to estimate a velocity of the GNSS receiver 1200 (and/or external system) and additionally to calculate an integrity (e.g., TIR, protection levels or a mathematically similar error estimate, etc.) for the estimated velocity. Alternatively, the vehicle velocity can be determined from the timeseries of positions output by the position module, determined from inertial sensor measurements, or otherwise determined. The velocity module 1170 preferably estimates the velocity using time differenced carrier phase measurements, but can use Doppler shift data, sensor data, pseudorange, differential estimated position (e.g., as estimated by the position module at two or more time points and/or epochs) and/or estimated velocity in any manner. The velocity module preferably receives the carrier phase data from the observation module, but can receive the carrier phase data (e.g., real-valued carrier phase ambiguities, integer-valued carrier phase ambiguities, etc.) from the carrier phase determination module, the fast reconvergence module, and/or from any suitable module. The velocity module is preferably communicably coupled to the observation module and the outlier detection module, but can additionally or alternatively be communicably coupled to the carrier phase determination module, the dead reckoning module, the position module, the corrections processing engine, and/or to any suitable module.

The estimated velocity can be the relative velocity (e.g., between epochs), the instantaneous velocity, the average velocity, the instantaneous speed, the relative speed, the average speed, and/or any suitable velocity.

In some variants, the estimated velocity can be used to estimate the track angle (e.g., the direction of motion of the GNSS receiver and/or external system). In a specific example, the track angle can be estimated based on the horizontal component of the estimated velocity using trigonometric relations. However, the track angle can be determined in any suitable manner.

Like the position module 1160, the velocity module 1170 preferably utilizes a modified form of the Advanced Receiver Advanced Integrity Monitoring (ARAIM) algorithm to perform estimated velocity integrity (e.g., TIR, protection level, etc.) generation (and fault detection). Traditionally, ARAIM techniques are performed using pseudorange calculations; however, the velocity module 1170 preferably utilizes a modified form of the ARAIM algorithm that takes only carrier phase measurements as input (e.g., similar to or different from the position module 1160). The velocity module 1170 may, using this algorithm, mitigate predetermined events such as code carrier incoherency, satellite clock step error, satellite clock drift, jumps, accelerations, and/or other satellite feared events. However, the velocity module can utilize Receiver Advanced Integrity Monitoring (RAIM) algorithm, Aircraft Advanced Integrity Monitoring (AAIM), Multiple solution Separation (MSS) algorithms, Relative Receiver Advanced Integrity Monitoring (RRAIM), Extended Receiver Advanced Integrity Monitoring (ERAIM), and/or any suitable algorithms to calculate the integrity of the estimated velocity and/or to mitigate the effect of predetermined events.

In some variants, the velocity module 1170 may include an ionospheric bias monitor; when ionospheric bias exceeding a threshold is detected for a given satellite, that satellite may be excluded from velocity solution generation. Alternatively, the velocity module 1170 can share the ionospheric bias monitor with the position module 1160, with the corrections processing engine, and/or with any other suitable system. The ionospheric bias monitor of the velocity module 1170 may monitor ionospheric conditions in any manner; for example, the monitor may measure a change in ionospheric delay using a linear combination of dual frequency carrier phase measurements. For example, when the measured ionospheric delay in the signal from a satellite changes more rapidly than some threshold (or crosses some threshold), some measurements from that signal may be excluded. The threshold can be a predetermined threshold (e.g., greater than about 0.5%, 1%, 5%, 10%, 20%, 25%, 30%, 40%, 50%, 60%, 75%, 80%, 90%, 100%, etc. change over a time period such as a 1, 2, 5, 10, 20, 30, 50, 100, 1000, etc. epochs, 1 s, 5 s, 10 s, 20 s, 50 s, 100 s, 200 s, 300 s, 600 s, etc.), depend on the estimated velocity, depend on the satellite observations (e.g., satellite constellations, number of satellites, satellite frequencies and/or frequency combinations, etc.), depend on the application, depend on the external system, depend on the estimated position, depend on the integrity of the estimated velocity, and/or any suitable threshold.

The dead reckoning module 1180 functions to provide dead reckoning navigation solutions when position and/or velocity data is unavailable (e.g., because a protection level exceeds an alert limit, one or more satellites observations are not available, a datalink threat has occurred, corrections data has timed out, etc.), when the position data falls below a predetermined integrity or confidence threshold, and/or otherwise used. The dead reckoning module 1180 may provide dead reckoning position and/or velocity as a replacement for or supplement to GNSS-estimated positions and/or velocities (e.g., estimated by the position module and/or velocity module) using sensor data (e.g., IMU data), the last known position (e.g., having a predetermined integrity level), and/or any suitable data (e.g., extrapolation based on prior estimated positions and velocities). In a specific example, the dead reckoning position (and/or velocity) can be used as the estimated position (and/or velocity) when the position module (and/or velocity module) are unable to converge and/or determine an estimated position (and/or velocity). The position module (and/or velocity module) may be unable to converge and/or determine an estimated position (and/or velocity), for instance, when the integer-valued carrier phase ambiguity is not validated (e.g., to a predetermined integrity level), when one or more satellite observations are not available (e.g., GNSS receiver outage, obstruction, etc.), when one or more reference station observations are unavailable, when predetermined events are detected, when the datalink times out, based on a user input, and/or at any suitable time.

The dead reckoning module can be communicably coupled to the position module, the velocity module, the outlier detector, the fast reconvergence module, the observation module, the carrier phase determination module, the sensors, the corrections processing engine, and/or any suitable component.

Figure 6A:
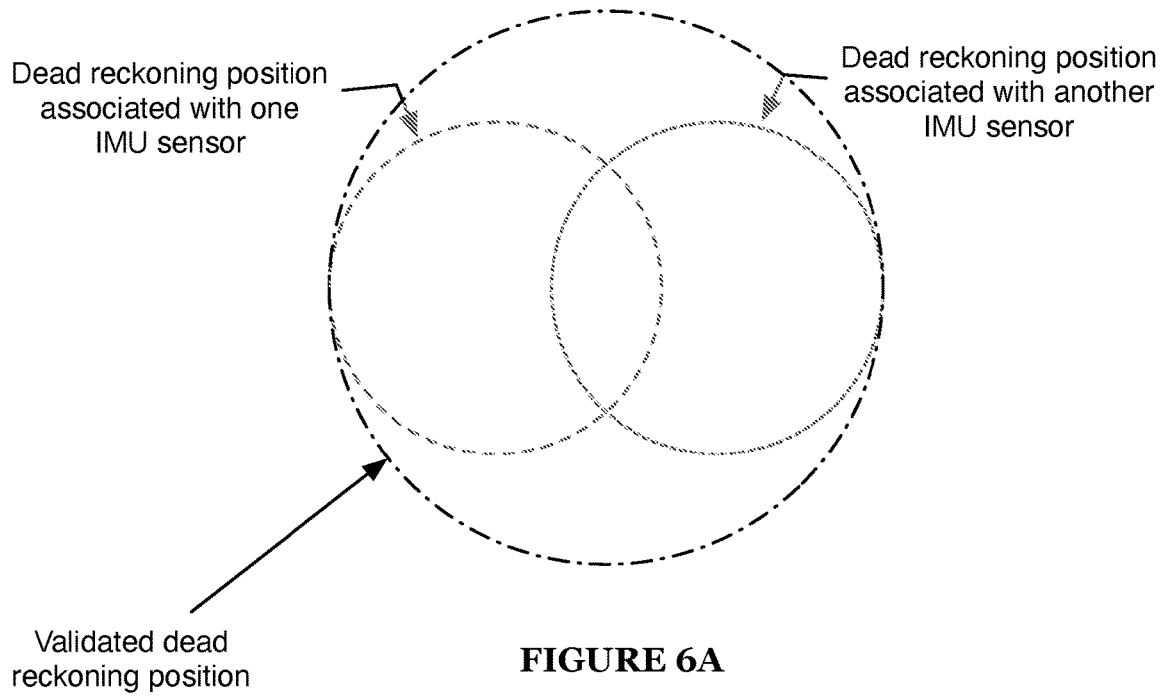
FIGS. 6A and 6B are schematic representations of examples of validating a dead reckoning position.
Figure 6B:
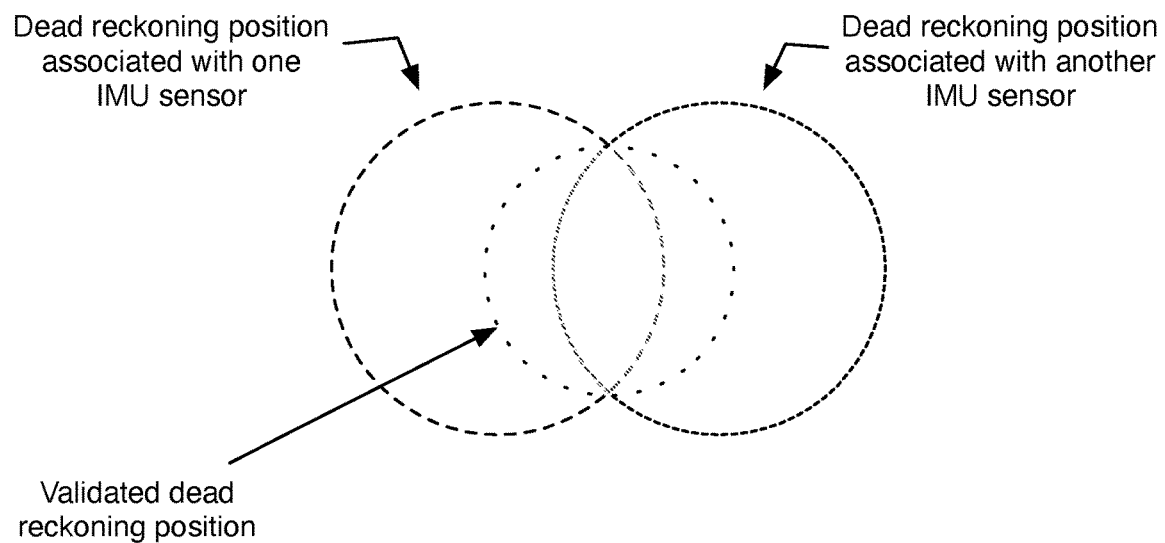

The dead reckoning position and/or velocity is preferably validated, but can be unvalidated. The dead reckoning position and/or velocity is preferably validated by comparing the dead reckoning position and/or velocity determined from two or more independent sensors. In a specific example, as shown in FIG. 6A, the validated dead reckoning position and/or velocity is preferably the position and/or velocity that bounds the overlapping position and/or velocities between the dead reckoning position and/or velocity determined based on data from a first sensor and the dead reckoning position and/or velocity determined by a second sensor. In a second specific example, as shown in FIG. 6B, the validated dead reckoning position and/or velocity is preferably the position and/or velocity that bounds the dead reckoning position and/or velocity determined based on data from a first sensor and the dead reckoning position and/or velocity determined by a second sensor. However, the validated dead reckoning position and/or velocity can be the overlapping region, a position and/or velocity that bounds all of the dead reckoning positions and/or velocities (e.g., surrounds, encompasses, matches the limits of, etc.) and/or any suitable position and/or velocity can be used. However, the dead reckoning position and/or velocity can be validated based on modelling, satellite observations (e.g., when a set or a subset of satellite observations are available the estimated position and/or velocity from those satellite observations can be used to validate the dead reckoning position and/or velocity), based on auxiliary sensors (e.g., LIDAR, RADAR, ultrasonic sensors, camera(s), etc.), based on communication with other systems (e.g., when other external systems are present), based on reference station observations, and/or in any suitable manner.

The dead reckoning module can additionally or alternatively function to estimate and/or determine the bias of one or more sensors. The bias is preferably determined based on comparing the dead reckoning position and/or velocity to the estimated position and/or velocity determined based on the satellite observations (e.g., determined by the position module and/or the velocity module). However, the bias can be determined by calibration, modeling of the sensor(s), auxiliary sensors, and/or be otherwise determined.

Figure 13:
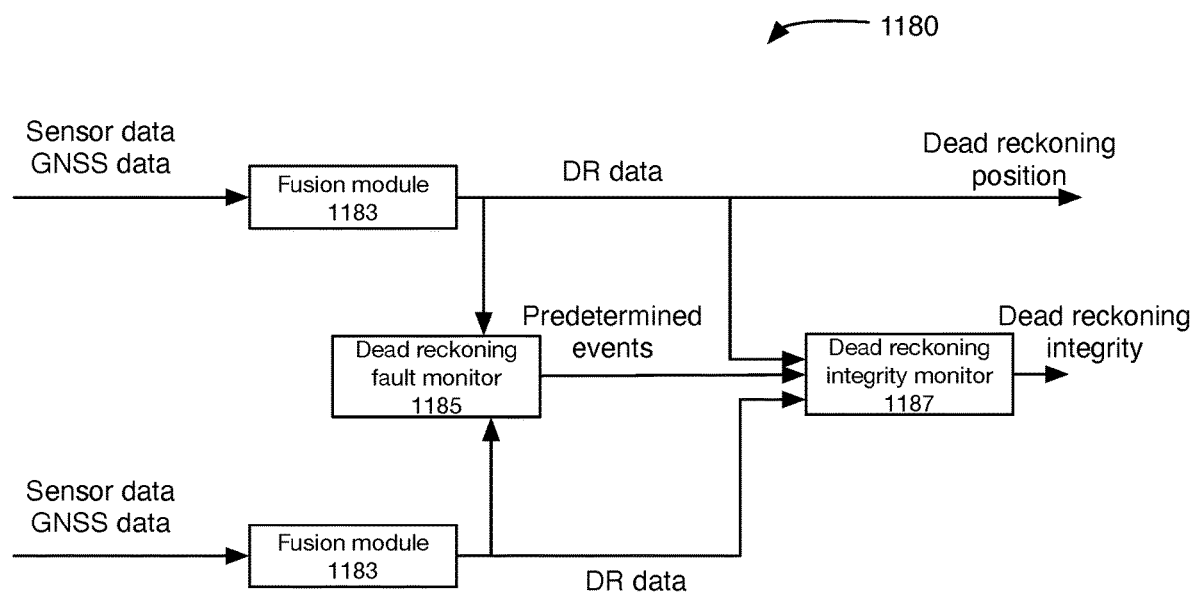
FIG. 13 is a schematic representation of an example of a dead reckoning module.
Figure 14:
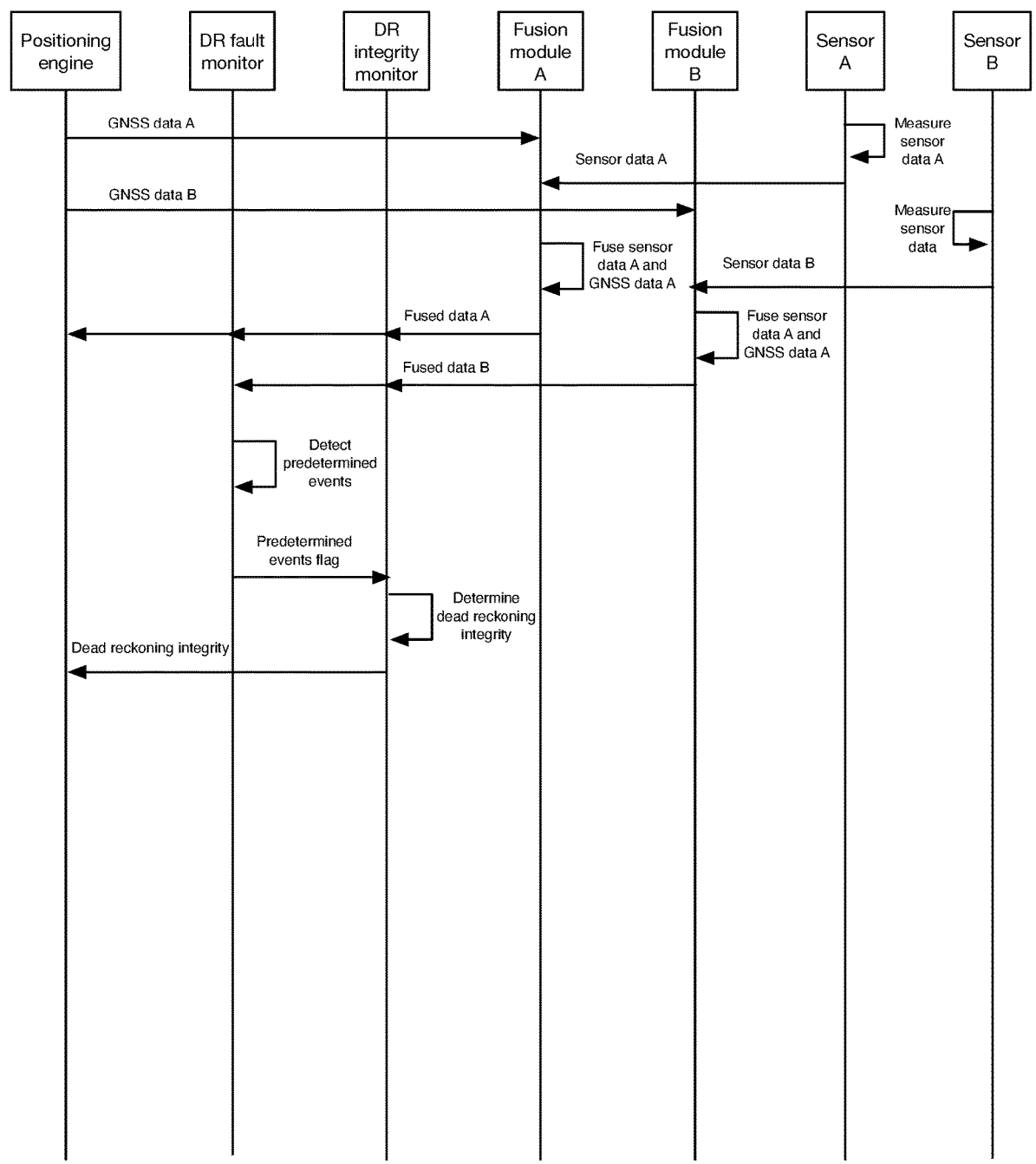
FIG. 14 is a schematic representation of an example flow path for determining a dead reckoning position.

In variants, as shown in FIG. 13, a dead reckoning module can include one or more: fusion module 1183, dead reckoning monitor 1185, and/or dead reckoning integrity monitor 1187. However, a dead reckoning module can include any suitable module(s).

The fusion module functions to estimate the receiver position (e.g., when GNSS signals are not available, when GNSS signals are available, etc.) and/or the integrity of the estimated position. Inputs to the fusion module can include: sensor data (e.g., accelerometer data, gyroscope data, validated sensor data, time-stamps, etc.), estimated GNSS position (e.g., the last available GNSS position, most recent GNSS position, etc.), estimated GNSS position integrity (e.g., protection level, TIR, etc.), estimated GNSS velocity (e.g., the last available GNSS velocity, most recent GNSS velocity, etc.), estimated GNSS velocity integrity (e.g., protection level, TIR, etc.), GNSS covariance matrices (e.g., GNSS position covariance, GNSS velocity covariance, etc.), and/or other inputs. Outputs from the fusion module can include: estimated fused position (e.g., absolute estimated position; relative estimated position such as relative to the last available GNSS position, last available position estimate, etc.; etc.), estimated fused velocity (e.g., absolute estimated velocity; relative estimated velocity such as relative to the last available GNSS velocity, last available velocity estimate, etc.; etc.), fused covariance (e.g., estimated position covariance, estimated velocity covariance, etc.), updated integrity (e.g., protection level, TIR, etc. estimated for the estimated fused position and/or estimated fused velocity), and/or other outputs. The fusion module can determine the outputs using one or more of: an alignment algorithm (e.g., strapdown inertial navigation system (SINS)), zero velocity update (ZUPT) algorithm, constant velocity update (CUPT), step-wise algorithm, zero-angular rate update (ZARU) algorithm, heuristic heading reduction, Earth Magnetic Yaw method, Kalman filter, extended Kalman filter, particle filters, and/or any algorithm(s).

The dead reckoning module can include one fusion module, a plurality of fusion modules (e.g., one fusion module per sensor, more than one fusion module per sensor, less than one fusion module per sensor, etc.), and/or any suitable number of fusion modules.

In variants including more than one fusion module, the fusion modules are preferably independent (e.g., operate on different data inputs, generate independent data outputs, use different algorithms, etc.), but can be dependent (e.g., operate on the same inputs, include a subset of inputs that are the same and a subset of inputs that are different, use the same algorithms, etc.). In a specific example, the dead reckoning module can include two fusion modules. The first fusion module can receive sensor data from a first subset of sensor data (e.g., associated with a first sensor) and an estimated position determined based on a first subset of satellite signals (e.g., associated with a first satellite constellation, associated with a specific subset of satellites, etc.). The second fusion module can receive a second subset of sensor data (e.g., from a second sensor that is independent of the first sensor, a distinct subset of sensor readings, etc.) and an estimated position determined based on a second subset of satellite signals (e.g., associated with a second satellite constellation, associated with a distinct subset of satellites, etc.). However, the fusion modules can use any suitable set or subsets of data.

The dead reckoning monitor functions to detect predetermined events (e.g., faults) in the estimated fused data (e.g., estimated fused position, estimated fused velocity, estimated fused covariance, estimated fused integrity, etc. such as from the fusion module(s)). The dead reckoning monitor preferably receives estimated fused data from at least two fusion modules (e.g., two sets of independent estimated fused data), but can additionally or alternatively receive estimated fused data from a single fusion module (e.g., at one or more time points), estimated GNSS position (e.g., last available GNSS position, historic GNSS position, unvalidated GNSS position, etc.), estimated GNSS velocity (e.g., last available GNSS velocity, historic GNSS velocity, unvalidated GNSS velocity, etc.), GNSS integrity (e.g., last available GNSS position and/or velocity integrity, historic GNSS integrity, etc.), and/or any suitable inputs. The dead reckoning monitor can transmit (e.g., output) one or more flags (e.g., use or don't use, safe or not safe, etc.) relating to the state of the dead reckoning position, but can transmit an achievable integrity (e.g., of the estimated dead reckoning position, of the estimated dead reckoning velocity, etc.), an error (e.g., standard deviation, variance, etc.), a confidence interval, and/or any suitable output. The outputs can be generated using an interacting multiple model (IMM) filter, particle filters, extended Kalman filters, comparing one or more inputs to a threshold, and/or using any suitable technique. However, the dead reckoning monitor can additionally or alternatively identify predetermined events, mitigate an effect of the predetermined events, and/or perform any suitable steps.

In a specific example, the dead reckoning monitor can compare a first set of estimated fused data to a second set of estimated fused data. When the overlap (e.g., position overlap, velocity overlap, etc.) between the two sets of fused data is greater than or equal to a threshold, the dead reckoning monitor can output a use flag. When the overlap between the two sets is less than (or equal to) a threshold, the dead reckoning filter can output a don't use flag. However, the dead reckoning monitor can generate outputs in any manner.

The dead reckoning integrity monitor functions to determine (e.g., estimate, calculate, etc.) the integrity of the dead reckoning position (and/or velocity). The dead reckoning integrity monitor can receive: estimated fused data (e.g., from a single fusion module, from a plurality of fusion modules, etc.), estimated GNSS position (e.g., last available GNSS position, historic GNSS position, unvalidated GNSS position, etc.), estimated GNSS velocity (e.g., last available GNSS velocity, historic GNSS velocity, unvalidated GNSS velocity, etc.), GNSS integrity (e.g., last available GNSS position and/or velocity integrity, historic GNSS integrity, etc.), one or more outputs from a dead reckoning monitor (e.g., flags, uncertainty, achievable integrity, etc.), and/or any suitable input. The dead reckoning integrity monitor preferably determines (e.g., based on the input(s)) an integrity of the dead reckoning position and/or velocity (e.g., horizontal protection level, vertical protection level, TIR, alert limit, etc.), but can determine any suitable output. The integrity of the dead reckoning position can be determined based on the overlap between the dead reckoning position and/or velocity (e.g., estimated fused position, estimated fused velocity, etc.); the estimated fused data (e.g., the estimated fused data with higher integrity, the estimated fused data with lower integrity, etc.); for example as described for "positioning platform definition for train control and ETC" and/or "monitoring the integrity of the hybridized solutions" as described in Philippe Brocard, "Integrity monitoring for mobile users in urban environment," Signal and Image processing, INP DE TOULOUSE, 2016, English incorporated herein in its entirety by this reference; as shown for example in FIGS. 6A and 6B; and/or in any suitable manner.

The GNSS receiver 1200 functions to receive a set of satellite observations corresponding to signals transmitted from one or more positioning satellites (preferably at least 4, but alternatively any number). The satellites preferably correspond to at least two satellite constellations (e.g., GPS, BDS, GLONASS, Galileo), but can correspond to one satellite constellation. These satellite observations (e.g., pseudorange, carrier phase, Doppler measurements, C/Mo measurements, etc. for each satellite) are preferably processed by the positioning engine 1100 to obtain an estimated position of the receiver 1200 (as described in previous sections). The GNSS receiver 1200 may additionally or alternatively transmit data to the corrections processing engine to be used in corrections generation.

The GNSS receiver 1200 is preferably coupled to an antenna made of a conductive material (e.g., metal). Antennas may additionally or alternatively include dielectric materials to modify the properties of the antennas or to provide mechanical support.

The antennas may be of a variety of antenna types; for example, patch antennas (including rectangular and planar inverted F), reflector antennas, wire antennas (including dipole antennas), bow-tie antennas, aperture antennas, loop-inductor antennas, and fractal antennas. The antennas can additionally include one or more type of antennas, and the types of antennas can include any suitable variations. The antenna structure may be static or dynamic (e.g., a wire antenna that includes multiple sections that may be electrically connected or isolated depending on the state of the antenna). Antennas may have isotropic or anisotropic radiation patterns (i.e., the antennas may be directional). If antennas are directional, their radiation pattern may be dynamically alterable; for example, an antenna substantially emitting radiation in one direction may be rotated so as to change the direction of radiation.

If the GNSS receiver 1200 couples to multiple antennas, an antenna coupler may split power between them using a splitter; additionally or alternatively, the antenna coupler may include a switch to select between the multiple antennas, or the antenna coupler may couple to the antennas in any suitable manner.

The GNSS receiver 1200 may include a front-end module that converts signals received at the antenna digital baseband signals for processing. The front-end module preferably includes an analog-to-digital converter (e.g., the Maxim MAX2769) capable of operating at high sample rates. The front-end module is preferably capable of receiving L1 GPS, GLONASS, Galileo, and SBAS signal bands. The front-end module may additionally or alternatively be capable of receiving additional bands (e.g., L2 GPS) or the receiver 1200 may include multiple front-end modules for different bands.

The GNSS receiver 1200 may additionally include a satellite signal management module that functions to perform satellite signal tracking and acquisition. The satellite signal management module may additionally or alternatively include programmable digital notch filters for performing continuous wave noise nulling. The satellite signal management module preferably includes flexible and fully programmable correlators that may be used by a microcontroller to implement tracking loops and acquisition algorithms.

In a specific example, a GNSS receiver can measure satellite observations for at least three satellite constellations (e.g., GPS, Galileo, BDS, GLONASS, etc.). However, the GNSS receiver can measure satellite observations for one or two satellite constellations. In this specific example, the GNSS receiver preferably receives the satellite observations for at least 3 satellite constellations simultaneously, but can receive the satellite observations sequentially and/or in any order. In this specific example, the GNSS receiver preferably receives at least two frequencies (e.g., L1, L2, L5, E1, E5a, E5b, E6, etc.) for one or more of the satellite constellations, but can receive a single frequency for each satellite constellation. In this specific example, the GNSS receiver is preferably able to track at least 24 satellites, but can track any number of satellites. In this specific example, the GNSS receiver preferably detects (and identifies) unresolved pseudorange code ambiguities. In this specific example, the GNSS receiver preferably detects (and identifies) unresolved half-cycled carrier phase ambiguities. In this specific example, the GNSS receiver preferably detects (and identify) RF interference exceeding a threshold (e.g., 1 dB, 5 dB, 10 dB, 30 dB, 50 dB,) in frequency bands of interest. In this specific example, the GNSS receiver preferably detects (and identifies) spoofing attempts (e.g., for the satellite observations, for the corrections, etc.). In this specific example, the probability of unidentified cycle slip in the GNSS receiver is preferably at most about $10^{-1}$ per hour (e.g., in open sky conditions). In this specific example, the probability of a GNSS receiver pseudorange measurement error greater than 10 m is less than 1/hour/satellite (e.g., in open sky environment). Each satellite observation is preferably independent (e.g., of satellite observations corresponding to different satellites). For instance, the failure to observe a satellite observation from a given satellite should not trigger a predetermined event in another satellite. In this specific example, the GNSS receiver reacquisition time for carrier phase after a GNSS signal outage is preferably at most 6 seconds for the GPS L1 C/A signal. In this specific example, the GNSS receiver reacquisition time for carrier phase after a GNSS signal outage is preferably at most 2 seconds for the GPS L2C signal. In this specific example, the GNSS receiver reacquisition time for carrier phase after a GNSS signal outage is preferably at most 2 seconds for the Galileo E1 signal. In this specific example, the GNSS receiver reacquisition time for carrier phase after a GNSS signal outage is preferably at most 2 seconds for the Galileo E5b signal. In this specific example, the GNSS receiver reacquisition time of pseudorange after a GNSS signal outage is preferably at most 1 second for the GPS L1 C/A signal. In this specific example, the GNSS receiver reacquisition time of pseudorange after a GNSS signal outage is preferably at most 1 seconds for the GPS L2C signal. In this specific example, the GNSS receiver reacquisition time of pseudorange after a GNSS signal outage is preferably at most 1 second for the Galileo E1 signal. In this specific example, the GNSS receiver reacquisition time of pseudorange after a GNSS signal outage is preferably at most 1 second for the Galileo E5b signal. In this specific example, the GNSS receiver preferably measures carrier phase with at most 1-sigma carrier phase measurement noise of 0.005 cycles (e.g., in open sky conditions).

However, the GNSS receiver can meet any specifications and/or measure any suitable satellite observations.

The corrections processing engine 1500 functions to generate corrections (e.g., correction data) to be used by the positioning engine 1100 (and/or the GNSS receiver 1200). The corrections are preferably used to improve the accuracy and/or integrity of the estimated position and/or velocity. The corrections may take the form of PPP corrections, RTK corrections, Satellite-Based Augmentation System (SBAS) corrections, or any other type of corrections. The corrections can be used to correct the satellite observations (e.g., as measured by the GNSS receiver), to facilitate carrier phase determination (e.g., by the carrier phase determination module), to facilitate detection of outliers (e.g., at an outlier detector), to facilitate determination of predetermined events, and/or in any suitable manner.

In a specific example, the corrections processing engine (and/or components of the corrections processing engine) can include the system and/or components thereof and/or preform the method and/or steps thereof as described in U.S. patent application Ser. No. 16/589,932 titled "SYSTEMS AND METHODS FOR DISTRIBUTED DENSE NETWORK PROCESSING OF SATELLITE POSITIONING DATA," filed 1 Oct. 2019, which is incorporated herein in its entirety by this referenced.

The corrections processing engine can additionally or alternatively function to determine a reliability of the corrections. The reliability preferably ensures that the corrections can enable (e.g., enable the positioning engine) a high integrity estimated position and/or velocity to be determined. However, the reliability can be used in any suitable manner. The reliability is preferably determined based on a distinct (e.g., non overlapping, nonidentical, etc.) set of data sources (e.g., reference stations such as reliability reference stations) from data sources used to generate the corrections (e.g., reference stations such as corrections reference stations). However, the reliability and the corrections can be generated based on the same and/or any suitable data sources.

The reliability can be a flag (e.g., use or don't use), an achievable integrity (e.g., of the estimated position, of the estimated velocity, of the real-valued carrier phase, of the integer-valued carrier phase, etc.), an error (e.g., standard deviation, variance, etc.), a confidence interval, and/or any suitable form.

The corrections processing engine is preferably communicably coupled to the positioning engine and to the reference station(s), but can be communicably coupled to the GNSS receiver, the external system, the sensor(s), and/or to any suitable component.

In one implementation of an invention embodiment, the corrections processing engine 1500—rather than attempting to generate corrections solely from a small set of high-quality global reference stations (as in PPP) or by solely comparing data in GNSS receiver/reference station pairs (as in RTK)—collects data from reference stations 1600 (and/or other reference sources), and instead of (or in addition to) applying this data directly to generate corrections, uses the data to generate one or more corrections models (which can be used to generate corrections data in a form utilizable by the positioning engine 1100).

By operating in this manner, the corrections processing engine 1500 may provide corrections (e.g., a set of corrections) that suffers from little of PPP's long convergence time issues, with solution complexity scaling directly with the number of reference stations N (unlike RTK, in which solution complexity scales at least with the number of possible pairs; i.e., $O(N^2)$. In fact, many current solutions scale with $O(N^3)$ or worse).

Further, in some embodiments, the corrections processing engine 1500 enables spatial interpolation and/or caching of the corrections to be performed more generally than with traditional RTK. Virtual reference stations (also referred to as pseudo reference stations) typically involve the interpolation of RTK corrections data in real time (and, as discussed before, error correction scales in complexity with at least $O(N^2)$). In contrast, interpolation in the corrections processing engine 1500 can be limited to specific aspects of global and/or local corrections models, providing more robustness to error and/or predetermined events and better insight as to error and/or predetermined event causes. In specific examples, specific aspects can include regions (e.g., specific localities), specific satellite observation data (e.g., pseudorange, carrier phase, etc.), specific satellite constellations, atmospheric models, and/or any suitable aspects of the global corrections. Further, unlike RTK, which requires real-time corrections data, the corrections processing engine 1500 may cache or otherwise retain model parameters even when data is limited (e.g., when a reference station becomes unavailable). However, the corrections processing engine may operate in a similar manner to RTK corrections processing engine (e.g., performing real-time interpolation between reference stations, generating real-time corrections data, etc.).

Note that the corrections processing engine 1500 may additionally or alternatively generate corrections data based on augmented satellite systems (e.g., WAAS, EGNOS, SDCM, MSAS, QZSS-SBAS, GAGAN, BDABAS, etc.), auxiliary sensors, network information, almanac information, and/or in any manner.

Figure 3:
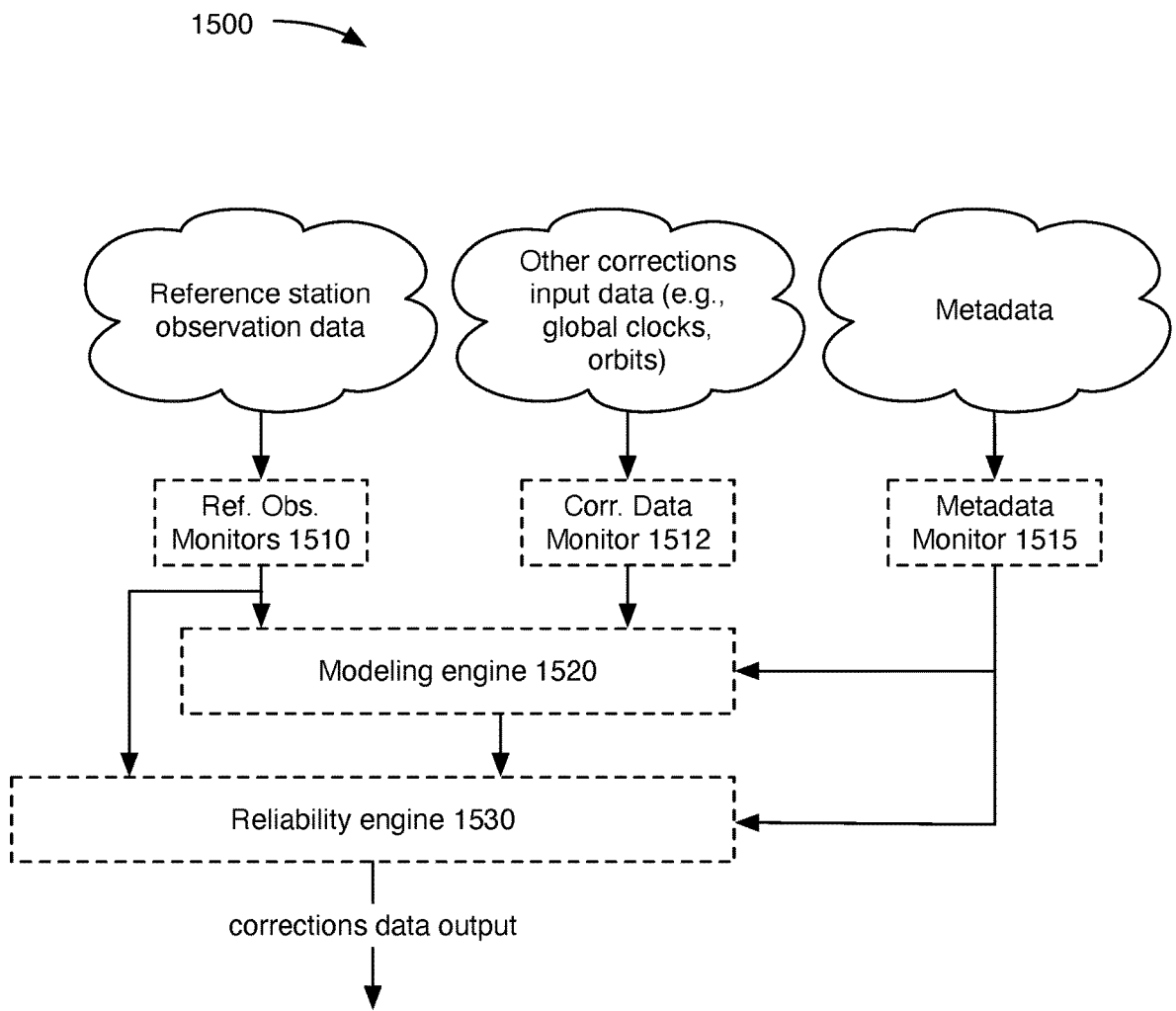
FIG. 3 is a diagram representation of a corrections processing engine of a system of an invention embodiment.

In one implementation, as shown in FIG. 3, the corrections processing engine 1500 includes at least one of a reference station observation monitor 1510 (reference observation monitor), correction data monitor 1512, a modeling engine 1520, and a reliability engine 1530 (e.g., an integrity engine). Note that the interconnections as shown in FIG. 3 are intended as non-limiting examples, and the components of the corrections processing engine 1500 may be coupled in any manner and/or the corrections processing engine may include any suitable component(s).

The reference station observation monitor 1510 functions to check reference station observations from reference stations (and/or other reference sources) for potential predetermined events. For example, reference station observation monitor(s) 1510 may function to detect reference station multipath errors (e.g., pseudorange error greater than about 10 cm, 20 cm, 50 cm, 1 m, 2 m, 5 m, 10 m, 20 m, 50 m, etc. from a reference station 1600 of the set of reference stations), reference station interference errors, reference station cycle slip errors, reference station observation data corruption, and/or any other predetermined event related to reference station data.

The reference stations observation monitor is preferably communicably coupled to the modeling engine and/or the reliability engine, but can additionally or alternatively be coupled to the correction data monitor, the positioning engine, and/or any suitable component.

The reference stations observation monitor can additionally or alternatively mitigate the effect of predetermined events in the reference station observations. Mitigating the effect of predetermined events in the reference station observations can include: removing reference station observations (and/or associated data) associated with the predetermined event, scaling reference station observations (e.g., based on the predetermined events), correcting the predetermined event, and/or any suitable mitigation step(s).

The reference station observation monitor(s) preferably take, as input, reference station observations (e.g., pseudorange, carrier phase, etc.) from reference stations 1600, but may additionally or alternatively take as input any data from reference stations 1600, sensor(s), satellite(s), networks, databases, GNSS receivers, and/or other reference sources. The location for each reference station is preferably known to the corrections processing engine, but the location can be provided to and/or unknown to the corrections processing engine.

In a specific example, the corrections processing engine can include two reference station observation monitors 1510 and 1511. The reference station observation monitor 1510 functions to perform observation monitoring on reference station data that will be passed to the modeling engine 1520 to generate corrections. In contrast, the reference station observation monitor 1511 performs observation monitoring on reference station data used by the reliability engine 1530 (to validate corrections generated by the modeling engine 1520). The reference station observation monitors 1510 and 1511 preferably function identically, but additionally or alternatively may function differently (e.g., different thresholds for predetermined events, different predetermined event monitoring, etc.). The reference station observation monitors 1510 and 1511 may use any set(s) of reference sources. For example, the reference station observation monitor 1510 and 1511 may use non-overlapping sets of reference stations 1600 as data sources (so the corrections generated by the modeling engine 1520 do not depend upon the reference stations used to perform reliability checks). In a second example, the reference station observation monitor 1511 may use an independent subset of the set of reference stations 1600 used by the reference station observation monitor 1510. However, the reference stations 1600 referenced by the reference station observation monitors 1511 and 1510 can be: overlapping, a subset of the other, independent sets, and/or otherwise related. Similarly, these reference sources may receive satellite information from any set(s) of satellites. However, the two reference station observation monitors may receive the reference station observations from the same reference stations, overlapping reference stations (e.g., a subset of reference stations in common), and/or any suitable reference stations.

However, a single reference station observation monitor can be used to monitor one or more sets of reference station observations, one or more sets of reference station observations can be used without monitoring, and/or any suitable reference station observation monitoring can be performed.

The reference station observation monitor can operate in the same or a different manner from the observation monitor 1110.

The correction data monitor 1512 functions to check inputs (e.g., global data) regarding one or more satellites (e.g., inputs that are independent of reference stations) for potential predetermined events. For example, the correction data monitor may take as input global clock data, satellite orbit data, satellite code biases, satellite phase biases, and/or other data not tied to a specific reference station 1600. The global data can be determined from satellite ephemeris, network information, database information, almanac information, satellite tracking, reference stations, GNSS receivers, and/or any suitable source. Example predetermined events detectable by the correction data monitor 1512 include satellite orbit errors, satellite clock errors, and/or any suitable predetermined events. The correction data monitor 1512 preferably provides such global corrections data to the modeling engine 1520 for corrections generation. The corrections data monitor can mitigate the effect of predetermined events in the global data. For example, the corrections data monitor can discard reference station observations corresponding to one or more satellite (e.g., satellites associated with predetermined events), can instruct the modelling engine to discard one or more reference station observations, can recollect the inputs (e.g., from the input source), can correct (and/or determine the correction for) the predetermined events, and/or perform any suitable mitigation. In some variants, the correction data monitor can perform a message field range test (MFRT) and/or any related test to detect predetermined events. In related variants, the corrections data monitor can ensure that new satellite observations are consistent with almanac data and/or previous observations. However, the correction data monitor can function in any suitable manner.

The global data (and/or predetermine-event mitigated global) can be valid (e.g., usable by the modeling engine) indefinitely, for a predetermined amount of time (e.g., 1 hour, 2 hours, 4 hours, 8 hours, 24 hours, 48 hours, 72 hours, 1 week, 1 month, 1 year, etc.), as long as the satellite(s) are in view (e.g., of the reference station, of the GNSS receiver, etc.), and/or for any suitable amount of time.

The correction data monitor is preferably communicably coupled to the modeling engine, but can additionally or alternatively be coupled to the reference station observation monitor, the reliability engine, the positioning engine, and/or any suitable component.

In variants, the corrections processing engine can include a metadata monitor, which functions to receive metadata. The metadata is preferably used by the modeling engine in determining the corrections, but can be used to validate the corrections, detect predetermined events, and/or be used in any suitable manner. The metadata can be associated with reference stations, satellites, satellite constellations, GNSS receiver, global metadata, local metadata, and/or any suitable source. In specific examples, metadata can include one or more of: reference station coordinates, earth rotation parameters, sun/moon ephemeris, ocean loading parameters, satellite attitude model, satellite phase center offset, satellite phase center variation, leap second, antenna type, receiver type, and/or any suitable data.

The metadata monitor can additionally or alternatively function to validate the metadata. Metadata can be validated by comparing current metadata to previous metadata (e.g., almanac, a previous observation, etc.), by validating a metadata source (e.g., using CRC), and/or in any manner.

The metadata monitor is preferably communicably coupled to the modeling engine, but can additionally or alternatively be coupled to the reference station observation monitor, the correction data monitor, the reliability engine, the positioning engine, and/or any suitable component.

The modeling engine 1520 functions to generate corrections data useable by the positioning engine 1100 to estimate the position and/or velocity of the GNSS receiver 1200. The modeling engine preferably generates corrections from reference station data (e.g., pseudorange and carrier phase from reference stations 1600), global corrections data (e.g., satellite clock bias, satellite orbit, etc.), and/or metadata (e.g., reference station positions, ocean tide loading, antenna type, receiver type, etc.), but may additionally or alternatively generate corrections using sensor data, satellite observations (e.g., as detected at a GNSS receiver), and/or any input data.

The modeling engine can be communicably coupled to the reference station observation monitor, the correction data monitor, the metadata monitor, the reliability engine, the positioning engine, and/or any suitable component.

Figure 4:
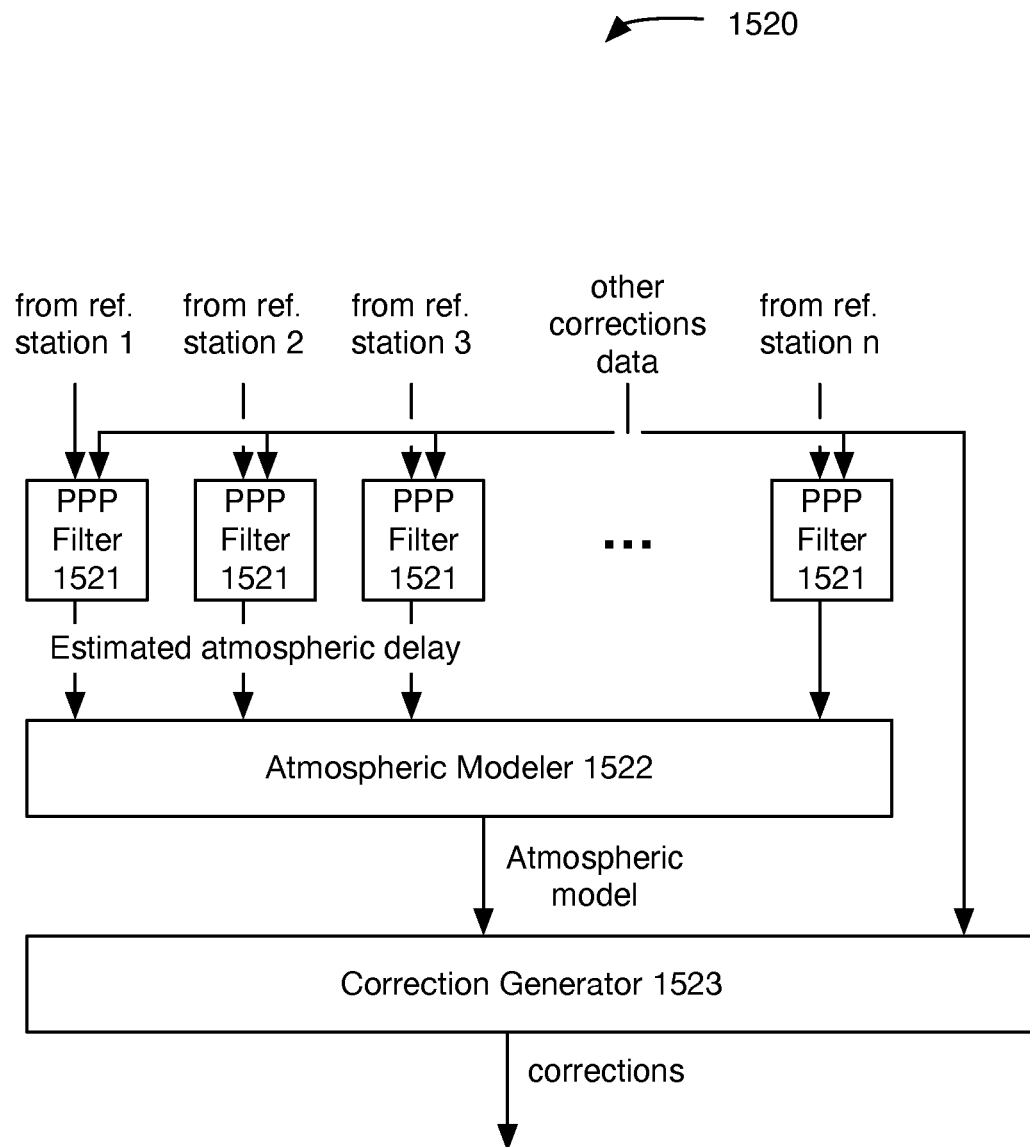
FIG. 4 is a diagram representation of a modeling engine of a corrections processing engine of a system of an invention embodiment.

In one implementation of an invention embodiment, the modeling engine 1520 includes a set of PPP filters 1521, an atmospheric modeler 1522, and a correction generator 1523, as shown in FIG. 4. However, the modeling engine 1520 can be otherwise constructed.

The PPP filter 1521 takes in reference station observations and estimates atmospheric delay for the reference stations 1600. In this implementation, each PPP filter preferably estimates the atmospheric delay associated with a single reference station 1600 of the set of reference stations; alternatively, each PPP filter 1521 may correspond to any number of reference stations 1600. The set of reference stations preferably correspond to a geographical region (e.g., a state; a country; a continent; a county; a parish; a city; an area between approximately 100 mi$^2$ and 2*10$^8$ mi$^2$ such as 1000 mi$^2$, 1*10$^3$ mi$^2$, 1*10$^4$ mi$^2$, 1*10$^5$ mi$^2$, 5*10$^5$ mi$^2$, 1*10$^6$ mi$^2$, 3*10$^6$ mi$^2$, 4*10$^6$ mi$^2$, 2*10$^7$ mi$^2$, etc.; etc.). However, the set of reference stations can correspond to any suitable locations.

The atmospheric modeler 1522 generates a model of atmospheric delay over the geographical region covered by the set of reference stations 1600. The atmospheric modeler 1522 preferably interpolates atmospheric delays as calculated by the PPP filters 1521 to generate a local (e.g., reference-station independent, but position dependent) model of atmospheric effects (e.g., tropospheric effect, ionospheric effects, etc.). For example, the atmospheric modeler 1522 may transform a set of tropospheric effect models corresponding to individual reference locations (each having a known position) to a regularly spaced grid. Additionally or alternatively, the atmospheric modeler 1522 may function in any manner (e.g., by creating a continuous interpolated model of atmospheric effects rather than a discrete grid, using some other arrangement of discrete points than a grid pattern, generated a fitted atmospheric model, using a neural network, based on a set of equations, etc.). Note that any interpolation technique may be used; for example, Gaussian processes such as kriging (which can also predicting uncertainty at the interpolated points); Hermite interpolation displacement interpolation rational interpolation; spline interpolation; polynomial interpolation; linear interpolation; piecewise constant interpolation; and/or any interpolation technique. The atmospheric model (e.g., local position dependent model) may be referred to as a "unified position-based model" (since it unifies the output of multiple models corresponding to individual reference sources).

The correction generator 1523 generates corrections (e.g., a precise correction) based on the atmospheric model and other corrections data (e.g., global correction data such as satellite clock biases; metadata; etc.). The correction generator 1523 functions to generate corrections, usable by the positioning engine 1100, from the atmospheric model generated by the atmospheric modeler 1522. The correction generator 1523 may additionally or alternatively send or use correction data in any manner to correct position data (e.g., the correction generator 1523 may take as input estimated position and/or velocity and generate a corrected position data rather than corrections, such as a positioning correction, to be implemented by the positioning engine). The correction generator 1523 preferably additionally generates estimated uncertainty in the generated corrections (traditional PPP/RTK solutions are not capable of doing this). The estimated uncertainty in the generated corrections can be determined based on (e.g., given) uncertainty in the input parameters (e.g., error propagation, Monte Carlo simulations based on the uncertainty in the input parameters, etc.), empirically (e.g., from historical data), using simulations, heuristically, calculated, or be otherwise determined.

The corrections generated by the correction generator 1523 preferably include corrections that correct for the effects of satellite orbit and clock error, satellite code and phase biases, atmospheric effects (e.g., ionospheric delay, rate of change of ionospheric delay, tropospheric delay such as zenith tropospheric delay, etc.), but may additionally or alternatively include corrections for any set of errors. In some variants, the corrections (e.g., corrections associated with a given satellite constellation, corrections associated with a given satellite, etc.) can include (e.g., be corrected for) regional-offsets, for example, by transmitting a residual regional offset associated with the correction(s).

The reliability engine 1530 functions to verify the reliability of corrections (e.g., integrity of the corrections) generated by the modeling engine 1520. The 1530 may also transmit or otherwise prepare corrections for use in positioning. The reliability engine can optionally issue flags (e.g., satellite flags, atmospheric flags, line of sight flags, etc.), which can prevent local systems from using a given set of corrections (e.g., if an integrity issue is detected). The reliability engine 1530 preferably verifies corrections based upon independent reference stations (and/or reference station observations), as shown in FIG. 3. However, the reliability engine can verify corrections based upon common reference stations (e.g., reference station observations) and/or any suitable data sources.

Figure 5:
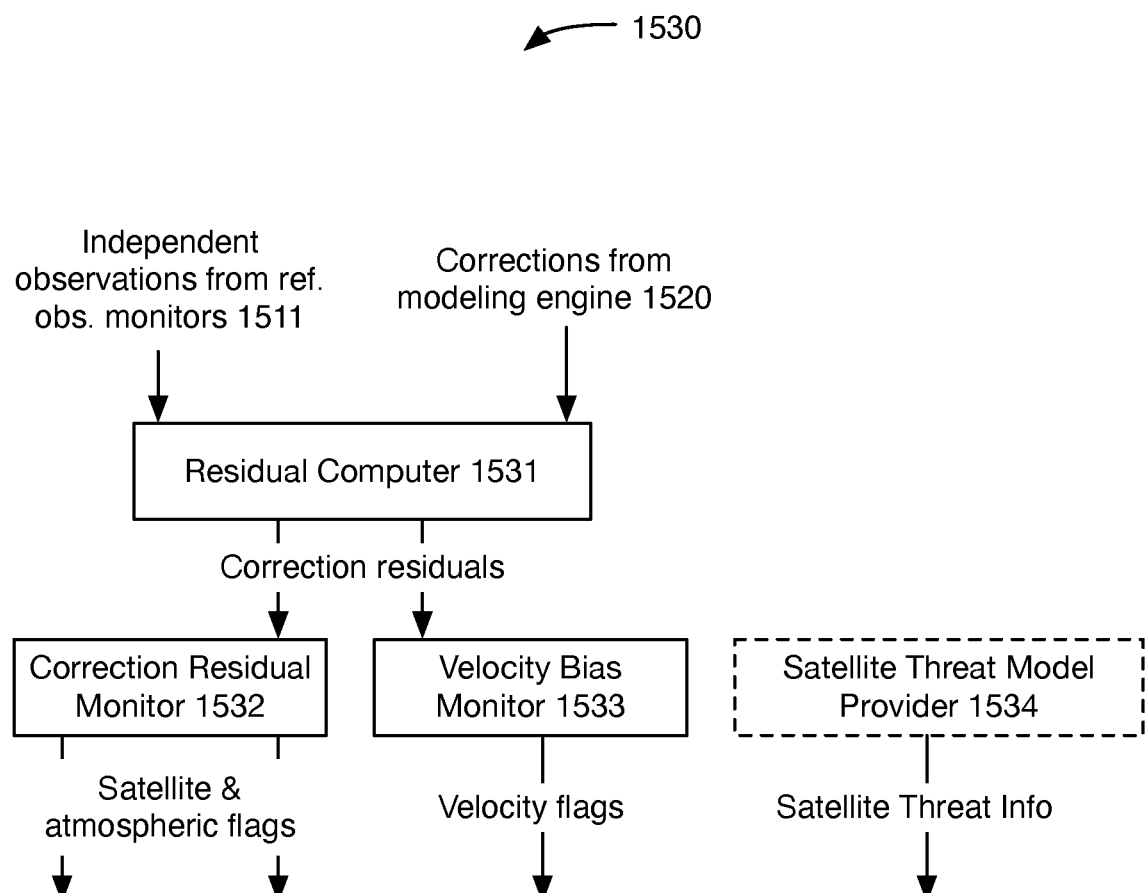
FIG. 5 is a diagram representation of a reliability engine of a corrections processing engine of a system of an invention embodiment.

In one implementation of an invention embodiment, the reliability engine 1530 includes a residual computer 1531 (e.g., residual computation module), a correction residual monitor 1532, and a velocity bias monitor 1533, as shown in FIG. 5. However, the reliability engine can include any other suitable set of modules.

In this implementation, the residual computer 1531 calculates residual values from applying the corrections to the reliability reference station observations. However, the residual computer can directly compare the corrected reliability reference station observations and/or correct the reliability reference station observation in any suitable manner.

The correction residual monitor 1532 can compare the residuals (and/or other corrected reliability reference station observations) to one or more thresholds. The correction residual monitor preferably operates in real-time, but can operate off-line, in near-real time, with a delay, and/or with any suitable timing. The threshold(s) can be: specific to different types of feared events or failure modes; global thresholds; or any other suitable threshold. The threshold can be determined empirically, using modelling (e.g., Monte Carlo modelling), using a neural network, using artificial intelligence, predetermined, constant (e.g., 1%, 2%, 5%, 10%, 20%, 25%, 33%, 50%, 75%, etc. of the corrections), manually determined, regulatorily determined, be the integrity bounds, and/or determined in any suitable manner. In a specific example, Monte Carlo simulations can be used to determine the impact of a correction (and potentially associated correction error) on the estimated position, on the real-valued carrier phase determination, on fixing the integer-valued carrier phase, on the estimated velocity, and/or on another parameter. The threshold can be set based on the results from the Monte Carlo modelling or otherwise determined.

The thresholds can be associated with an integrity bound (e.g., when the residuals meet the threshold the corrections can enable a high accuracy estimated position, integer-valued carrier phase ambiguity determination, intermediate data generation, etc.), a confidence that an integrity bound can be achieved (e.g., a confidence that the corrections can enable a high accuracy estimated position, integer-valued carrier phase ambiguity determination, intermediate data generation, etc.), and/or any suitable results. When the residual is less than or equal to the threshold, the corrections can be transmitted to and/or used by the positioning engine (e.g., reliability of the corrections can indicate that the corrections are safe to use, will generate an estimated position and/or velocity with a target integrity, etc.). When the residual is greater than the threshold, the reliability of the corrections can: indicate that the corrections should not be used, indicate that the corrections can be used to estimate the position (and/or velocity) with an integrity exceeding a target integrity, and/or be used in any suitable manner. However, the corrections can not be transmitted to the positioning engine when the residual exceeds the threshold, and/or the residual can be used in any suitable manner.

In one variation, individual residuals are compared against the thresholds. In a second variation, the residuals are compared against integrity bounds on one or more linear combinations of satellite frequencies and/or signals. This second variation can optionally determine whether a failure is due to a satellite correction or an atmospheric correction. The linear combinations can correspond to two frequency linear combinations (e.g., linear combinations of any two frequency satellite signals such as L1, L2, L3, L4, L5, E1, E2, E5a, E5b, E5AltBOC, E6, G1, G3, etc. such as Melbourne-Wübbena combination, etc.), three frequency linear combinations (e.g., linear combinations of any three frequency satellite signals such as Hatch-Melbourne-Wübbena combination), four frequency linear combinations, n-frequency linear combinations (e.g., where n is an integer), linear combinations of satellite signals from different satellites (and/or satellite constellations) such as multisystem combinations, geometry-free combinations, wide-lane combinations, narrow-lane combinations, ionosphere-free combinations, and/or any suitable linear combinations. In a specific example of the second variation, the linear combination can correspond to a linear combination (e.g., a geometry-free linear combination such as a two frequency geometry-free linear combination, a three frequency geometry-free linear combination, etc.) that eliminates nondispersive (e.g., satellite clock, satellite orbit, troposphere effects, etc.) and/or amplifies (or isolates) dispersive components (e.g., ionosphere effects, atmospheric effects, etc.) to the GNSS signals. In this specific example, when the coefficients and/or residual observations from several frequencies exceed a threshold, the correction residual monitor can output a flag classifying the error as an atmospheric error. In a second specific example of the second variation, the linear combination can correspond to a linear combination (e.g., an ionosphere-free linear combination such as a two frequency ionosphere-free linear combination, a three frequency ionosphere-free linear combination, etc.) that eliminates dispersive and/or amplifies (or isolates) non-dispersive components to the GNSS signals. In this specific example, when the coefficients and/or residual observations from several frequencies exceed a threshold, the correction residual monitor can output a flag classifying the error as a satellite error. In a third variation, the correction residual monitor can include a trained classifier that ingests the residuals and optionally the satellite frequencies and/or signals, and outputs a flag classification or probability for each of a set of predetermined flags. However, the residuals can be otherwise compared against the thresholds.

The velocity bias monitor 1533 compares the residuals change over time (e.g., to detect drift that may affect velocity estimation) to a threshold. In variants, the velocity bias monitor 1533 can detect abnormal drift that would impact velocity estimation. The threshold can be determined empirically, using modelling (e.g., monte carlo modelling), using a neural network, using artificial intelligence, predetermined, constant (e.g., 1%, 2%, 5%, 10%, 20%, 25%, 33%, 50%, 75%, etc. of the correction change over time), and/or in any suitable manner. When the change in the residuals is less than a threshold, the corrections can be transmitted to and/or used by the velocity engine (e.g., reliability of the corrections can indicate that the corrections are safe to use, will generate an estimated velocity with a target integrity, etc.). When the change in the residuals is greater than the threshold, the reliability of the corrections can: indicate that the corrections should not be used, indicate that the corrections can be used to estimate the velocity with an integrity exceeding a target integrity, and/or be used in any suitable manner. However, the corrections can not be transmitted to the velocity engine when the residual exceeds the threshold, and/or the residual can be used in any suitable manner.

The reliability engine 1530 may additionally include a satellite threat model provider 1534 that provides information needed by the positioning engine 1100 to calculate high-integrity positioning (e.g., satellite probabilities of failure, constellation probabilities of failure, etc.). The satellite threat model provider can optionally provide threat probabilities and/or amplitude to third parties (e.g., manufacturer backend, etc.). The satellite threat model provider 1534's output is preferably independent of the correction residuals, but can be dependent on the correction residuals. The satellite threat model provider can be a database, API endpoint, or other data source. The data of the satellite threat model provider can be determined: empirically (e.g., from historical data), using simulations, heuristically, calculated, or otherwise determined.

Finally, the reliability engine 1530 may additionally perform regional residual correction generation. As mentioned previously, in some implementations, the system 1000 may utilize data corresponding to multiple satellite constellations to provide high-integrity positioning. In these implementations, the reliability engine 1530 may send multiple sets of corrections data (e.g., corresponding to different satellite constellations, corresponding to different individual and/or subsets of satellites, etc.). These sets of correction data are preferably independent of each other, but can be dependent on each other. As with corrections generally, they may be generated using data from any set of reference stations (e.g., overlapping, non-overlapping).

While the reliability engine 1530 may transmit multiple sets of corrections in their entireties, the reliability engine 1530 may additionally or alternatively transmit a primary set of corrections and then "residual" secondary sets of corrections (e.g., the primary set of corrections is transmitted in its entirety, and secondary sets are transmitted as modifications to the primary set of corrections). This can reduce the overall amount of information needed to be transmitted to GNSS receivers.

The reference stations 1600 function to provide reference station observations (e.g., pseudorange and/or carrier phase data such as corresponding to one or more satellites, corresponding to one or more satellite constellations, etc.) used to generate corrections. Reference stations 1600 preferably have a location known to a high degree of accuracy. Reference station location is preferably the location of the antenna used to receive satellite signals, but can be any suitable location. Reference station location may be determined in any manner yielding a high degree of accuracy; for example, reference station location may be determined by a number of receivers set around the reference station at vertical and horizontal reference points. Note that while reference stations 1600 are preferably fixed in location, they may additionally or alternatively be mobile. Station position is preferably re-determined to high accuracy before moved reference stations re-start providing reference station observations; additionally or alternatively, reference stations may provide reference station observations before location re-determination (for example, for use in attitude estimation; alternatively, data may be provided but not used). Note that fixed reference stations 1600 may, over time, "self-survey" their own positions to a reasonably high degree of accuracy.

Reference stations 1600 preferably provide phase and pseudorange data for multiple satellite signals and the location of the reference station 1600 via the internet, but may additionally or alternatively provide data by any other suitable method (e.g., transmission by cellular radio modem). Reference station data is preferably made available directly to the system woo, but may additionally or alternatively be processed or aggregated before being made available to the system woo.

Reference stations 1600 preferably have one or more satellite receivers and generate corrections based on those receivers. The number and quality of satellite receivers used by a reference station (or other factors, like antenna type/size/location) may determine the accuracy of reference station data. Reference stations 1600 (or other sources of reference station data; e.g., a reference source that creates correction data from multiple reference stations) may be ordered or grouped by reference station quality (e.g., accuracy of corrections) and/or locality (e.g., if corrections are desired for a particular GNSS receiver, reference stations may be ordered or grouped by distance to that receiver).

In specific variants, the system can include a plurality of sets of reference stations. For example, reference station observations corresponding to a first set of reference stations (e.g., corrections reference stations) can be used to generate the corrections. Reference station observations corresponding to a second set of reference stations (e.g., reliability reference stations) can be used to validate the corrections and/or determine a reliability of the corrections. The first set of reference stations are preferably regional reference stations (e.g., covering and/or spanning a region such as a city, county, parish, state, country, cluster of countries, continent, etc.). Reference stations of the first set of reference stations can be separated by about 1 mi, 5 mi, 10 mi, 20 mi, 30 mi, 50 mi, 100 mi, 150 mi, 200 mi, 300 mi, 500 mi, 1000 mi, 2000 mi, and/or have any suitable separation. The second set of reference stations are preferably local reference stations (e.g., reference stations within 0.1 mi, 0.5 mi, 1 mi, 2 mi, 3 mi, 5 mi, 10 mi, 20 mi, 50 mi, etc. of the GNSS receiver). However, the first and second set of reference stations can include any suitable reference stations located in any suitable area.

In specific variants of the system including one or more sensors 1700, the sensors preferably function to measure (e.g., provide) sensor data (e.g., auxiliary data, validation data, back-up data, supplemental data, etc.). The sensor data can be used by the positioning engine and/or corrections processing engine to assist (e.g., speed-up, correct, refine, etc.) the position estimation, velocity estimation, corrections generation, corrections validation, carrier phase determination (e.g., estimating the integer-valued carrier phase ambiguity), and/or any suitable process. In a specific example, the sensor data can be used to estimate the receiver position at times when satellite observations are not received (e.g., in an urban canyon; due to an obstruction such as a billboard, weather, etc.; etc.). However, the sensor data can be used at any suitable time and in any suitable manner. The sensors are preferably in communication with the computing system, but can be in communication with the GNSS receiver, one or more reference station, and/or with any suitable component. The sensors can be: on-board the external system, integrated into the mobile receiver (e.g., onboard the same external system, onboard a different external system), and/or be separate from the mobile receiver, or otherwise associated with the mobile receiver. The sensor data is preferably for the external system, but can additionally or alternatively be for the mobile receiver or any other suitable sensor reference. The sensor data can include: inertial data (e.g., velocity, acceleration), odometry, pose (e.g., position, orientation), mapping data (e.g., images, point clouds), temperature, pressure, ambient light, and/or any other suitable data. The sensors can include one or more of: inertial moment unit (IMU), inertial navigation system (INS), accelerometer, gyroscope, magnetometer, odometer (e.g., visual odometry, wheel odomoetry, etc.), and/or any suitable sensors can be included.

In a specific example, the system can include a plurality of INSs (e.g., 2, 3, 5, 10, etc. INS sensors). Each INS of the plurality preferably generates an independent estimate of the position and/or velocity (e.g., using dead reckoning). However, two or more of the INSs can generate dependent estimated of the position and/or velocity. The independent dead reckoning positions and/or velocities can be used to validate the dead reckoning position. In a specific variant, the dead reckoning position (and/or velocity) estimate can be the position (and/or velocity) range that surrounds the overlapping region between the individual INS position (and/or velocity) estimates. In a second specific variant, the dead reckoning position (and/or velocity) estimate can be the overlapping position (and/or velocity) range from the individual INS position (and/or velocity) estimates. However, the dead reckoning position and/or velocity can be determined in any suitable manner.

Specific Examples of the System and Method of Use

Figure 12:
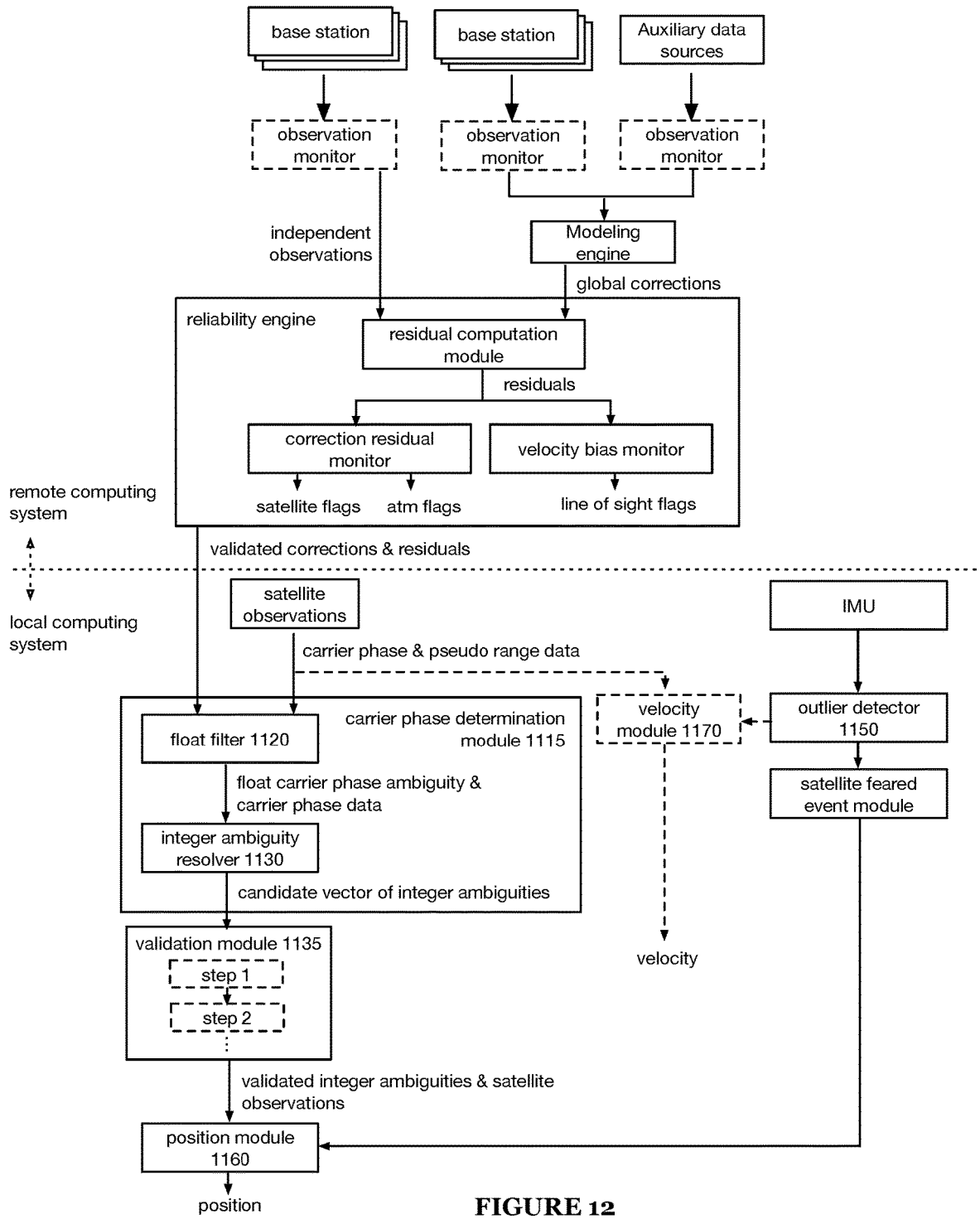
FIG. 12 is an example of a system for multiple global and local feared event detection, validation, and correction, with an optional split between remote and local computing systems.

In an illustrative example, as shown in FIG. 12, a system for estimating the position of a GNSS receiver can include a remote server that can include: a reference station observation monitor configured to: receive a first set of reference station observations associated with a first set of reference stations and a second set of reference station observations associated with a second set of reference stations; and detect a predetermined event in the first set of reference station observations and the second set of reference station observations; when the predetermined event is detected, mitigate an effect of the predetermined event; a modeling engine configured to generate corrections based on the first set of reference station observations; and a reliability engine configured to determine a reliability of the corrections generated by the modelling engine based on the second set of reference station observations. The system can additionally or alternatively include a positioning engine executing on a computing system collocated with the receiver. The positioning engine can include: an observation monitor configured to: receive a set of satellite observations from a set of global navigation satellites corresponding to at least one satellite constellation; detect a predetermined event in the set of satellite observations; and when the predetermined event in the set of satellite observations is detected, mitigating an effect of the predetermined event in the set of satellite observations; a float filter configured to determine a real-valued carrier phase ambiguity estimate based on the set of satellite observations and the corrections having a reliability greater than a predetermined threshold; an integer ambiguity resolver configured to fix the real-valued carrier phase ambiguity estimate to an integer-valued carrier phase ambiguity, wherein the integer-valued carrier phase ambiguity is validated in a multi-step process; and a position filter configured to estimate a position of the receiver, wherein an integrity risk and a protection level of the estimated position depends on a validation step of the multi-step process.

In a first variation, the external system (e.g., using the position) specifies the integrity risk and/or protection level required for a given functionality, wherein the position output by the system is not used if the integer-valued carrier phase ambiguity is not validated to the specified integrity risk and/or protection level (e.g., and an auxiliary positioning system used instead). Alternatively, the functionality is not enabled when the integer-valued carrier phase ambiguity is not validated to the specified integrity risk and/or protection level. In a second variant, the external system's enabled functionalities and/or operation conditions are adjusted based on the integrity risk and/or protection level of the instantaneous or historic position. In an illustrative example, the notification presentation triggering distance (e.g., a proximity distance for a proximity alert) can be a function of the integrity risk and/or the protection level (e.g., increased when the integrity risk increases).

In a specific example, a method for determining a position of a global navigation satellite system (GNSS) receiver (e.g., using the system, using any suitable system), can include at a remote server: receiving a first set of reference station observations (e.g., associated with a first set of reference stations); detecting a first set of predetermined events; when at least one predetermined event of the first set of predetermined events is detected, mitigating an effect of the detected predetermined event; generating an atmospheric model based on the first set of reference station observations; determining corrections based on the atmospheric model; and validating the corrections using a second set of reference station observations (e.g., associated with a second set of reference stations). The method can additionally or alternatively include: at a computing system collocated with the GNSS receiver: receiving the validated corrections from the remote server; receiving a set of satellite observations from a set of global navigation satellites corresponding to at least one satellite constellation; detecting a second set of predetermined events; when at least one predetermined events of the second set of predetermined events is detected, mitigating an effect of the detected predetermined events of the second set of predetermined events; resolving a carrier phase ambiguity for the set of satellite observations based in part on the validated corrections; validating the carrier phase ambiguity using a multistep validation process; estimating a position of the GNSS receiver based on the validated carrier phase ambiguity, wherein an integrity risk and a protection level of the estimated position depend on which step of the multistep validation process is used to validate the carrier phase ambiguity. In this specific example, the validating the corrections can include correcting the second set of reference station observations using the corrections; determining residuals for the set of corrected satellite observations; and validating the corrections when the residuals are below a correction validation threshold. In this specific example, generating the atmospheric model can include estimating an atmospheric delay associated with each reference station of the first set of reference stations using a PPP filter and interpolating (e.g., using kriging) between the atmospheric delays associated with each reference station to generate the atmospheric model. In this specific example, the multistep validation process can include a first validation step, wherein the carrier phase ambiguities are validated simultaneously; a second validation step, after the first validation step, wherein a first subset of carrier phase ambiguities corresponding to a first subset of satellites of the set of global navigation satellites are validated simultaneously and a second subset of carrier phase ambiguities corresponding to a second subset of satellites of the set of global navigation satellites are validated simultaneously; and a third validation step, after the second validation step, wherein the second validation step is repeated at least twice. In this specific example the first subset of satellites can correspond to a first satellite constellation and the second subset of satellites can correspond to a second satellite constellation different from the first satellite constellation. However, the first and second set of satellites can correspond to subsets of the same satellite constellation, combinations of satellite combinations, and/or any suitable satellites. In this specific example, the integrity risk and the protection level of the position of the GNSS receiver can be at most $10^{-4}$ per hour and 2 m, respectively, when the carrier phase ambiguities are validated to a first validation step of the multistep process; at most $10^{-6}$ per hour and 2 m, respectively, when the carrier phase ambiguities are validated to a second validation step of the multistep process; and at most $10^{-7}$ per hour and 3 m, respectively, when the carrier phase ambiguities are validated to a third validation step of the multistep process. In this specific example, resolving the carrier phase ambiguity can include determining a real-valued phase ambiguity using a Kalman filter; and fixing the real-valued phase ambiguity to an integer-valued phase ambiguity including decorrelating the real-valued phase ambiguity using at least one of a LAMBDA algorithm or an MLAMBDA algorithm. In this specific example, the first set of predetermined events can correspond to high dynamic events (e.g., at least one of environmental feared events, network feared events, satellite clock drift of at most 1 cm/s, issue of data anomaly, erroneous broadcast ephemeris, constellation failure, reference station multipath, and reference station cycle slip) and the second set of predetermined events can correspond to low dynamic events (e.g., at least one of code carrier incoherency, satellite clock step error, satellite clock drift greater than 1 cm/s, pseudorange multipath, carrier phase multipath, carrier phase cycle slip, non-line of sight tracking, false acquisition, Galileo binary offset carrier second peak tracking, and spoofing). This specific example can further include, independent of estimating the position of the GNSS receiver, estimating a velocity of the GNSS receiver using time-differenced carrier phase measurements. In this specific example, at least one of the protection level of the estimated position and a protection level of the velocity can be determined using an advanced receiver advanced integrity monitoring (ARAIM) algorithm using only carrier phase ambiguities. This specific example can include automatically operating a vehicle based on at least one of the estimated position and the velocity, wherein the GNSS receiver is coupled to the vehicle. This specific example can include when satellite observations corresponding to one or more satellites of the set of global navigation satellites are unavailable, determining the position of the GNSS receiver using dead reckoning based on data associated with an inertial navigation system; and validating the position determined using dead reckoning by comparing a first dead reckoning position determined based on the data associated with the inertial navigation system with a second dead reckoning position determined based on data associated with a second inertial navigation system.

The method is preferably implemented by the system but may additionally or alternatively be implemented by any system for estimating the position and/or velocity of a GNSS receiver and/or external system based on satellite observations.

However, the system can include any suitable components.

However, the method can include any suitable steps and/or substeps.

Specific Example of a System and Method for RTK Satellite Positioning

Figure 8:
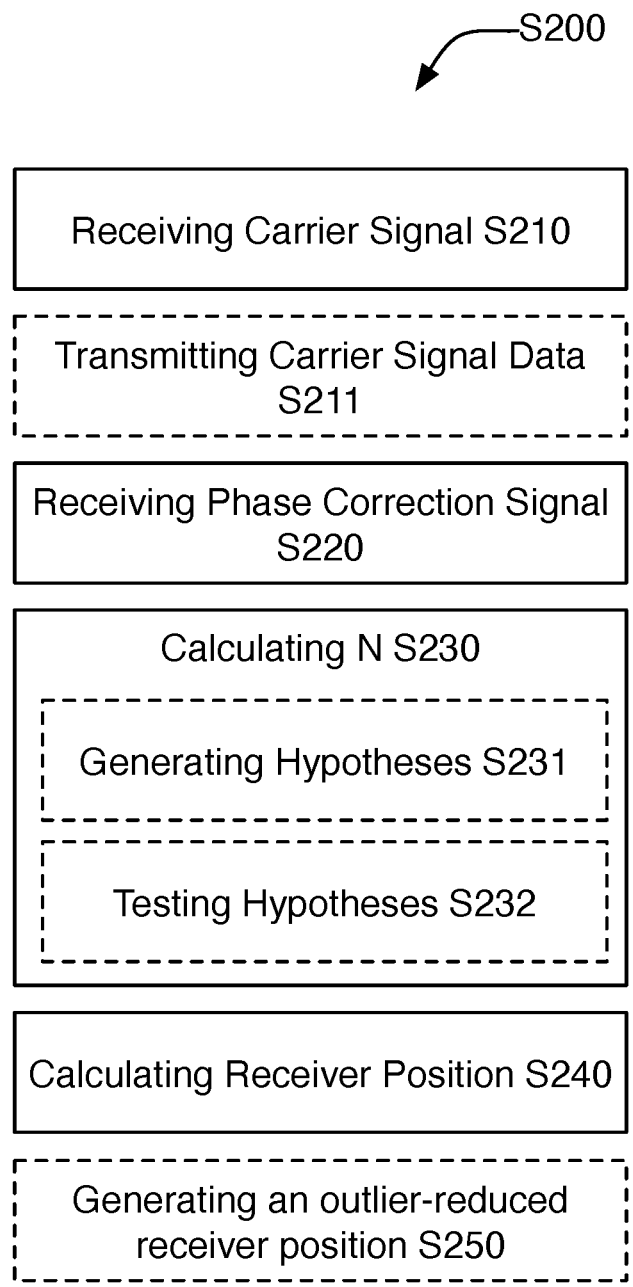
FIG. 8 is a chart view of a method of a preferred embodiment.

As shown in FIG. 8, a specific example of the method 200 for Real Time Kinematic (RTK) satellite positioning includes: at a mobile receiver, receiving a navigation satellite carrier signal S210, receiving a phase correction signal from a reference station S220, calculating integer phase ambiguity S230, and calculating receiver position S240.

Step S210 includes receiving a navigation satellite carrier signal. Step S210 functions to provide the mobile receiver with a phase measurement and a pseudo-range measurement that can be used, along with a phase correction signal (received in Step S220) to calculate receiver position. Navigation receiver carrier signals are preferably received at the L1 frequency (1575.42 MHz), but may additionally or alternatively be received at the L2 frequency (1227.60 MHz) or any other suitable frequency. Navigation satellite carrier signals received in Step S210 may include GPS signals, GLONASS signals, Galileo signals, SBAS signals and/or any other suitable navigation signal transmitted by a satellite.

Step S210 preferably includes receiving the navigation satellite carrier signal (which is an RF signal) at an RF antenna and converting the signal to a digital baseband signal. This digital baseband signal is preferably used for two tasks by Step S210: calculating the pseudo-range from the receiver to the satellite (using standard GNSS time-of-flight techniques) and measuring the relative phase of the carrier signal.

Step S210 is preferably performed for multiple satellites. The use of pseudo-range and phase data from multiple satellites can provide for more accurate positioning, as described in later sections.

If receiver carrier signals are received at both L1 and L2 frequencies, Step S210 may include combining the L1 and L2 frequency signals for each satellite to create a beat signal. The resulting signal (i.e., the beat signal) has a center frequency significantly lower than either the L1 or L2 signals (~347.82 MHz), which allows for a smaller set of possible integer ambiguity values for a given prior (e.g., if $|N|\leq 10$ for an L1 signal, $|N|\leq 2$ for the example beat signal). The resulting signal may additionally or alternatively possess other desirable properties (e.g., reduction in ionospheric error).

In a variation of a preferred embodiment, the method 200 includes Step S211: transmitting carrier signal data (e.g., pseudo-range and/or phase data) from the receiver to a remote computer (e.g., a computer at a reference station, a cloud computing server). In this variation, Steps S220 through S240 may additionally be performed on the remote computer.

Step S220 includes receiving a phase correction (or phase observation) signal from a reference station. Step S220 functions to receive phase correction information used to determine, for a given satellite signal, the location of the mobile receiver. Step S220 preferably includes receiving phase correction information for each satellite signal received in Step S210, but may additionally or alternatively include receiving phase correction information for only a subset of the satellite signals received in Step S210.

If Step S220 include receiving phase correction information for only a subset of satellite signals in Step S210, Step S220 may include estimating phase correction information for any of the subset of satellite signals for which phase correction information is not received.

Step S220 includes receiving phase correction information from at least one reference station, but may also include receiving phase correction information from additional reference stations.

Step S220 may include receiving phase correction information for some satellites from one reference station while receiving phase correction information for other satellites from another reference station. Additionally or alternatively, Step S220 may include receiving phase correction information from multiple reference stations for a single satellite signal.

Step S220 preferably include receiving phase correction signals over a UHF radio (e.g., at 915 MHz), but may additionally or alternatively include receiving phase correction signals over any suitable communication medium (e.g., an internet connection, a cellular connection).

Phase correction signals preferably include carrier signal phase (as measured at the reference station) and reference station location information (or other identifying information linked to location). Phase correction signals may additionally include pseudo-range data from the reference station, positioning code data, or any other relevant data.

Phase correction signals are preferably formatted as RTCMv3 messages, but may additionally or alternatively be formatted according to any suitable standard or method. Reference stations used for transmitting phase correction signals may include dedicated RTK reference stations, Continuously Operating Reference Stations (CORS), Network RTK solutions (including virtual reference station solutions), or any other suitable reference station.

Step S23o includes calculating integer phase ambiguity. Step S23o functions to allow for determination of the absolute difference in phase between a satellite carrier signal received at a reference station and a satellite carrier signal received at a mobile receiver, which in turn enables the position of the mobile receiver relative to the reference station to be calculated.

Integer phase ambiguity is preferably calculated using double differenced measurements of pseudo-range and relative phase. Double-differenced measurements are preferably calculated by taking the difference of values for the difference of receiver and reference values. For example, the double-differenced measurements of pseudo range and phase for two satellites (satellite 1 and 2) can be modeled as $$\rho_{12} = (\rho_{mr} - \rho_{ref})_{i=1} - (\rho_{mr} - \rho_{ref})_{i=2}$$

$$\phi_{12} = (\phi_{mr} - \phi_{ref})_{i=1} - (\phi_{mr} - \phi_{ref})_{i=2}$$

where i is the satellite index, $\rho_{mr}$, $\phi_{mr}$ are pseudo-range and phase measurements at the mobile receiver, and $\rho_{ref}$, $\phi_{ref}$ are pseudo-range and phase measurements at the reference station.

More specifically, for a mobile receiver and a reference station separated by a vector b, the double differenced equations for pseudo-range $\rho$ and phase $\varphi$ can be written as $$\nabla \Delta \rho = \begin{pmatrix} \rho_{10} \\ \vdots \\ \rho_{n0} \end{pmatrix} = \begin{pmatrix} e_1 - e_0 \\ \vdots \\ e_n - e_0 \end{pmatrix} \cdot b + \epsilon_\rho = DE \cdot b + \epsilon_\rho$$

$$\nabla \Delta \phi = \begin{pmatrix} \phi_{10} \\ \vdots \\ \phi_{n0} \end{pmatrix} = \frac{DE \cdot b}{\lambda} + N + \epsilon_\rho$$

where $e_n$ is the unit line of sight vector to satellite n, $\epsilon_\rho$ represents noise, $\lambda$ is the wavelength of the carrier signal and N is integer phase ambiguity. The use of double-differenced measurements allows for the cancellation of satellite clock errors, receiver clock errors, and some atmospheric error.

Step S230 preferably includes two substeps: generating a set of hypotheses S231 and performing hypothesis testing on the set of hypotheses S232. Additionally or alternatively, S230 may include calculating integer phase ambiguity N using any number or type of steps.

Step S231 functions to produce a set of possible values for N as well as perform iterative refinement on that set. Step S231 preferably includes producing a set of possible values for N using a Kalman filter process.

Kalman filters are recursive filters that estimate the state of a linear dynamic system based on a series of noisy measurements. In general form, the measurement equation appears as $$z_i = H_i x_i + v_i$$

where $z_i$ is the measurement at time (or step) i, $x_i$ is the true state, $v_i$ is observation noise (zero mean and with known covariance), and $H_i$ is the observation model that maps the true state space into the observed space. The Kalman filter model further assumes that there is a relationship between states at different times given by $$x_i = F_i x_{i-1} + w_i$$

where $w_i$ is process noise (also zero mean and with known covariance) and $F_i$ is the transition model that maps true state at time i−1 to true state at time i.

In particular, Step S231 preferably includes producing a set of possible values for N using a type of Kalman filter known as a Bierman-Thornton filter; additionally or alternatively, Step S231 may use any suitable process to produce possible values for N.

Starting with the equation $$\begin{pmatrix} \nabla \Delta \phi_i \\ \lambda \nabla \Delta \phi_i - \nabla \Delta \rho_i \end{pmatrix} = \begin{pmatrix} \frac{1}{\lambda} DE_i & I \\ 0 & \lambda I \end{pmatrix} \begin{pmatrix} b_i \\ N \end{pmatrix}$$

and noting that for any matrix A operating on a normally distributed random variable x with covariance $\Sigma$, the random variable y=Ax will have covariance $A\Sigma A^T$, for the matrix A there are subspaces Ker[A] for which any vectors $x \in$ Ker [A] have the property 0=Ax a matrix $Q_i$ can be constructed such that $0 = Q_i DE_i$ and this matrix can be applied to form a second equation:

$$\begin{pmatrix} Q_i \nabla \Delta \phi_i \\ \lambda \nabla \Delta \phi_i - \nabla \Delta \rho_i \end{pmatrix} = \begin{pmatrix} \frac{1}{\lambda} Q_i DE_i & Q_i \\ 0 & \lambda I \end{pmatrix} \begin{pmatrix} b_i \\ N \end{pmatrix} = \begin{pmatrix} 0 & Q_i \\ 0 & \lambda I \end{pmatrix} \begin{pmatrix} b_i \\ N \end{pmatrix} = \begin{pmatrix} Q_i \\ \lambda I \end{pmatrix} N$$

This equation relates phase change and pseudo-range directly to N (without inclusion of the baseline vector b). This equation can be used as the measurement equation of the Kalman filter of Step S231 without a corresponding dynamic transition model. Calculating the value of N directly (instead of attempting to calculate a Kalman filtered baseline) allows baseline states to be removed from the filter; because N is constant, no dynamic transition model is needed. Removing the requirement for the dynamic transition model can substantially reduce the time and/or memory required to compute solutions, additionally, errors that might occur in a dynamic model cannot be explained away as errors in estimates of N.

Computing $Q_i$ requires knowledge of the line of sight vectors contained in $DE_i$. Step S231 preferably includes computing the line of sight vectors from an estimate of b, (which, while not directly calculated in previous calculations, can be found using a set of phase measurements and an estimate for N). Estimates of b are preferably found as in Step S240, but may additionally or alternatively be found by any suitable method. Additionally or alternatively, Step S231 may include computing the line of sight vectors from reference station data, or in any other suitable manner.

For a particular set of line of sight vectors, $Q_i$ is preferably computed by generating a matrix whose rows form a basis for the left null space of DE, or Ker[$DE^T$]. This generation is preferably done via QR decomposition, but may additionally or alternatively be performed using singular value decomposition or any other suitable method.

From these equations, a set of hypotheses can be generated. Measurements arising from ambiguity vector N are expected to be normally distributed and to have a mean given by the equation $$\begin{pmatrix} Q_i \nabla \Delta \phi_i \\ \lambda \nabla \Delta \phi_i - \nabla \Delta \rho_i \end{pmatrix} = \begin{pmatrix} Q_i \\ \lambda I \end{pmatrix} N$$

The corresponding covariance is determined from the results of the Kalman filter of Step S231, reducing the set of likely hypotheses (as compared to covariance derived directly from the measurement model). From this information, a distribution of the set of hypotheses can be found.

Ideally, all hypotheses within a particular confidence interval are tested. The number of hypotheses contained within this interval (hereafter referred to as the testing set) is dependent on the covariance for the N distribution. Since N needs to be computed for several satellites to determine position of the mobile receiver, the total set of hypotheses that need to be tested depends both on the covariances for each satellite's associated N value, but also the number of satellites.

Figure 9:
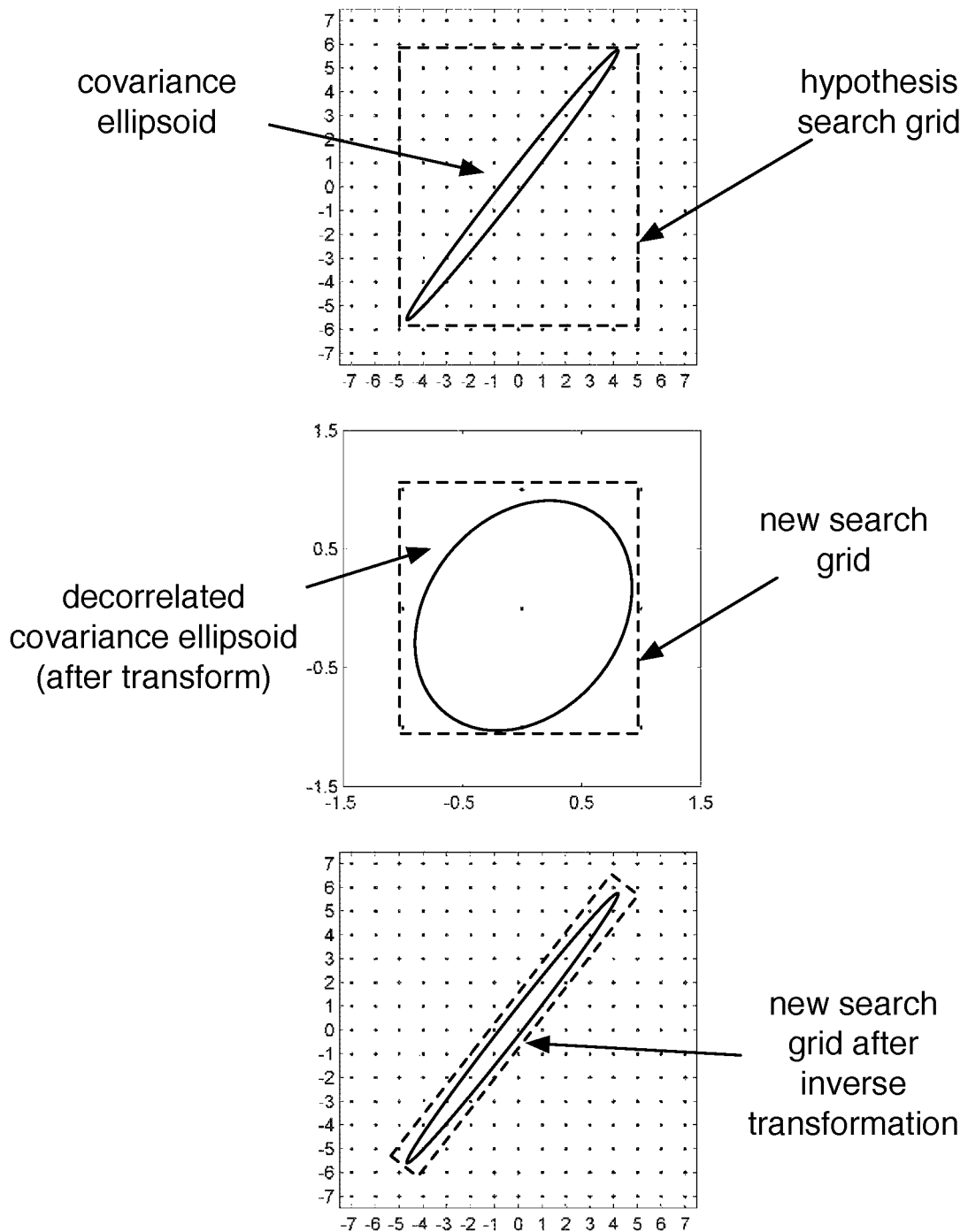
FIG. 9 is an example view of a transformation of a method of a preferred embodiment.

Hypotheses are preferably bounded (for a particular confidence interval) by an ellipsoid defined by the covariance matrix. The ellipsoid defined by the covariance matrix is often extremely elongated, resulting a time and computation intensive hypothesis generation process. To reduce the time and computational resources required to perform this process, Step S231 may include performing a decorrelating reparameterization on the hypothesis search space, as shown in FIG. 9. Performing this reparameterization transforms the hypothesis space such that the elongated ellipsoid is transformed to an approximate spheroid; this transformation allows hypotheses to be identified substantially more easily. The hypotheses can then be transformed by an inverse transformation (inverse of the original reparameterization) to be returned to the original coordinate space.

Step S231 preferably includes generating hypotheses for the testing set according to memory limits on the mobile receiver. For example, if a receiver features 64 kB of memory for storing hypotheses and storing initial hypotheses for eight satellites requires 70 kB (while storing initial hypotheses for 7 satellites requires only 50 kB), Step S231 may include generating a set of initial hypotheses for 7 satellites, and then adding hypotheses for the eighth satellite after enough of the initial hypotheses for the 7 satellites have been eliminated. S231 may additionally or alternatively include waiting for the covariance of the Kalman filter's estimate to shrink before generating hypotheses if the current covariances are large enough that memory cannot store testing sets at some threshold confidence level for at least four satellites.

Though Step S231 is preferably performed before Step S232 is performed for the first time, Step S231 may be performed again at any suitable time to modify the set of hypotheses tested. For example, as the probabilities for each set of hypotheses are refined by Step S232, hypotheses may be added to or subtracted from the testing set by Step S231. For example, if Step S231 produces a testing set A and later adds a testing set B containing new satellites, the new testing set may be generated by taking the Cartesian/outer product of A and B, where probabilities are initialized via $$P(A, B) = \frac{P(A)}{|B|}$$

where the denominator is the number of hypotheses in set B and P(A) is the probability of A generated in Step S232. Step S232 may include initializing probabilities via P(A, B)=P(A) (as Step S232 preferably tracks relative probabilities as opposed to absolute probabilities). If Step S231 includes dropping a satellite (e.g., if the satellite can no longer be tracked), this can be accounted for by marginalizing hypotheses via $P(A) = \Sigma_{B \in \mathcal{B}}\ P(A, B)$ over all hypotheses still in the set. Step S232 preferably includes tracking probabilities in log space; for $l_i = \ln[p_i]$:

$$\ln[p_1+p_2] = \ln[e^{l_1}+e^{l_2}] = l_1 + \ln[1+e^{l_1-l_2}]$$

Step S232 preferably includes approximating the logarithm term of $l_1 + \ln[1+e^{l_1-l_2}]$ via Taylor series in probability or log probability space; additionally or alternatively, the logarithm term may be estimated as zero as the exponential term may be very small compared to 1. This approximation may result in reducing computation time and/or memory.

Step S232 functions to test the hypotheses of the refined set generated by Step S231 in order to identify the hypothesis corresponding to the actual value of N. Step S231 preferably includes generating hypotheses using LAMBDA or MLAMBDA algorithms using the means and covariances generated by a Kalman filter, but may additionally or alternatively include generating hypotheses using any other mean or covariance estimate of N or according to any suitable algorithm. Step S232 preferably includes testing hypotheses using a variation of the following Bayesian update formula for a hypothesis h given an observation y:

$$\ln[P_i(h)] = l_i(h) = l_{i-1}(h) + \ln[P(y_i|h)] - \eta_i$$

where $$\eta_i = \ln\left[\sum_{h \in \mathcal{H}} P(y_i | h) P_{i-1}(h)\right]$$

Variables to be used in this equation are preferably defined according to the following definitions:

$$r_1 = \tilde{Q}_i \begin{pmatrix} \nabla \Delta \phi_i \\ \nabla \Delta \rho_i \end{pmatrix}; \tilde{Q}_i = \begin{pmatrix} Q_i & 0 \\ \lambda I & -I \end{pmatrix}$$

where $r_i$ is distributed with mean and covariance $$\bar{r}_{iN} = \begin{pmatrix} Q_i \\ \lambda I \end{pmatrix} N; \sum_i = \tilde{Q}_i \mathrm{Cov}\left[\begin{pmatrix} \nabla \Delta \phi_i \\ \nabla \Delta \rho_i \end{pmatrix}\right] \tilde{Q}_i^T$$

For observations $y_i = r_i$ and hypotheses h=N, the previous hypothesis update formula can be written as $$l_i(N) = l_{i-1}(N) - \chi_i^2(N) + \ln[k_i] - \eta_i; \chi_i^2(N) = (r_i - \bar{r}_{iN})^T \Sigma_i^{-1} (r_i - \bar{r}_{iN})$$

where $k_i$ is the scaling factor in the normal distribution.

Step S232 preferably includes running the hypothesis test above until the ratio between the probabilities of the best two hypotheses reaches a set threshold; additionally or alternatively, Step S232 may include stopping the hypothesis test based on any other suitable condition (e.g., time).

Step S232 may additionally or alternatively include dropping hypotheses from further testing if their associated pseudo-likelihood, given by $$l_i''(n) = l_{i-1}''(N) - \chi_i^2(N) - l\mathrm{max}_i; l\mathrm{max}_i = \max_N[l_{i-1}''(N) - \chi_i^2(N)]$$

is less than some set threshold; the likelihood ratio test may be performed in single precision for speed and numerical stability. Additionally or alternatively, Step S232 may include using any other suitable metric for removing unlikely hypotheses; for example, removing hypotheses with a probability ratio (relative to the best hypothesis) below some threshold value.

Step S232 preferably includes calculating $\Sigma_i$ and $r_i$ only once per observation step, as opposed to once per hypothesis N; additionally or alternatively, Step S232 may include calculating these at any suitable time.

Step S240 includes calculating receiver position. Step S240 functions to calculate the position of the mobile receiver based on the value for N computed in Step S230. After N has been determined, the baseline vector b for the mobile receiver is determined from the value(s) for N and phase/pseudo-range measurements by Step S240; this gives the position of the mobile receiver relative to a reference station. If the location of the reference station is known, Step S240 may include calculating absolute position of the mobile receiver (by applying b to the reference station coordinates).

Step S240 may additionally include transmitting or storing receiver position data. For instance, Step S240 may include transmitting receiver position data from the receiver to an external computer over UHF radio, the internet, or any other suitable means.

All steps of the method 200 are preferably performed on a mobile receiver, but additionally or alternatively, any step or set of steps may be performed on a remote platform (e.g., cloud computing servers if the mobile receiver has internet access).

Specific Example of a System and Method for Generating Satellite Positioning Corrections A system for distributed dense network processing of satellite positioning data includes a global correction module, a plurality of local correction modules, and a correction generator. The system may additionally include one or more interpolators. For example, data from the global correction module may be used to initialize local correction modules, may be passed to the correction generator via local correction modules, may be passed directly to the correction generator, and/or may be utilized by the system in any other manner.

The system functions to generate correction data to be used by a mobile GNSS (Global Navigation Satellite System) receiver or any other GNSS receiver for which position/velocity/timing data correction is desired. Such a receiver (henceforth referred to as a mobile receiver) may operate on any satellite navigation system; e.g., GPS, GLONASS, Galileo, and Beidou. The correction data is preferably used to improve GNSS solution accuracy, and may take the form of PPP corrections, RTK corrections, or any other type of corrections (discussed in the section on the correction generator).

Flexibility in the form of corrections data is an inherent and distinguishing aspect of the system over traditional position correction systems. Rather than attempting to generate corrections solely from a small set of high-quality global reference stations (as in PPP) or by comparing data in mobile receiver/reference station pairs (as in RTK), the system collects data from reference stations (and/or other reference sources), and instead of (or in addition to) applying this data directly to generate connections, the data is used to generate both a global correction model (in the global correction module) and a number of local correction models (in local correction modules). Output of these models are then passed to the correction generator, which can use said output to generate correction data in any form. Further, the correction generator may cache and/or (with use of the interpolator) spatially interpolate corrections data to provide high quality corrections to mobile receivers regardless of correction capability (e.g., whether the receiver can process RTK/PPP corrections) and location of individual base stations.

By operating in this manner, the system may provide a set of corrections that (while usable with PPP receivers) suffers from little of PPP's long convergence time issues, with solution complexity scaling directly with the number of reference stations N (unlike RTK, in which solution complexity scales at least with the number of possible pairs; i.e., $N^2$. In fact, many current solutions scale with $N^3$ or worse). Further, since corrections are preferably calculated using local correction models that may depend on any number of single reference stations (rather than specific reference station pairs), corrections are substantially more robust to loss of a base station.

Further, the flexible nature of the system enables some functions (such as spatial interpolation and caching) to be performed much more generally than would be possible with RTK; while the concept of a "virtual reference station" is known within RTK (also referred to as a "pseudo reference station"), virtual reference stations typically involve the interpolation of RTK corrections data in real time (and, as discussed before, error correction scales in complexity with $N^2$). In contrast, interpolation in the system can be limited to specific aspects of global and/or local corrections models, providing more robustness to error and better insight as to error causes. Further, unlike RTK, which requires real-time corrections data, the model-based system may cache or otherwise retain model parameters even when data is limited (e.g., when a reference station suddenly becomes unavailable).

The system is preferably implemented in software as part of a networked distributed computing system, but may additionally or alternatively be implemented in any manner.

The global correction module functions to maintain one or more global correction models. Global correction models preferably accomplish two functions-correcting for global error (i.e., error in GNSS positioning that does not vary substantially in space) and error-checking/seeding local error estimates (where local error refers to error that does vary substantially in space or per GNSS receiver). Note that seeding here refers to providing a coarse estimate as a starting point for further refinement.

The global correction module preferably takes as input raw data from reference stations and the mobile receiver (e.g., carrier phase data, pseudorange data, reference station location etc.) but may additionally or alternatively take in processed data from reference stations and/or the mobile receiver (e.g., positioning code data) or data from any other source (e.g., PPP global corrections data sources on the internet, calibration data for particular satellites or receiver types from a manufacturer or other source, satellite orbit data, satellite clock data).

Reference stations preferably have one or more satellite receivers and generate corrections based on those receivers. The number and quality of satellite receivers used by a reference station (or other factors, like antenna type/size/location) may determine the accuracy of reference station data. Reference stations (or other sources of reference station data; e.g., a reference source that creates correction data from multiple reference stations) may be ordered or grouped by reference station quality (e.g., accuracy of corrections)

and/or locality (e.g., if corrections are desired for a particular mobile receiver, reference stations may be ordered or grouped by distance to that receiver).

The global correction module preferably explicitly models the effects of global parameters on GNSS navigation. These parameters preferably include satellite clock error, satellite orbit error, satellite hardware bias, satellite antenna phase windup, phase center offset (PCO), and phase center variation (PCV) (all of which are per satellite, but generally do not vary spatially), solid earth tides, solid earth pole tides, ocean tidal loading (which vary spatially and temporally, but in a predictable manner), as well as coarse global models of ionospheric and tropospheric effects (in this case, global models may not be accurate enough by themselves to model ionospheric and tropospheric effects, but they provide a starting point for later refinement). Additionally or alternatively, the global correction module may model the effects of any parameters on GNSS signals as received by a mobile receiver or a reference station. The global correction module preferably additionally maintains uncertainty estimates for at least some global parameters; additionally or alternatively, the global correction module may not maintain uncertainty estimates.

Note that for receivers used in generating/updating the global model, the global correction module may additionally or alternatively model effects unique to those receivers; e.g., receiver clock error, receiver hardware bias, and receiver antenna phase windup/PCO/PCV (which are unique to a given receiver but not directly dependent on location).

The plurality of local correction modules function to maintain local correction models. Local correction models preferably correct for spatially local variance of effects on GNSS signals as well as for effects that are specific to particular receivers/reference stations.

Local correction modules preferably correspond to (and receive data from) a single reference station. In some embodiments, a local correction module exists for each reference source or station, such that each local correction module takes input from a unique reference source. Additionally or alternatively, local correction modules may correspond to and/or couple to reference stations in any manner; for example, a local correction module may be used to model a number of reference stations within a particular spatial region. Additionally or alternatively, the system may include one or more local correction modules corresponding to mobile receivers.

A local correction module preferably takes as input raw data from corresponding reference stations/mobile receivers (e.g., carrier phase data, positioning code data, reference station location, pseudorange, navigation data, message data, etc.) but may additionally or alternatively take in processed data from reference stations and/or the mobile receiver (e.g., broadcast ephemerides and almanacs) or data from any other source. The local correction module preferably additionally takes data from the global correction module (e.g., to initialize a local correction model for a new reference station and/or to compensate for global components of local error). Additionally or alternatively, the local correction module may take data from any source (e.g., the local correction module may take in only reference data and not any output of the global correction module).

The local correction module preferably explicitly models the effects of local parameters on GNSS navigation. These parameters preferably include tropospheric and ionospheric effects (which are not directly dependent on reference station but vary spatially/temporally), receiver clock error, receiver hardware bias, receiver antenna phase windup/ PCO/PCV (which are unique to a given receiver/antenna but not directly dependent on location), carrier phase ambiguity, and other position error (which covers effects not otherwise explicitly modeled). Additionally or alternatively, the local correction module may model the effects of any parameters on GNSS signals as received by a mobile receiver or a reference station. Like the global correction module, the local correction module may additionally or alternatively maintain/track parameter uncertainty estimates.

In particular, the local correction module preferably models tropospheric and ionospheric effects as a function of receiver position.

Figure 10A:
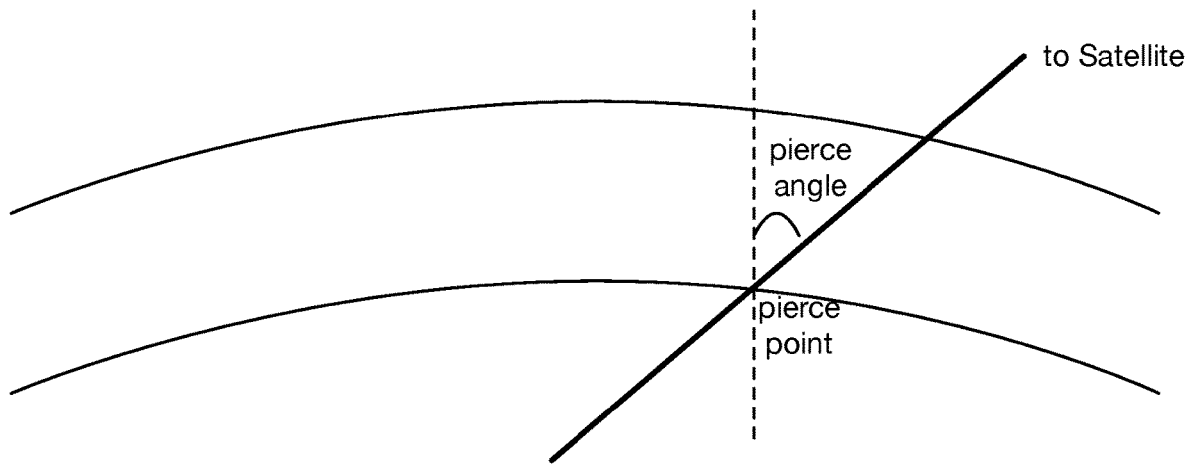
FIGS. 10A and 10B are example representations of ionospheric effect modeling.
Figure 10B:
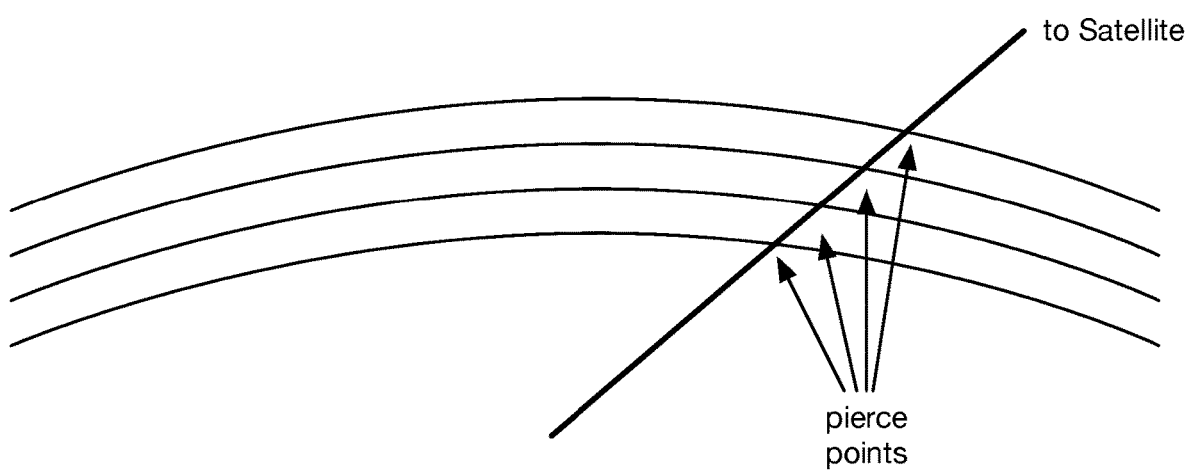

Ionospheric effects may be difficult to model. It is difficult to differentiate the effects on GNSS signals of ionospheric effects from those of receiver hardware bias; however, ionospheric effects tend to vary more quickly in time than receiver hardware bias. Accordingly, local correction modules may attempt to separate ionospheric effects and effects of hardware bias based on rate of change of the combination of these effects. Further, ionospheric effects vary significantly (and not in an easily predictable manner) based not only on position, but also based on the path a GNSS signal takes through the ionosphere. Accordingly, a model of ionospheric effects may need to take each of these factors into account. In one implementation of an invention embodiment, local correction modules model ionospheric effects per GNSS source (e.g., per satellite) as a function of both position (e.g., pierce point—where the line of sight between a receiver and a satellite intersects the atmospheric layer) and pierce angle (e.g., as an analogue for the signal path), as shown in FIG. 10A. Ionospheric effect may also be modeled with respect to frequency. Further, the ionosphere is preferably modeled as one or more thin shells; however, the ionosphere may be additionally or alternatively modeled in any manner. Likewise, ionospheric effects may be modeled in any manner; as opposed to modeling ionospheric effects as a function of position and angle, ionospheric effects may be modeled based on the set of pierce positions for each shell of the ionospheric model, as shown in FIG. 10B.

In contrast, tropospheric effects are not substantially variant in frequency (for most satellite frequencies); further, while tropospheric effects do depend on angle, they typically do so in a predictable manner. Accordingly, local correction models preferably model tropospheric effects solely based on position (e.g., pierce point) with a static correction for angle (roughly corresponding to $1/\cos \theta$ where $\theta$ is the angle from vertical). Additionally or alternatively, tropospheric effects may be modeled in any manner.

Models of the global correction module and local correction modules are preferably weakly coupled; that is, changes in model in either case propagate to each other, but in a damped manner (which allows for reaction to changing conditions without bad data or reference station loss causing correction accuracy to break down). Additionally or alternatively, the models may be coupled in any manner (or not at all).

Models of the global correction module and local correction modules are preferably maintained/updated via a Kalman filter or Gaussian process, but may additionally or alternatively be maintained/updated in any manner.

The global correction module and local correction modules may use any set(s) of reference sources. For example, the local correction modules may use a strict subset of reference sources used by the global correction module (e.g., the subset of reference sources within a range threshold of a mobile receiver), or the global correction module may use a strict subset of reference sources used by the local correction modules (e.g., the subset of local reference sources with highest accuracy). As a second example, the local correction modules and global correction module may use overlapping reference sources (but neither set a subset of the other). As a third example, the local correction modules and global correction module may use non-overlapping sets of reference sources (i.e., they do not share a reference source). Likewise, these reference sources may receive satellite information from any set(s) of satellites.

The output of the global correction module and local correction modules may be referred to as "pre-corrections" and may be generated in any form usable by the correction generator to generate correction data. Pre-corrections generated by the global correction module may be referred to as "global pre-corrections", while pre-corrections generated by a local correction module may be referred to as "local pre-corrections".

In a variation of an invention embodiment, the global correction module includes a differenced ambiguity fixer (DAF) in that calculates carrier phase ambiguity for some reference station pairs. This differenced ambiguity fixer may be used, for instance, to help initialize new reference stations in global and local models more rapidly. Alternatively, the DAF 111 may be independent of the global correction module.

Figure 11:
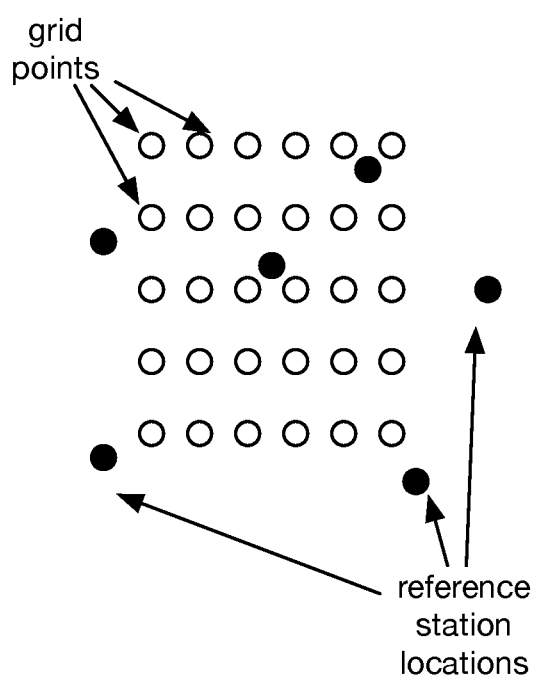
FIG. 11 is an example representation of GNSS effect interpolation.

The interpolator functions to interpolate spatially variant effects of the system. In particular, the interpolator preferably functions to transform per reference station models of local tropospheric and ionospheric effects into a local (reference-station independent, but position dependent) model of local tropospheric and ionospheric effects. For example, the interpolator may transform a set of tropospheric effect models corresponding to individual reference locations (each having a known position) to a regularly spaced grid. Additionally or alternatively, the interpolator may function in any manner (e.g., by creating a continuous interpolated model of tropospheric/ionospheric effects rather than a discrete grid, or using some other arrangement of discrete points than a grid pattern, as shown in FIG. 11, etc.). Note that any interpolation technique may be used; for example, kriging may be used (this technique has the advantage of also predicting uncertainty at the interpolated points). In general, the local position dependent model may be referred to as a "unified position-based model" (since it unifies the output of multiple models corresponding to individual reference sources).

The interpolator may additionally or alternatively function to separate ionospheric effects and effects of hardware bias; for example, local correction modules may output to the interpolator both ionospheric and hardware bias estimates (optionally including a term characterizing the correlation between these estimates), and from these estimates attempt to fit a unified (spatially variant) ionospheric model to the data (after which hardware bias estimates for each reference source may be refined). For example, each local correction module ($LCM_i$) may output an ionospheric correction $I_i(x, y, z)$ and a hardware bias correction $H_i$. At the local correction module these corrections may be improperly separated; e.g., $I_i = I_i(\text{ideal}) + \Delta_i$, $H_i = H_i(\text{ideal}) - \Delta_i$, but because the ionospheric estimates should fit the same model, the interpolator can use measurements from multiple reference sources to refine estimates of both ionospheric correction and hardware bias correction.

The correction generator functions to generate corrections to be used by the mobile receiver. The correction generator preferably generates corrections based on output of the global correction module and the local correction modules for a mobile receiver in a form usable by the mobile receiver. For example, if the mobile receiver can accept PPP corrections, the correction generator may send corrections in the form of PPP corrections (though, in contrast to true PPP corrections, the corrections generated by the correction generator may depend upon receiver position estimate or another spatial term). Additionally or alternatively, the correction generator may send corrections in the form of RTK corrections (e.g., of a virtual reference station), or in any other form (e.g., some sort of local coefficients that are part of a local model). Note that local and global corrections may happen in any order (and may be synchronous or asynchronous). The correction generator may additionally or alternatively send or use correction data in any manner to correct position data (e.g., the correction generator may take as input position data and generate corrected position data rather than a positioning correction to be implemented by, say, a mobile receiver).

The correction generator preferably caches model output and generates corrections using this cache. Accordingly, in the absence of some real-time data, cached data may be substituted (not possible in traditional RTK). Additionally or alternatively, new parameters may be estimated based on a predicted variation in time (e.g., predicted from cached values), or the correction generator may not rely on cached and/or predicted outputs.

The correction generator may additionally or alternatively calculate estimated uncertainty in the generated corrections given uncertainty in the input parameters (traditional PPP/RTK solutions are not capable of doing this).

A method for distributed dense network processing of satellite positioning data includes receiving data from a set of reference stations, updating a global GNSS correction model, updating a set of local GNSS correction models, and generating GNSS corrections.

The method preferably functions in a substantially similar manner to the system.

Receiving data from a set of reference stations functions to receive input data used to update global and local GNSS correction models, substantially similar to as described in the system.

Updating a global GNSS correction model functions to update a global correction model substantially similar to that of the global correction module; this model preferably accomplishes two functions—correcting for global error (i.e., error in GNSS positioning that does not vary substantially in space) and error-checking/seeding local error estimates. Updates are preferably performed as described in the system description.

Updating a set of local GNSS correction models functions to update local correction models substantially similar to that of the local correction module; these models preferably correct for spatially local variance of effects on GNSS signals as well as for effects that are specific to particular receivers/reference stations. Updates are preferably performed as described in the system description.

Generating GNSS corrections functions to generate corrections from global and local correction models to be used by a mobile receiver. Generating GNSS corrections preferably includes generating corrections as described in the sections on the correction generator; additionally or alternatively, as part of this generation process, may include performing interpolation (as described in the section on the interpolator). Likewise, may include caching model output and generating corrections from this cache. Accordingly, in the absence of some real-time data, cached data may be substituted (this is not possible in traditional RTK).

The method is preferably implemented by the system but may additionally or alternatively be implemented by any system for distributed dense network processing of satellite position data.

Specific Example of a System and Method for Reduced-Outlier Satellite Positioning The position estimate of S240 is preferably calculated by any number of prediction and update steps based on the observations received in S210. For example, S210 may include receiving observations at different times, and S240 may include generating a position estimate using all of those observations and a previous position estimate. Alternatively, S240 may include generating a position estimate from only a subset of the observations.

S250 includes generating an outlier-reduced second receiver position estimate. S250 functions to detect the effect of erroneous observations (i.e., erroneous observations detectable as statistical outliers) in the first receiver position estimate and modify the position estimate to increase accuracy (generating the second receiver position estimate, characterized by higher performance).

While techniques for removing or weighting measurement outliers exist in the prior art (as well as analysis of solution or measurement quality based on residuals), S250 includes specific techniques that may more efficiently mitigate the effect of outliers than existing techniques. For example, while techniques exist for mitigating for a single outlier at a time, the techniques of S250 may lend themselves to identifying and/or mitigating for multiple outliers in parallel.

S250 preferably detects outlier observations using one of the three following techniques (scaled residual technique, variance threshold technique, and hybrid technique). After detecting outlier observations, S250 preferably includes generating the second position estimate in the same manner as in S240, but excluding any outlier observations. Additionally or alternatively, S250 may include generating the second position estimate by adding new observations with negative variances as updates to the first position estimate (the new observations serving to remove the effects of detected outlier observations), or in any other manner. While these are two examples of how S250 may mitigate effects of outliers on position estimates, S250 may additionally or alternatively accomplish this in any manner (e.g., weighting non-outlier observations more strongly than outlier observations).

Scaled Residual Technique

In a first implementation of an invention embodiment, S250 includes generating an outlier-reduced second receiver position estimate using the scaled residual technique described in this section. Note that the term "scaled residual technique" is here coined to refer to exactly the technique described herein (any similarity in name to other techniques is purely coincidental).

In the scaled residual technique, S250 preferably includes calculating posterior residual values for the satellite data observations. That is, for observations $z_k$ and posterior state estimate $\hat{x}_{k|k}$ (calculated in S220), S250 preferably includes calculating the residual $$\tilde{v}_{k|k} = z_k - H_k \hat{x}_{k|k}$$

henceforth referred to as the posterior observation residual (sometimes referred to as the measurement post-fit residual). From the posterior observation residual, S250 preferably includes calculating the posterior observation residual covariance, $$C_k = R_k - H_k P_{k|k} H_k^T$$

where $R_k$ is the covariance of $n_k$ and $P_{k|k}$ is the updated state covariance.

From the posterior observation residual covariance, the variance of the posterior observation residual vector can be calculated:

$$\sigma^2 = \frac{v^T R_k^{-1} v}{DOF}$$

where DOF is degrees of freedom. Note that v may be written as Sz where S is an matrix having a trace equivalent to the DOF. From this, it can be said that $$S = I - H_k P_{k|k} H_k^T R_k^{-1}$$

Finally, this variance can be used to scale the residuals $\tilde{v}_{k|k}$ (e.g., by dividing residuals by their associated standard deviations or by their associated variances). The scaled residuals are then compared to a threshold window (e.g., one corresponding to plus or minus 3 standard deviations from the mean), and any observations falling outside the threshold window are flagged as outlier observations.

The second receiver position state is then generated from the reduced set of observations as described previously.

Variance Threshold Technique

In a second implementation of an invention embodiment, S250 includes generating an outlier-reduced second receiver position estimate using the variance threshold technique described in this section. Note that the term "variance threshold technique" is here coined to refer to exactly the technique described herein (any similarity in name to other techniques is purely coincidental).

In the variance threshold technique, the posterior residual, posterior residual covariance, and posterior residual variance are calculated as in the scaled residual technique. However, in this technique, the posterior residual variances are examined directly. If one or more posterior residual variances is outside of a threshold range, this is an indication that outliers may be present in the observation data.

In this technique, S250 preferably includes removing a set of observations and recalculating the posterior residual variances. If the posterior residual variances fall below threshold levels, the algorithm may stop here; however, the algorithm may alternatively try removing a different set of observations (and so on, until at least one or more of them falls below threshold levels). Alternatively stated, the algorithm may continue until the number of posterior residual variances outside of a threshold range is less than a threshold number.

Alternatively, in this technique, S250 may include calculating posterior residual variances for a number of set-reduced observations (i.e., different subsets of the whole set of observations) and choosing the reduced set with the lowest variance.

This technique may be particularly useful for differenced measurements. Differenced measurements are correlated, and thus more likely to result in an outlier in one observation corrupting residuals that correspond to different observations.

The second receiver position state is then generated from the reduced set of observations as described previously.

Hybrid Technique

In a third implementation of an invention embodiment, S250 includes generating an outlier-reduced second receiver position estimate using the hybrid technique described in this section. Note that the term "hybrid technique" is here coined to refer to exactly the technique described herein (any similarity in name to other techniques is purely coincidental).

In the hybrid technique, the posterior residual, posterior residual covariance, and posterior residual variance are calculated as in the scaled residual technique. Then, the posterior residual variances are examined. If one or more posterior residual variances is above a threshold (note: this can be a different threshold than the one mentioned in the variance threshold technique), S250 includes detecting outliers using the variance threshold technique; however, if not, S250 includes detecting outliers using the scaled variance technique. Additionally or alternatively, S250 may include selecting between the variance threshold and scaled variance techniques in any manner based on the number of above-threshold posterior residual variances and/or their magnitude.

The second receiver position state is then generated from the reduced set of observations as described previously.

All three of these techniques preferably treat phase ambiguity as a continuous variable; however, S250 may additionally or alternatively attempt to constrain phase ambiguity to an integer. For example, S250 may include (e.g., after calculating a second position estimate) calculating phase measurement residuals and comparing those residuals to integer multiples of full phase cycles (e.g., $2\pi n$). If the residual is close, this may be indicative of a cycle slip, rather than an erroneous observation.

In one implementation of an invention embodiment, S250 includes detecting a potential cycle slip, verifying that the value of the cycle slip can be chosen reliably (e.g., by verifying that only a single integer cycle slip value is contained within a known window of variance around the value of the residual), and testing the cycle slip value against the residual (e.g., by verifying that the cycle slip value is within a window of variance of the residual value). Note that the two windows of variance described here may be distinct (e.g., one may be smaller than the other). S250 may then include correcting for the cycle slip.

Note that if the method 200 identifies data from one or more sources (e.g., satellites, base stations) as erroneous, the method 200 may include flagging or otherwise providing notification that said sources may be "unhealthy". Further, the method 200 may disregard or weight differently observations from these sources.

The method 200 is preferably implemented by the system 100 but may additionally or alternatively be implemented by any system for processing of satellite position data.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for high-integrity satellite positioning. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for determining a position of a global navigation satellite system (GNSS) receiver, the system comprising:
a corrections generator comprising:
an observation monitor configured to receive a first set of satellite observations associated with a first set of satellites; and
a modelling engine configured to generate corrections based on the first set of satellite observations;
a validation engine configured to validate the corrections; and
a positioning engine comprising:
a second observation monitor configured to receive a second set of satellite observations, associated with a second set of satellites, measured by the GNSS receiver;
an ambiguity module configured to determine a carrier phase ambiguity associated with the second set of satellite observations based on the validated corrections;
an ambiguity validator configured to validate the carrier phase ambiguity; and
a positioning module configured to estimate the position of the GNSS receiver based on the second set of satellite observations and the carrier phase ambiguity.

2. The system of claim 1, wherein the corrections engine is implemented on a cloud computing server.

3. The system of claim 1, wherein the positioning engine runs on a computing system collocated with the GNSS receiver.

4. The system of claim 1, wherein the ambiguity module comprises:
a float filter configured to determine a real-valued carrier phase ambiguity estimate; and
an integer fixing module configured to determine an integer-valued carrier phase ambiguity estimate based on the real-valued carrier phase ambiguity estimate.

5. The system of claim 1, wherein the ambiguity validator is configured to validate the carrier phase ambiguity using a multi-step validation, wherein an integrity of the estimated position depends on which step of the multi-step validation the carrier phase ambiguity is validated to.

6. The system of claim 1, wherein the observation monitor is further configured to receive a third set of satellite observations, wherein the validation engine validates the corrections based on a comparison between a residual determined by correcting the third set of satellite observations using the corrections and a threshold.

7. The system of claim 1, wherein the positioning engine further comprises a velocity module configured to determine a velocity of the GNSS receiver using differenced carrier phase measurements from the second set of satellite observations.

8. The system of claim 1, further comprising:
an inertial measurement sensor, collocated with the GNSS receiver, configured to measure at least one of accelerometer or gyroscope data; and
a fusion filter configured to fuse the position estimated by the positioning module and the at least one of accelerometer or gyroscope data to determine a fused position estimate for the GNSS receiver.

9. A method comprising:
receiving a first set of satellite observations associated with at least one satellite constellation, wherein each satellite observation of the first set of satellite observations is measured at a reference station;
determining corrections based on the first set of satellite observations, wherein determining the corrections comprises:
estimating an atmospheric delay at each reference station;
generating a global model of an atmosphere based on the atmospheric delay at each reference station; and
generating the corrections based on the global model;
receiving a second set of satellite observations associated with at least one satellite constellation;
determining residuals between the second set of satellite observations and the corrections; and
validating the corrections when the residuals are less than an integrity bounded threshold;
wherein a positioning engine is configured to determine a receiver position from a third set of satellite observations using the validated corrections, wherein the receiver position comprises an integrity risk of at most $10^{-4}$ per hour.

10. The method of claim 9, wherein the atmospheric delay at each reference station is determined using a precise point positioning filter.

11. The method of claim 9, wherein the global model is updated using a gaussian process.

12. The method of claim 9, wherein the corrections are further generated based on a orbit, bias, and clock information associated with satellites of the at least one satellite constellation.

13. The method of claim 9, further comprising comparing residuals and thresholds for a plurality of linear combinations of satellite frequencies or satellite signals to determine whether a failure to validate the corrections is associated with a satellite correction or an atmospheric correction.

14. The method of claim 9, wherein the first set of satellite observations are received by and the corrections are determined by a cloud computing server.

15. The method of claim 9, further comprising detecting drift over time in the corrections that impacts a receiver velocity estimate.

16. The method of claim 15, wherein detecting the drift comprises differencing the residuals with residuals determined from a different time window to determine a differenced residual.

17. The method of claim 9, further comprising:
monitoring at least one of the first or second set of satellite observations for a predetermined event; and
when the predetermined event is detected, mitigating the effect of the predetermined event.

18. The method of claim 9, wherein the positioning engine performs a CRC check on the validated corrections, wherein the positioning engine uses the validated corrections when the validated corrections pass the CRC check.

19. A system for determining a position of a global navigation satellite system (GNSS) receiver, the system comprising:
a corrections generator comprising:
an observation monitor configured to receive a first set of satellite observations associated with a first set of satellites and to receive a second set of satellite observations associated with a second set of satellites; and
a modelling engine configured to generate corrections based on the first set of satellite observations;
a validation engine configured to validate the corrections based on a comparison between a residual determined by correcting the second set of satellite observations using the corrections and a threshold; and
a positioning engine comprising:
a second observation monitor configured to receive a third set of satellite observations, associated with a third set of satellites, measured by the GNSS receiver;
an ambiguity module configured to determine a carrier phase ambiguity associated with the third set of satellite observations based on the validated corrections; and
a positioning module configured to estimate the position of the GNSS receiver based on the third set of satellite observations and the carrier phase ambiguity.

20. The system of claim 19, wherein the corrections engine is implemented on a cloud computing server.

21. The system of claim 19, wherein the positioning engine further comprises a velocity module configured to determine a velocity of the GNSS receiver using differenced carrier phase measurements from the second set of satellite observations.

22. The system of claim 19, wherein the positioning engine further comprises an ambiguity validator configured to validate the carrier phase ambiguity using a multi-step validation, wherein an integrity of the estimated position depends on which step of the multi-step validation the carrier phase ambiguity is validated to.

23. The system of claim 19, wherein the ambiguity module comprises:
a float filter configured to determine a real-valued carrier phase ambiguity estimate; and
an integer fixing module configured to determine an integer-valued carrier phase ambiguity estimate based on the real-valued carrier phase ambiguity estimate.

* * * * *